US011776355B2

(12) United States Patent
Cage et al.

(10) Patent No.: US 11,776,355 B2
(45) Date of Patent: *Oct. 3, 2023

(54) PROCESSING OF A GAME-PLAYING TRANSACTION BASED ON LOCATION

(71) Applicant: E2INTERACTIVE, INC., Atlanta, GA (US)

(72) Inventors: Daniel Cage, Atlanta, GA (US); John Minutaglio, Atlanta, GA (US); Roy Leach, Elizabeth, CO (US); David Tashjian, Fort Lauderdale, FL (US); Travis L Smith, Alpharetta, GA (US); John Frederick Housel, Jr., Atlanta, GA (US)

(73) Assignee: E2INTERACTIVE, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,211

(22) Filed: Mar. 9, 2021

(65) Prior Publication Data

US 2021/0209896 A1 Jul. 8, 2021

Related U.S. Application Data

(63) Continuation of application No. 16/351,275, filed on Mar. 12, 2019, now Pat. No. 10,943,432, which is a
(Continued)

(51) Int. Cl.
*G07F 17/32* (2006.01)
*G06Q 20/32* (2012.01)
*G07F 17/34* (2006.01)

(52) U.S. Cl.
CPC ..... *G07F 17/3241* (2013.01); *G06Q 20/3274* (2013.01); *G07F 17/3218* (2013.01);
(Continued)

(58) Field of Classification Search
CPC ............ G07F 17/3204; G07F 17/3218; G07F 17/3223; G07F 17/3225; G07F 17/3227; G07F 17/3232; G07F 17/3237; G07F 17/3239; G07F 17/3241; A63F 13/70; G05B 2219/25205; G05B 2219/36542; G06Q 30/0248; H04N 21/42623;
(Continued)

(56) References Cited

U.S. PATENT DOCUMENTS

2007/0060306 A1* 3/2007 Amaitis ................. G07F 17/32
463/25

* cited by examiner

*Primary Examiner* — Omkar A Deodhar
(74) *Attorney, Agent, or Firm* — Landmark Intellectual Property Law, LLC; Gregory M Murphy

(57) ABSTRACT

An exemplary method comprises receiving information associated with a game-playing transaction conducted between a user device and a game-playing terminal, wherein the game-playing transaction is associated with a request for playing a game; determining a location of the user device associated with the game; determining the user device is located in an approved location associated with the game; and processing the game-playing transaction based on determining the user device is located in the approved location associated with the game. The game-playing transaction is conducted on a first communication interface, and the information associated with the game-playing transaction is received on a first or second communication interface.

6 Claims, 36 Drawing Sheets

Related U.S. Application Data continuation of application No. 16/010,398, filed on Jun. 15, 2018, now Pat. No. 10,229,561, which is a continuation-in-part of application No. 15/818,569, filed on Nov. 20, 2017, now Pat. No. 10,217,326, which is a continuation-in-part of application No. 15/614,490, filed on Jun. 5, 2017, now Pat. No. 9,824,340, which is a continuation-in-part of application No. 14/856,421, filed on Sep. 16, 2015, now abandoned, and a continuation-in-part of application No. 14/958,720, filed on Dec. 3, 2015, now Pat. No. 9,672,697, which is a continuation-in-part of application No. 14/018,276, filed on Sep. 4, 2013, now Pat. No. 9,227,136.

(60) Provisional application No. 62/458,457, filed on Feb. 13, 2017, provisional application No. 61/696,533, filed on Sep. 4, 2012.

(52) U.S. Cl.
CPC ...... *G07F 17/3223* (2013.01); *G07F 17/3237* (2013.01); *G07F 17/3244* (2013.01); *G07F 17/329* (2013.01); *G07F 17/3288* (2013.01); *G07F 17/3293* (2013.01); *G07F 17/34* (2013.01)

(58) Field of Classification Search
CPC ......... H04N 21/4353; H04L 2463/041; H04W 12/00; H04W 12/12; H04W 12/1208
See application file for complete search history.

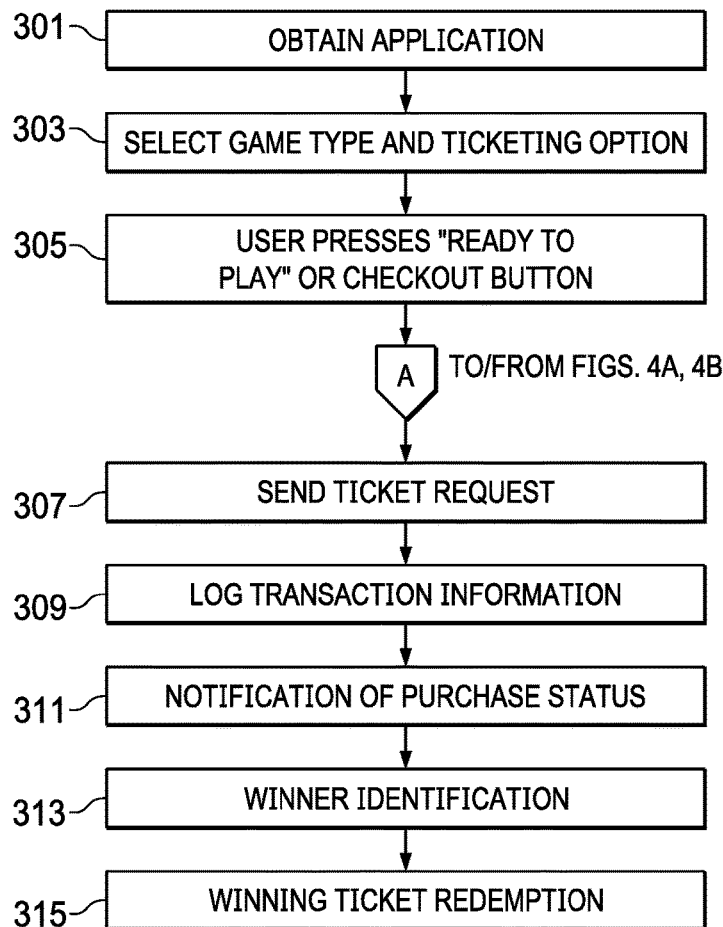
FIG. 3
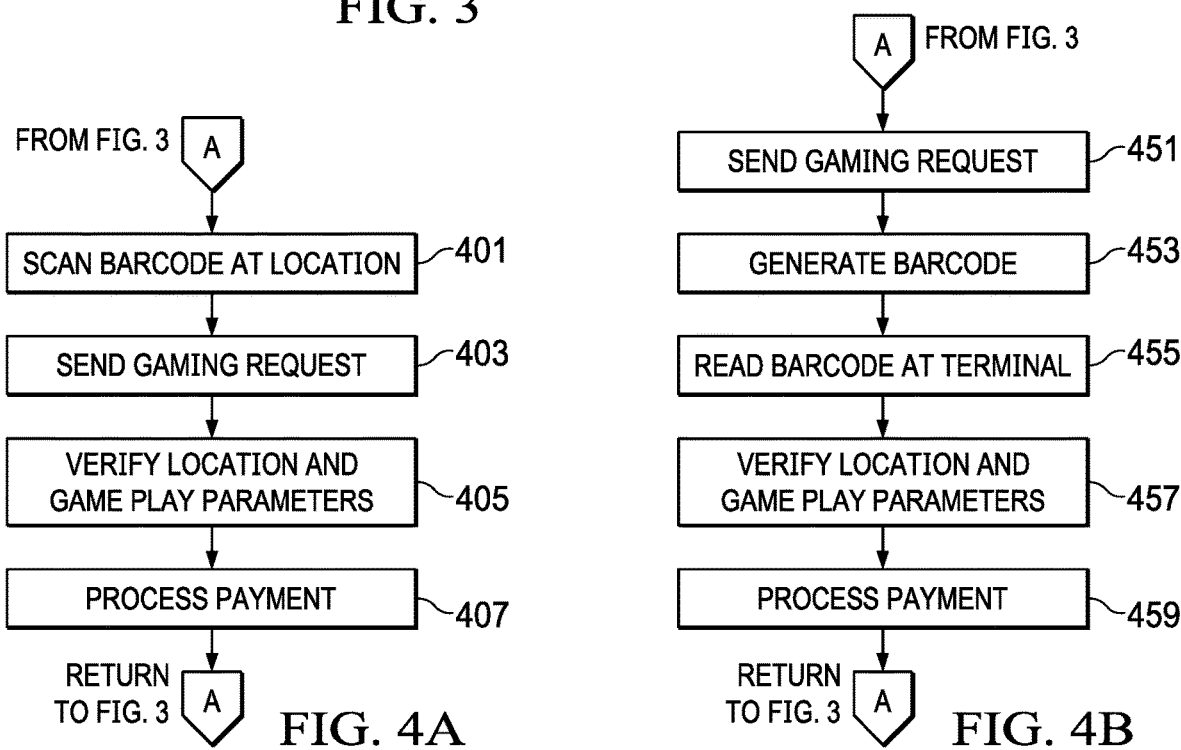
FIG. 4A
FIG. 4B

PROCESSING OF A GAME-PLAYING TRANSACTION BASED ON LOCATION

CROSS-REFERENCE TO RELATED APPLICATIONS

This application is a continuation of, and claims priority to U.S. application Ser. No. 16/351,275, filed on Mar. 12, 2019, which is a continuation-in-part of, and claims priority to U.S. application Ser. No. 16/010,398, filed Jun. 15, 2018, which is a continuation-in-part of, and claims priority to U.S. application Ser. No. 15/818,569, filed Nov. 20, 2017, issued as U.S. Pat. No. 10,217,326 on Feb. 26, 2019, which is a continuation-in-part of, and claims priority to U.S. application Ser. No. 15/614,490, filed Jun. 5, 2017, issued as U.S. Pat. No. 9,824,340 on Nov. 21, 2017, which is a continuation-in-part of, and claims priority to, U.S. patent application Ser. No. 14/958,720 filed on Dec. 3, 2015, issued as U.S. Pat. No. 9,672,697 on Jun. 6, 2017, which is a continuation-in-part of, and claims priority to, U.S. patent application Ser. No. 14/018,276 filed on Sep. 4, 2013, issued as U.S. Pat. No. 9,227,136 on Jan. 5, 2016, which claims priority to U.S. Provisional Patent Application No. 61/696,533 filed on Sep. 4, 2012, all the disclosures of which are hereby incorporated by reference in their entirety for all purposes. U.S. application Ser. No. 15/614,490, filed Jun. 5, 2017, issued as U.S. Pat. No. 9,824,340 on Nov. 21, 2017, which is incorporated by reference herein in its entirety, is a continuation-in-part of, and claims priority to, U.S. patent application Ser. No. 14/856,421, filed Sep. 16, 2015, the disclosure of which is hereby incorporated by reference in its entirety for all purposes. U.S. application Ser. No. 15/818,569, filed Nov. 20, 2017, is a non-provisional of and claims benefit of U.S. Provisional Application No. 62/458,457, filed on Feb. 13, 2017, the disclosure of which is incorporated by reference in its entirety for all purposes.

TECHNICAL FIELD

This disclosure generally relates to game play systems.

BACKGROUND

Many governments have passed laws permitting lottery games to be legalized within their borders. These laws are due to the public support for this style of entertainment. Currently, these games are presented through specific manned terminals that connect to lottery operators—corporations responsible for running the lottery games. While these games have proven to be popular, a large segment of the population does not participate. This is due to many factors including a lack of desire to interact with personnel running the game kiosks, the inconvenience of the manned terminals, the concern over losing a ticket, and, more recently, the lack of cash to play the games as many people are only using payment cards for purchases.

In addition, due to regulatory restrictions, the sale of lottery products is restricted to be within the borders of the government regulating the lottery games. Therefore, existing sales solutions used on mobile devices such as handheld devices and smart phones are not appropriate for the sale of the lottery games because they lack assurances that the mobile device is located within the borders of the government regulating the lottery game.

SUMMARY

In some embodiments, a device is provided for approving game-playing transactions. The device comprises a first communication interface, the first communication interface comprising a Bluetooth interface such as a Bluetooth Low Energy (BLE) interface; a second communication interface; and a processor configured to: receive a first request from a user of the device, the first request being associated with a game; conduct, over the first communication interface, a first transaction, the first transaction comprising reception of first information over the first communication interface, and send, over the second communication interface, a second request associated with the game. The first request or the second request is approved based on: determining a location associated with conducting the first transaction or sending the second request, and determining the location is an approved location associated with the game.

In some embodiments, the device is further configured to prompt a user of the device to play the game in response to determining the device is with a threshold distance of a beacon with which the first transaction is conducted. In some embodiments, the beacon may be a Bluetooth interface such as BLE terminal.

In some embodiments, the second communication interface comprises a Wi-Fi or cellular interface.

In some embodiments, the device is comprised in or part of a motor vehicle.

In some embodiments, the second request comprises at least one of a purchase request, the first request, or the first information.

In some embodiments, the location is determined based on global positioning system (GPS) coordinates of the device.

In some embodiments, the device comprises a mobile device or a non-mobile device.

In some embodiments, the second request is approved further based on determining a period of validity associated with the first information has not expired.

In some embodiments, the second request is approved further based on: determining a gaming authority associated with the game; and determining the user is located in an approved jurisdiction associated with the gaming authority for the game.

In some embodiments, the location is determined based on input received at the device.

In some embodiments, the second communication interface is associated with longer range communication compared to the first communication interface.

In some embodiments, the location is determined by at least one of the device or by a second device that receives the second request from the device.

In some embodiments, a method is provided for processing game-playing transactions. The method comprises receiving information associated with a game-playing transaction conducted, via a Bluetooth interface such as a BLE interface, between a user device and a game-playing terminal, wherein the game-playing transaction is associated with a request for playing a game; determining a location of the user device associated with the game; determining the user device is located in an approved location associated with the game; and processing the game-playing transaction based on determining the user device is located in the approved location associated with the game. The game-playing transaction is conducted on a first communication interface, and the information associated with the game-playing transaction is received on a second communication interface.

In some embodiments, the user device comprises a game-playing application.

In some embodiments, the game comprises a lottery game.

In some embodiments, the method further comprises determining a period of validity associated with the information has not expired, and processing the game-playing request based on determining the period of validity associated with the information has not expired.

In some embodiments, the method further comprises processing the game-playing transaction based on: determining a merchant associated with the location of the user device or the game-playing terminal; cross-referencing a list of approved merchants associated with the location of the user device or the game-playing terminal; and determining the merchant is present on the list of approved merchants.

In some embodiments, the game-playing terminal comprises either an electronic game-playing terminal or a non-electronic game playing terminal.

In some embodiments, another device is provided for processing game-playing transactions. The device is configured to receive information associated with a game-playing transaction conducted, via a Bluetooth interface such as a BLE interface, between a user device and a game-playing terminal, wherein the game-playing transaction is associated with a request for playing a game using the user device; and process the game-playing transaction based on determining the user device is located in an approved location associated with the game, wherein the location of the user device is determined either by the device or the user device. The game-playing transaction is conducted on a first communication interface, and the information is received on a second communication interface.

In some embodiments, the second communication interface is associated with longer-range communication compared to the first communication interface.

In some embodiments, the game-playing transaction comprises a game-requesting transaction or a game-purchasing transaction.

In some embodiments, a non-transitory computer readable medium may be encoded thereon with a program or code that when executed by a processor (e.g., a general or special purpose processor) of a user device (or any other device described herein), causes the processor to perform the various methods described herein.

In some embodiments, a device is provided for processing game-playing transactions. The device comprises a first communication interface; a second communication interface; and a processor configured to: receive a first request from a user of the device, the first request being associated with a game; conduct, over the first communication interface, a first transaction, the first transaction comprising transmission or reception of first information over the first communication interface, and send, over the second communication interface, a second request associated with the game. The first request or the second request is processed based on: determining a location associated with conducting the first transaction or sending the second request, and determining the location is an approved location associated with the game.

In some embodiments, the first communication interface comprises at least one of a Bluetooth interface, a near-field communication (NFC) interface, or a code-based interface.

In some embodiments, the second communication interface comprises a Wi-Fi or cellular interface.

In some embodiments, the first communication interface and the second communication interface are the same communication interface.

In some embodiments, the second request comprises at least one of a purchase request, the first request, or the first information.

In some embodiments, the location is determined based on global positioning system (GPS) coordinates of the device.

In some embodiments, the device comprises a mobile device or a non-mobile device.

In some embodiments, the second request is approved further based on determining a period of validity associated with the first information has not expired.

In some embodiments, the second request is approved further based on: determining a gaming authority associated with the game; and determining the user is located in an approved jurisdiction associated with the gaming authority for the game.

In some embodiments, the second communication interface is associated with longer range communication compared to the first communication interface.

In some embodiments, the location is determined by at least one of the device or by a second device that receives the second request from the device.

In some embodiments, a method is provided for processing game-playing transactions. The method comprises receiving information associated with a game-playing transaction conducted between a user device and a game-playing terminal, wherein the game-playing transaction is associated with a request for playing a game; determining a location of the user device associated with the game; determining the user device is located in an approved location associated with the game; and processing the game-playing transaction based on determining the user device is located in the approved location associated with the game. The game-playing transaction is conducted on a first communication interface, and the information associated with the game-playing transaction is received on a second communication interface.

In some embodiments, the first communication interface comprises at least one of a Bluetooth interface, a near-field communication (NFC) interface, or a code-based interface.

In some embodiments, the game comprises a lottery game.

In some embodiments, the method further comprises determining a period of validity associated with the information has not expired, and processing the game-playing request based on determining the period of validity associated with the information has not expired.

In some embodiments, the method further comprises processing the game-playing transaction based on: determining a merchant associated with the location of the user device or the game-playing terminal; cross-referencing a list of approved merchants associated with the location of the user device or the game-playing terminal; and determining the merchant is present on the list of approved merchants.

In some embodiments, the game-playing terminal comprises either an electronic game-playing terminal or a non-electronic game playing terminal.

In some embodiments, a device is provided for processing game-playing transactions. The device is configured to: receive information associated with a game-playing transaction conducted between a user device and a game-playing terminal, wherein the game-playing transaction is associated with a request for playing a game using the user device; and process the game-playing transaction based on determining the user device is located in an approved location associated with the game, wherein the location of the user device is determined either by the device or the user device. The game-playing transaction is conducted on a first communication interface, and the information is received on a second communication interface.

In some embodiments, the first communication interface comprises at least one of a Bluetooth interface, a near-field communication (NFC) interface, or a code-based interface.

In some embodiments, the game-playing transaction comprises a game-requesting transaction or a game-purchasing transaction.

According to another embodiment, a non-transitory computer readable medium may be encoded thereon with a program that when executed by a processor of a user device, causes the processor to perform a method that may comprise receiving a game play request from a user, obtaining barcode information associated with a barcode at a location, and sending a gaming request including the barcode information and associated with the game play request over a wireless network to a gaming facilitator.

These and other advantages of the present disclosure will become apparent to those skilled in the art from the following detailed description, the accompanying drawings, and the appended claims.

BRIEF DESCRIPTION OF THE DRAWINGS

FIG. 3 is a flow diagram illustrating a process for a game play, in accordance with some embodiments.

FIGS. 4A and 4B are flow diagrams illustrating methods for verifying the location of a mobile device, in accordance with some embodiments.

DETAILED DESCRIPTION

The disclosed systems and methods make lottery games accessible to a larger segment of the population by providing an end-to-end lottery solution for integrated game play and sale of lottery products on, for example, hand held devices and smart phones using barcode technology. A player operates an application on a mobile device, which may be provided for download or supplied with the device, that allows them to select lottery games and ticketing options. In some embodiments, the selection can be made at any time and location. The selections are recorded, for example in a virtual shopping cart, by the lottery application on the mobile device. The player purchases these recorded items at locations that are, for example, pre-approved by a gaming facilitator and/or a gaming authority. The locations are equipped to verify the presence of the mobile device at the location using a barcode technology. Redemption of winning plays can be automatically deposited into an account associated with the player or at a retail location by use of, for example, a barcode sent to the mobile device.

The use of barcode technology with an application distributed to mobile devices allows for the following exemplary advantages:

Issuing and managing a trusted execution environment.
Assigning trusted area within a trusted execution environment to a specific service.
Managing keys for a trusted execution environment.
Securely downloading lottery applications to enabled mobile phones, for example by scanning a barcode and directing the user to a secure website to download the application.
Personalizing applications.
Locking, unlocking and deleting the lottery application according to requests from a user or service provider.
Providing secure logging and accounting settlement of all lottery transactions.

The gaming facilitator enables secure data storage of lottery transactions at the device level using, for example, a Universal Integrated Circuit Card (UICC) through processing and transaction confirmation.

The UICC is a physically secure device, an integrated circuit (IC) card, or smart card, that can be inserted and removed from terminal equipment or a mobile device. The UICC may contain one or more applications and may be referred to using different terminology in different territories. A Subscriber Identity Module (SIM) is an application on the UICC containing a mobile subscriber's unique identity.

Figure 1:
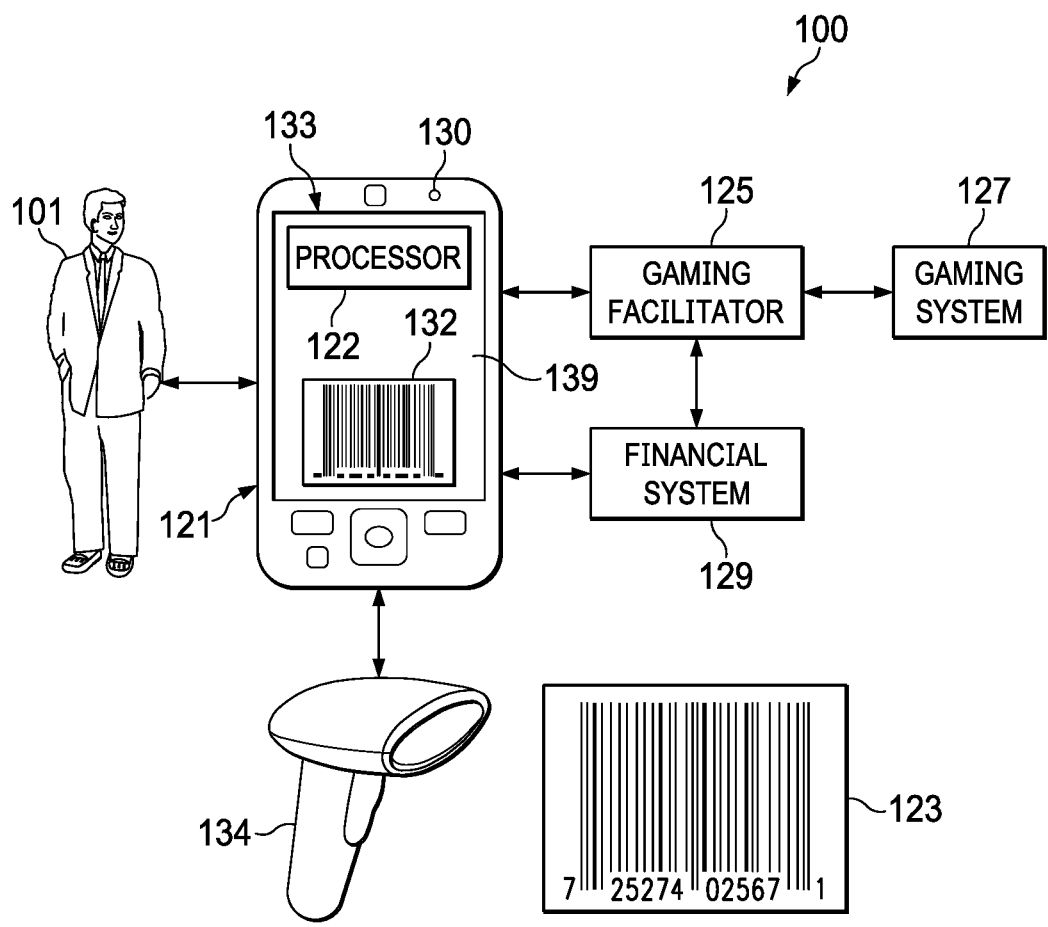
FIG. 1 is a schematic diagram illustrating a game play system, in accordance with some embodiments.

FIG. 1 is a schematic diagram illustrating a representative embodiment of a game play system 100. A user 101 may interact with a mobile device 121. The mobile device 121 may be, for example, a handheld device or smart phone that is already familiar to the user 101 and presents a familiar interface to lottery games. The mobile device 121 may include a processor 122 that is configured to execute programming that may be stored on and/or provided to the mobile device 121. The mobile device 121 is equipped to use barcode technology thereby being able to read a barcode 123 using, for example, a camera 130 of the mobile device 121. Alternatively, or in addition, the mobile device 121 may be configured to display a barcode 132 on a display 133 of the mobile device 121 to be read by barcode reader 134.

By way of example, the barcode 123 or barcode reader 134 may be located at an ATM, a gas pump, or any other retail location. The mobile device 121 may be in communication with the gaming facilitator 125, which may be in communication with the gaming system 127. The mobile device 121 may also be in communication system with the financial system 129 directly and/or through the gaming facilitator 125. The financial system 129 may include, but is not limited to, payment processors, issuer banks, acquirer banks, payment rails, credit networks, etc. The gaming system 127 may include, but is not limited to, a gaming authority, a gaming operator (for example, state lottery operators), a gaming commission (for example, a state lottery commission), etc.

According to another embodiment, the game could be a location-specific game such as Keno or Bingo. In this embodiment, the gaming system 127 would be the computer or system that draws the number for game play. The gaming facilitator 125 would allow the user 101 to interact with the gaming system 127 at the facility. Thus, a user 101 could select a series of numbers on the mobile device 121 and store those numbers for the next gaming play. At the appropriate time, the user 101 would take the mobile device 121 to the barcode reader 134 to communicate the numbers to the gaming system 127 for play. For example, the user 101 may select a button displayed on the display 133 that causes the mobile device 121 to generate a barcode that encodes the numbers and display the barcode on the screen. The barcode reader 134 can then obtain the numbers by reading the barcode. Alternatively, the mobile device 121 may communicate the numbers to the gaming facilitator 125 in association with a reference identification assigned by the mobile device 121 or the gaming facilitator 125 for the game play. The barcode displayed by the mobile device 121 encodes this reference identification thereby enabling the retrieval and identification of the numbers when the barcode reader 134 reads the barcode, which includes the encoded reference identification.

Communications Exchange Server

To sell gaming (or more particularly lottery) tickets through point of sale devices, a communication network is used for communications between a gaming facilitator and gaming partners. Gaming partners are partners that the gaming facilitator interacts with to complete a gaming transaction, such as the gaming system or the financial system. This communication network may have desirable characteristics such as being designed to be secure, reliable, and fast. In an embodiment, each gaming partner may have their own protocol for communicating with and between their systems, servers, and remote devices. Some gaming partners utilize public protocols (e.g., ISO8583) while other gaming partners have generated their own proprietary protocols. To ensure the security of each partner's data and protocols, a server for exchanging communications between a gaming facilitator and a gaming partner may be used.

Figure 2A:
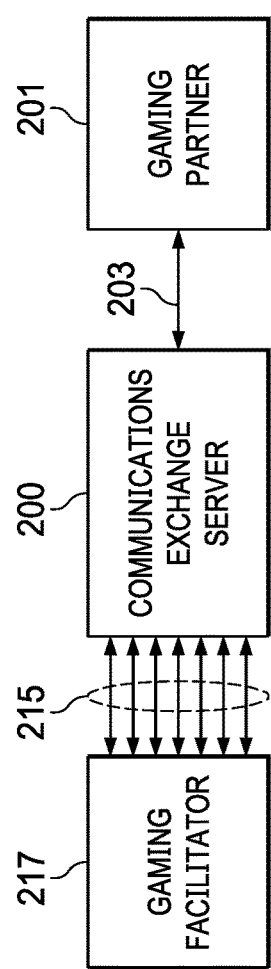
FIG. 2A is a schematic diagram illustrating a communications exchange server, in accordance with some embodiments.

FIG. 2A is a schematic diagram of a communications exchange server 200 that exchanges communications between a gaming facilitator 217 and a gaming partner 201. The communications 203, 215 may include transaction-specific gaming information. In some embodiments, the communications exchange server 200 is an inbound communications server (as shown) for receiving and sending communications at a gaming facilitator 217 to and from a gaming partner 201. The communications 215 between the gaming facilitator 217 and the communications exchange server 200 are multiple connections which represents a series of parallel requests. The communications 203 between the communications exchange server 200 and the gaming partner 201 are a single connection which represents a series of serialized requests. In those embodiments, the communications exchange server may be located at the gaming facilitator.

In some embodiments, the communications exchange server 200 is an outbound communications server (not shown) for receiving and sending communications at a gaming facilitator 217 to and from a gaming partner 201. The communications between the gaming facilitator 217 and the communications exchange server 200 are a single connection which represents a series of serial requests. The communications between the communications exchange server 200 and the gaming partner 201 are multiple connections which represent a series of parallel requests. In those embodiments, the communications exchange server may be located at a gaming partner's site, for example, at a Lottery Operator. A gaming facilitator may send a single request to a communications exchange server that a Lottery Operator send a number of tickets (e.g., "give me 20 tickets"). The communications exchange server may turn that request into a number of requests for one ticket (e.g., 20 requests of, "give me one ticket"), resulting in a number of tickets (e.g., 20 tickets) being generated.

Figure 2B:
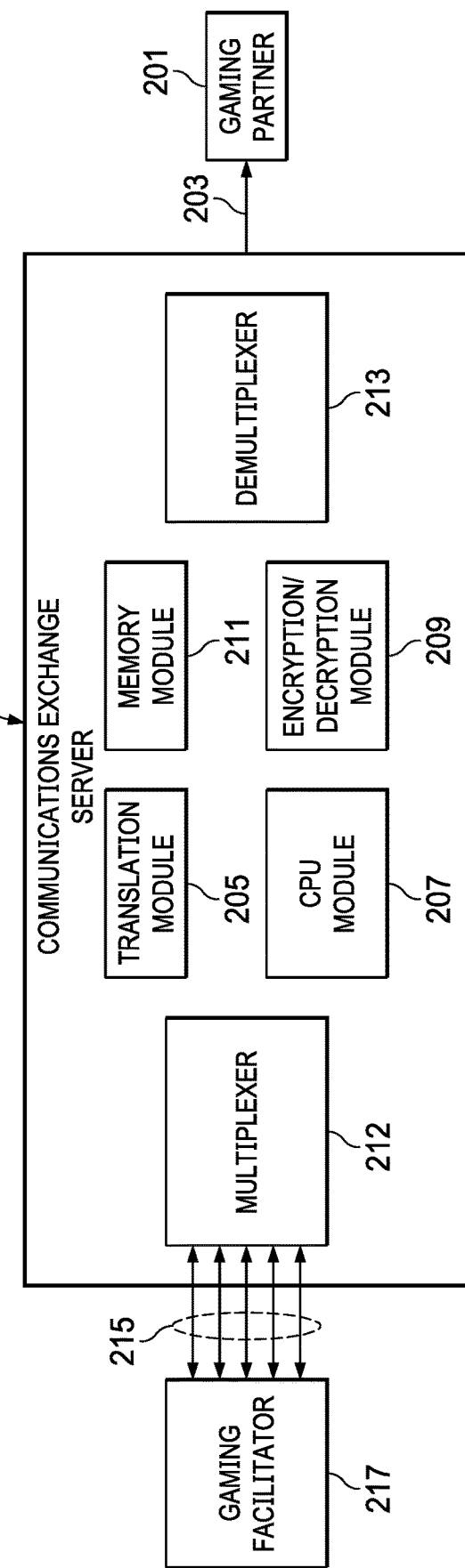
FIG. 2B is a schematic diagram illustrating a communications exchange server, in accordance with some embodiments.

FIG. 2B is a more detailed schematic diagram of a communications exchange server 200 that exchanges communications between a gaming facilitator 217 and a gaming partner 201. The device 200 may include a translation module 205, encryption and decryption module 209, memory module 211, processing (CPU) module 207, multiplexer 212, and demultiplexer 213. The translation module 205 may translate communications between a gaming facilitator 217 and a gaming partner 201 by translating between a communication protocol used by the gaming partner 201 (e.g., a proprietary format of the gaming partner 201) and a communication protocol used by the gaming facilitator 217 (e.g., a proprietary format of the gaming facilitator 217). The encryption and decryption module 209 may encrypt and/or decrypt communications 215 between the gaming facilitator 217 and gaming partner 201. For example, data arriving at connection 215 from the gaming facilitator 217 may be encrypted. The encryption and decryption module 209 may decrypt the data such that it can be processed by the communications exchange server at the processor 207. Encryption keys may be used and may be updated at arbitrary times. Further, it may be desired that outgoing data at connection 215 to the gaming facilitator 217 or at connection 203 to the gaming partner 201 be encrypted before it is sent. Accordingly, the encryption and decryption module 209 may encrypt the data according to encryption protocols used by the gaming partner 201 and/or gaming facilitator 217. The memory module 211 may store information from the communications 203, 215 between the gaming facilitator 217 and gaming partner 201. The memory module 211 may also store gaming information. In an embodiment, the memory module 211 is a cache for storing gaming information and Bank Information. The cache 211 may store non-transaction specific gaming information. The cache 211 may also store game-related logic or a portion of game-related logic. The memory module 211 may also be program memory including logic or instructions accessible by the processor module 207. The processing module 207 may process the communications 203, 215 between the gaming partner 201 and the gaming facilitator 217. The translation module 205, encryption and decryption module 209, memory module 211, and processing module 207 are communicatively connected.

As discussed above, the communications exchange server 200 may be considered as an inbound or an outbound communications server. Inbound communications at connection 215, from one or more gaming partners 201 to gaming facilitator 217 may be multiplexed by the multiplexer 212. Outbound communications at connection 203 from the gaming facilitator 217 to the one or more gaming partners 201 may be demultiplexed by the demultiplexer 213.

FIG. 2B depicts a single translation module 205, memory module 211, CPU module 207, encryption and decryption module 209, and communications exchange server 200 for simplicity purposes only. At any point of connection between a gaming facilitator 217 and a gaming partner 201, multiple communications exchange servers 200 may be used for a variety of reasons including, but not limited to, redundancy, speed or efficiency of the system, failure diagnostics, ease of system upgradeability, system back-ups, network monitoring, etc. Further, each communications exchange server 200 may include multiple of any modules in the server 200. For example, in some embodiments, the communications exchange server 200 includes multiple memory modules 211 and multiple CPU modules 207. The communications exchange server 200 may be made of one or more machines, one or more motherboards, one or more memory modules, etc.

In an embodiment, the communications exchange server 200 is a computer that translates the gaming partner's communication protocol into a gaming facilitator specific protocol, thereby substantially eliminating the exposure of the partner's protocol to an outside entity. A communications exchange server 200 may be placed at a gaming partner's data center, either inside or outside of the gaming partner's firewall depending upon a gaming partner's preference. The communications exchange server 200 connects to gaming facilitator data centers over a gaming facilitator provided connection. In an embodiment, the gaming facilitator provided connection is a high speed, private connection (e.g., an MPLS connection). While this type of connection provides some inherent security, communications to and from the gaming facilitator may be encrypted to provide an additional layer of protection.

Non-transaction specific information (images, game rules, game information, etc.) may be cached on the device 200 in memory module 211, which allows for rapid access to cached data. For transaction specific information, data may be passed from the gaming partner 201 to the communications exchange server 200 which then encrypts the data and passes the request to a gaming facilitator 217 via a gaming facilitator provided connection.

The communications exchange server 200 may be used with a variety of gaming partners 201 including, but not limited to, lottery authorities, banking systems, and other payment systems. Further, the communications exchange server 200 may be located at a gaming partner location or at a gaming facilitator location.

User Registration

In an embodiment, a gaming facilitator system may include a user registration server. The user registration server allows users to register with the gaming facilitator system. Registering may allow users to check to see their play history, set spending limits, to select favorite numbers to be played, and to configure how they wish to be notified of their play status. In an embodiment, users may have an online account with the gaming facilitator system in which they may register, configure and make selections for their account with the gaming facilitator system.

Information identifying the registration of the associated information (the play history, spending limits, favorite numbers, notification configuration, etc) may be stored on the gaming facilitator system or on the mobile device 121 as a part of or in association with a gaming application stored on the mobile device 121.

Play Overview

FIG. 3 is a high-level flow diagram illustrating a process for a gaming system transaction such as a lottery transaction. At action 301, the mobile device 121 obtains the gaming application. The application may be obtained directly or indirectly from the gaming facilitator 125. The gaming application can be obtained at anytime prior to gaming purchase.

The action 301 may be omitted if the mobile device already has the gaming application. For example, the gaming application may be preloaded on the mobile device 121 at the time of purchase of the mobile device 121.

At action 303, the user 101 selects a game type and ticketing option for gaming play. Game types include but are not limited to lottery play including draw, instant, and any other games offered by the jurisdiction's gaming authority. Other games may include location-specific games, such as Keno or Bingo. The jurisdiction's gaming authority may limit the available game types to approved game types. The selecting of ticketing options may include a number of tickets, numbers played, etc.

In some embodiments, the user 101 can select the game type and ticketing options at any time and in any location even prior to entering an approved retail location. In these embodiments, the gaming application may store the selected game type and ticketing options in, for example, a virtual shopping cart to be recalled at a later time to complete the transaction. The gaming application may also record previous selections and favorite selections such as favorite numbers to allow easier selection by the user 101.

At action 305, the end user presses a "ready to play" or checkout button in the mobile application. The game play system 100 verifies the location of the mobile device 121 and facilitates the user 101's gaming purchase using a method such as those described in FIGS. 4A and 4B.

FIG. 4A is a flow diagram illustrating a first exemplary method for verifying the location of the mobile device 121 and facilitating the user 101's gaming purchase.

At action 401, the gaming application prompts the user to scan a barcode at the location. The barcode may be scanned by a peripheral device attached to the mobile device 121 or by the camera 130 of the mobile device 121. The barcode may be a static barcode displayed at the location, for example on a poster or on a gas pump, or a dynamic barcode generated by a device, such as an ATM or a display incorporated in a gas pump, at the location. The barcode may be valid only for a period of time preventing the reuse of an old barcode at another location.

At action 403, the gaming application sends a gaming request including the selected game type and ticketing option along with the scanned barcode information to the gaming facilitator 125 using a mobile network such as Wi-Fi or CDMA/GSM. The scanned barcode information may include the barcode itself as an image file or as information encoded within the barcode that is decoded by the gaming application prior to sending the request.

At action 405, the gaming facilitator 125 processes a location verification of the mobile device 121, checks game availability, play limits and other lottery game play parameters. Location verification can be performed by a variety of means. According to one embodiment, the merchant may be required to be included on a list of pre-approved merchants to vend gaming tickets at the location. This list can be maintained by an appropriate authority, such as a facilitator or gaming authority. The gaming facilitator 125 cross-references the scanned barcode information to determine if the scanned barcode information corresponds with the location. The gaming facilitator 125 may also cross-reference a period of validity associated with the scanned barcode information to confirm that the scanned barcode is a recent and valid barcode.

According to another embodiment, location verification can be performed by other technology within the mobile device, such as GPS or radio tower triangulation. Ultimately, most gaming facilitators will need to take sufficient steps to confirm that the purchaser of the tickets is physically located within the jurisdiction of the gaming authority to avoid any legal complications associated with selling gaming tickets outside of the jurisdiction of the gaming authority.

At action 407, the gaming facilitator 125 processes transaction payment through, for example, an integrated standardized ticketing system with eWallet platforms or a direct gateway to payment processing partners. The mobile application may also process payment using other methods at a retail location, such as through the use of a Near Field Communications (NFC) Transaction Anchor Point (TAP). In some embodiments, the gaming facilitator 125 communicates with the payment processing partners to obtain payment.

FIG. 4B is a flow diagram illustrating a second exemplary method for verifying the location of the mobile device 121 and facilitating the user 101's gaming purchase.

At action 451, the gaming application sends a gaming request including the selected game type and ticketing option to the gaming facilitator 125 using a mobile network such as Wi-Fi or CDMA/GSM. The gaming request is identifiable based on content or a reference identifier assigned by the gaming application or the gaming facilitator 125. Thus, communication between the mobile device 121 and the gaming facilitator 125 may be one or two way. Note that as explained below, this step is optional in some embodiments.

At action 453, the gaming application generates a barcode encoding the reference identifier and displays the barcode on the display 133.

At action 455, the user presents the displayed barcode to a terminal at the location. The terminal may be, for example, an ATM machine, a gas pump, or a stand alone device. The terminal reads the barcode displayed on the mobile device 121 and sends a notification to the gaming facilitator 125 that the barcode was read at the location. The terminal may send an image of the barcode or information encoded by the barcode that is decoded by the terminal.

In another embodiment, the barcode generated by the mobile application includes some or all of the information included in the gaming request, which may reduce the amount of information that is sent from the mobile device 121 to the gaming facilitator 125 with a larger portion of the information in the gaming request then being sent by the terminal that reads and decodes the barcode to the gaming facilitator. In the case where all of the information in the gaming request is encoded in the barcode, it is not necessary for the mobile device 121 to itself send any information to the gaming facilitator 125 (the information being sent by the terminal reading the barcode) nor is the reference identifier needed. The mobile device 121 may also transmit information to the terminal over a short range wireless connection such as WiFi or Bluetooth to reduce the amount of information encoded in the barcode.

At action 457, the gaming facilitator 125 processes a location verification of the terminal if needed or required by the gaming system to verify eligibility of play at the location of the terminal, checks game availability, play limits and other lottery game play parameters.

At action 459, the gaming facilitator 125 processes transaction payment through, for example, an integrated standardized ticketing system with eWallet platforms or a direct gateway to payment processing partners. The mobile application may also process payment using other methods at a retail location, such as through the use of a Near Field Communications (NFC) transaction anchor point (TAP). In some embodiments, the gaming facilitator 125 communicates with the payment processing partners to obtain payment.

Returning now to FIG. 3, at action 307, upon payment authorization, the gaming facilitator 125 sends the ticket request to a computerized gaming system (CGS), such as gaming system 127. The gaming system may use a Random Number Generator (RNG) to produce the gaming play. In an embodiment using a "Virtual Instant Ticket," the RNG may not be used but the purchase will be sent to the CGS for processing and balancing. The gaming system 127, in communication with the gaming facilitator 125, verifies and completes the gaming transaction. According to another embodiment, pre-existing or favorite numbers can be entered or stored in the mobile device 121 or at the gaming facilitator 125. These numbers are sent to the gaming system 127 at step 307.

At action 309, the gaming facilitator 125 sends the gaming transaction information to the Internal Control System (ICS) of the gaming system 127 for independent logging. This action is not always requested and may not be present in some embodiments.

At action 311, the gaming facilitator 125 sends a notification of the purchase status to the gaming application. This notification may include, for example, numbers played, ticket serial number, date of draw, and payment authorization code along with other transaction specific information. In some embodiments the notification includes a numeric redemption code, a scannable barcode such as a QR code, or any other type of redeemable code that can be securely sent to the mobile application along with the notification. The barcode or redemption code can be used after a draw to check and claim winning numbers at an existing gaming/lottery terminal or retail location.

In the case where the transaction was not able to be completed, information notifying of the failure to complete may be sent to the mobile device 121. The notification may include other information associated with the failure, for example, what exception caused the failure.

In some embodiments, automated paperless receipts are provided to indicate numbers and games played. This notification may be sent via multiple methodologies including email, wireless delivery to mobile devices utilizing SMS text or device specific applications, RSS feed, or feeds into Twitter, Facebook or other social media accounts.

The notification may also include an automated remote notification that may be sent to the user 101 indicating play status (winner, winner of a certain amount of money, winner with manual redemption, non-winner, winning numbers, what the winning numbers were if the game was lost, game jackpots, game statistics, and other statistics). Notifications may be sent directly to the user 101 through the gaming application as well as via wireless delivery to a mobile device or email address using, for example, SMS text, email, RSS feed to Twitter, Facebook or other social media account, through device specific apps (i.e. iPhone, BlackBerry, or PDA apps) and, through automated lottery system web sites.

Redemption

When the user 101 wins a game, the user 101 will want to redeem his or her winnings. At action 313, a winner identification interface of the mobile application utilizes transaction data to query data from the gaming facilitator 125 to find winning ticket numbers. The data may be separated into three categories: non-winning tickets, winning tickets available for auto-redemption, and winning tickets available for manual claims. An additional winner verification system that a lottery facilitator may provide may be used by a game administrator to verify the integrity of tickets and to validate that a presented ticket is a winner for items that are manually claimed. The gaming facilitator 125 obtains the queried data from the gaming system 127 and provides it to the mobile application.

At action 315, the mobile application facilitates the redemption of winnings. Redemption may be completed using a variety of methods selected based on, for example, a selection of a preferred method by the user 101 or the amount of the winnings.

As a first example, the mobile application may provide for the display of the barcode received in the notification in connection with action 311. A retail location can then read the barcode to verify the win and provide the winnings.

As a second example, the winnings are automatically deposited to an account associated with the user 101. In some embodiments, the user 101 may tap the mobile device 121 to a NFC TAP to initiate a transfer of funds through financial system 129. An eWallet system may also be accessed for an auto-deposit of winning tickets through a point of sale terminal, debit, and/or credit network to allow for the redemption of winning tickets under a taxable or manually verifiable limit via a pin-less debit card or credit card transaction. A unique terminal number may be used for this transaction, and a pin or card may or may not be used for completion of the transaction.

Figure 5A:
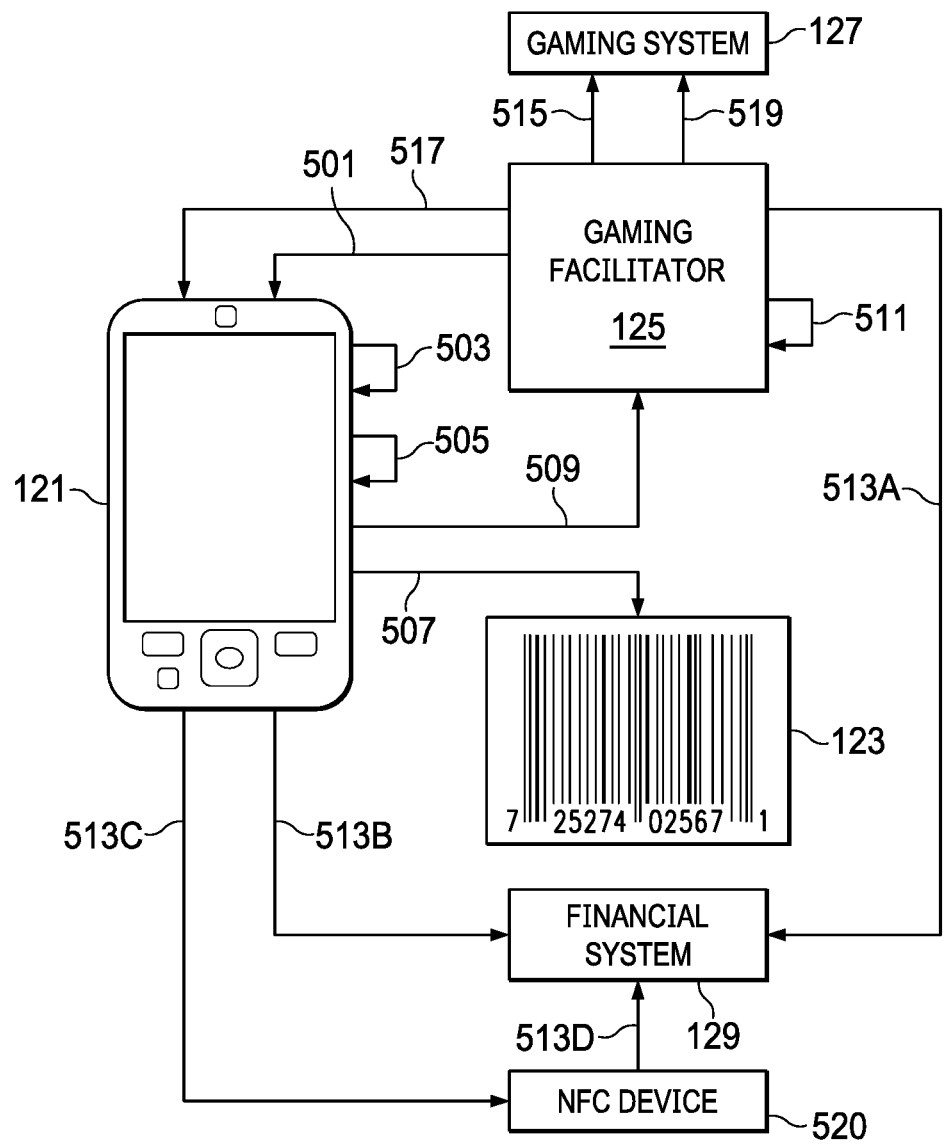
FIGS. 5A and 5B are schematic diagrams illustrating processes for game play, in accordance with some embodiments.

FIG. 5A is a schematic diagram illustrating a process for a game play. At action 501, the mobile device 121 downloads the mobile application from the gaming facilitator 125. At action 503, the user 101 uses the mobile application running on the mobile device 121 to select game play and ticketing options. The user 101 may make the game play and ticketing option selections at anytime prior to entering an approved retail location. At action 505, the user 101 presses a checkout or ready to play button displayed on the mobile device 121. At action 507, the user scans the barcode 123 displayed at the retail location. At action 509, the mobile device 121 sends a request associated with the game play request including the barcode information to the gaming facilitator 125. The request may include an image of the barcode, a value representing information encoded by the barcode, or other information to verify that the user was in a location at which the barcode was displayed.

At action 511, the gaming facilitator 125 verifies the location of the mobile device 121 based on the barcode information provided in the game play request. As mentioned previously, the physical location of the user and the mobile device at the time of the payment transaction can have implications for the legality of the transaction, depending upon the laws of the jurisdiction in which the gaming authority is operating.

At action 513A, the gaming facilitator 125 processes payment authorization through a direct gateway with financial system 129. In other embodiments, payment may be processed directly between the mobile device 121 and the financial system 129 as shown in action 513B. In still other embodiments, payment may be processed by tapping the mobile device 121 to a Near Field Communications (NFC)

Transaction Anchor Point (TAP) 520 as shown in action 513C. In this embodiment, the NFC TAP 520 initiates the payment instruction to the financial system 129, as shown in action 513D.

At action 515, the gaming facilitator 125 sends a ticketing request to the gaming system 127, for example the lottery authority in the jurisdiction, which verifies and completes the gaming transaction.

At action 517, the gaming facilitator 125 sends ticket information and confirmation to the mobile device 121.

At action 519, the gaming facilitator 125 sends gaming processing and balancing information including transaction logs to the gaming system 127.

Figure 5B:
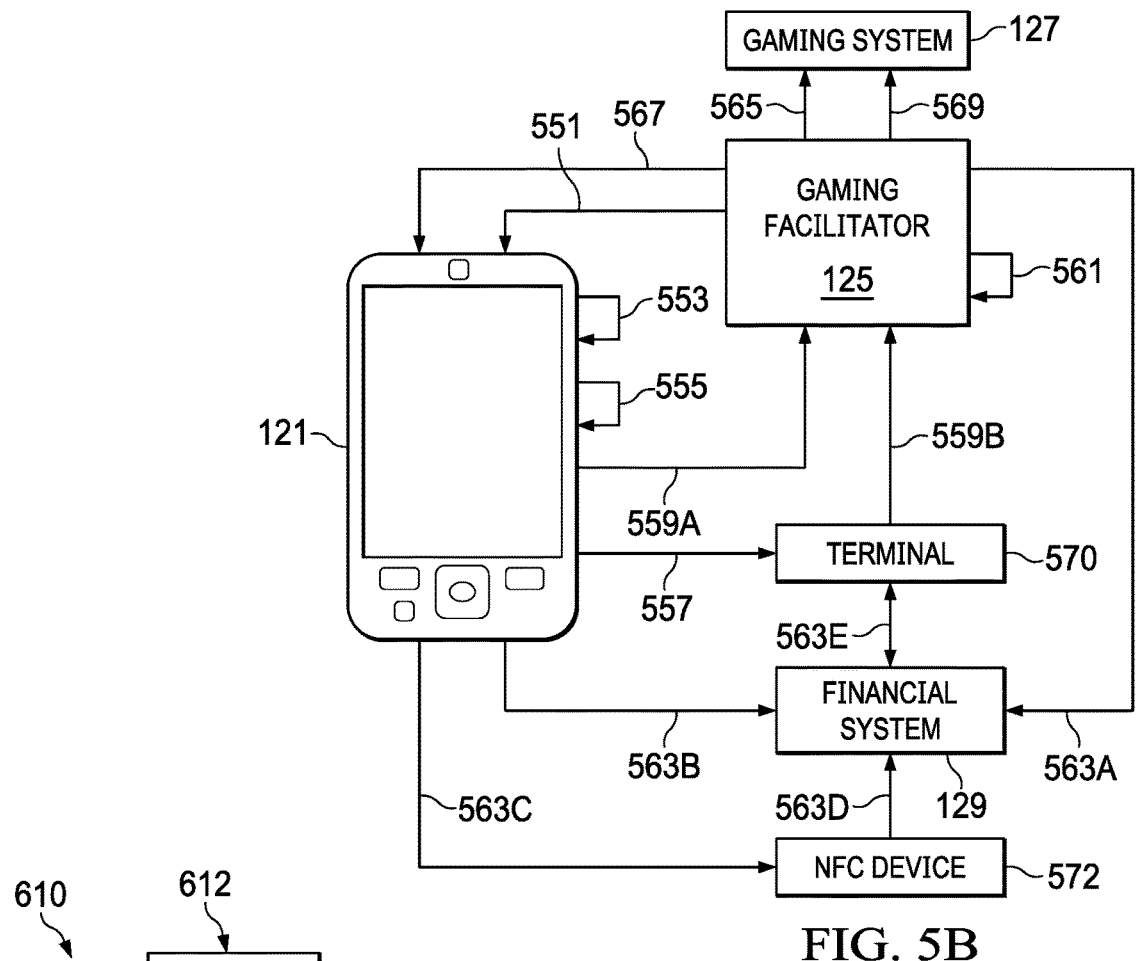

FIG. 5B is a schematic diagram illustrating a process for a game play. At action 551, the mobile device 121 downloads the mobile application from the gaming facilitator 125. At action 553, the user 101 uses the mobile application running on the mobile device 121 to select game play and ticketing options. The user 101 may make the game play and ticketing option selections at anytime prior to entering an approved retail location. At action 555, the user 101 presses a checkout or ready to play button displayed on the mobile device 121. The mobile application generates a barcode that is displayed on the screen of the mobile device 121. At action 557, the user scans the barcode displayed on the screen of the mobile device 121 at a terminal 570 installed at the retail location. The barcode may encode some or all of the information associated with the game play request. The terminal 570 may be an ATM machine, a gas pump, a stand alone device, etc. At action 559A, the mobile device 121 sends a request associated with the game play request to the gaming facilitator 125. The request may include some or all of the information encoded in the barcode. At action 559B, the terminal 570 sends transaction information to the gaming facilitator 125 informing the gaming facilitator 125 of the transaction with the mobile device 121. The transaction information may include some or all of the information encoded by the barcode. The request may include an image of the barcode, a value representing information encoded by the barcode, or other information to verify that the user was in the location at which the barcode was read.

For example, the barcode may include an identifier number that is preassigned to the mobile device 121 or randomly generated. The mobile device 121 may send the gaming request including all the game play parameters and the identifier number to the gaming facilitator 125. In such an embodiment, the terminal 570 may only send the identifier decoded from the barcode to the gaming facilitator 125. In receipt of this information, the gaming facilitator 125 obtains the game play request information and the information needed to verify that the mobile device 121 was in the same location as the terminal 570. In other embodiments, the mobile application may encode all of the game play request information in the barcode read by the terminal 570. In such an embodiment, it is not necessary that the mobile device 121 sends any information to the gaming facilitator 125 and all of the information needed to obtain the game play request and verify that the mobile device 121 is in the same location as the terminal 570 can be provided to the gaming facilitator 125 by the terminal 570. It will be appreciated that the information transmitted to the gaming facilitator 125 by the mobile device 121 and the terminal 570 may be apportioned between these devices in any of a number of ways and the above discussion is exemplary in nature.

At action 561, the gaming facilitator 125 verifies the location of the mobile device 121 based on the barcode information provided by the terminal 570. As mentioned previously, the physical location of the user and the mobile device at the time of the payment transaction can have implications for the legality of the transaction, depending upon the laws of the jurisdiction in which the gaming authority is operating.

At action 563A, the gaming facilitator 125 processes payment authorization through a direct gateway with financial system 129. In other embodiments, payment may be processed directly between the mobile device 121 and the financial system 129 as shown in action 563B. In still other embodiments, payment may be processed by tapping the mobile device 121 to a Near Field Communications (NFC) Transaction Anchor Point (TAP) 572 as shown in action 563C. In this embodiment, the NFC TAP 572 initiates the payment instruction to the financial system 129, as shown in action 563D. In embodiments where the terminal 570 is capable of performing financial transactions, such as an ATM or a device equipped with a bill reader, the terminal 570 may register the transaction with the financial system 129 at action 563E and accept the payment from the user.

At action 565, the gaming facilitator 125 sends a ticketing request to the gaming system 127, for example the lottery authority in the jurisdiction, which verifies and completes the gaming transaction.

At action 567, the gaming facilitator 125 sends ticket information and confirmation to the mobile device 121.

At action 569, the gaming facilitator 125 sends gaming processing and balancing information including transaction logs to the gaming system 127.

The above-described playing processes allow for gaming purchases such as lottery games on mobile devices while providing the assurances and verification that the sale of the gamine products occurred within the borders of the government regulating the games.

In some embodiments, the gaming facilitator 125 provides a retailer signup program as part of the mobile application. Prior to the sale of gaming (e.g., lottery) tickets a retail location or merchant may be required to be included on a list of pre-approved locations or merchants. This list can be maintained by an authority appropriate to ensure that the geographic location of the retail location or merchant has been confirmed. This could be the gaming facilitator or the gaming authority.

Embodiments of the terminal 570 may include an existing ATM or NFC device at a retailer, a dedicated gaming/lottery device at the retailer, or a device placed in conjunction with a new or existing lottery terminal.

Application Logic

Lottery system logic may reside at a device associated with the lottery system, such as the terminal or the gaming facilitator, within the gaming application on the mobile device, or both at the device and the host.

Figure 6A:
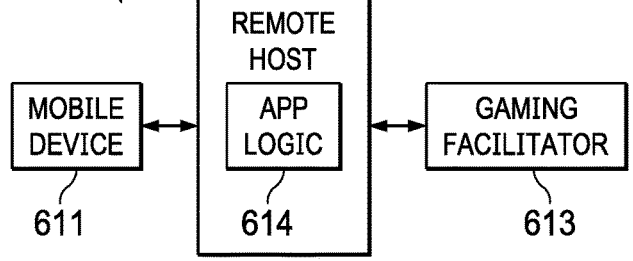
FIGS. 6A, 6B and 6C are schematic diagrams illustrating input systems, in accordance with some embodiments.

FIG. 6A is a schematic diagram illustrating a host-based input system 610. With the host-based terminal 610, the mobile device 611 is a user input/display device. The application logic 614 that determines what happens with each input and provides decision-making for what to display to the user occurs on a remote host 612. The host 612 contains automated lottery system logic and may gather the user input by providing the appropriate screens to the mobile device 611 (for example, to a gaming application running on the mobile device 611) and forwarding the user input to the gaming facilitator 613 either through an intermediary communications exchange server (not shown) or to the gaming facilitator 613 directly.

Figures 6B, 6C:
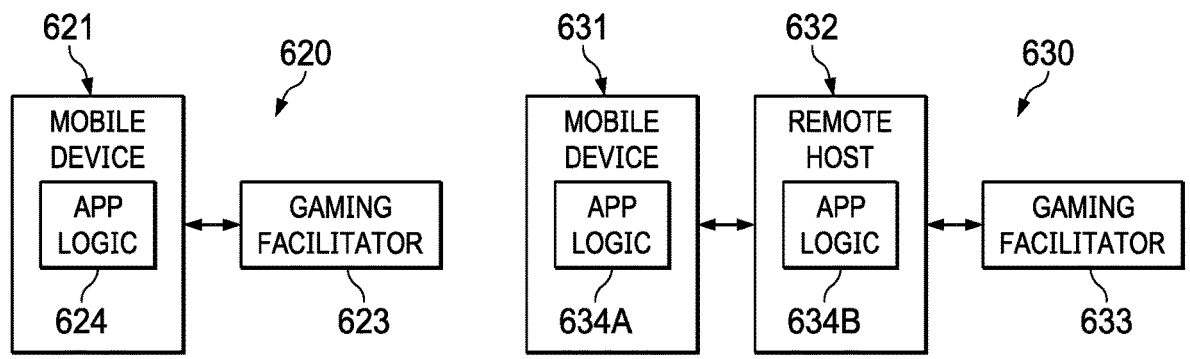

FIG. 6B is a schematic diagram illustrating a terminal-based input system 620. Terminal-based input systems have automated lottery system application logic 624 on the mobile device 621, for example as part of the mobile application stored on the mobile device 621. Accordingly, the mobile device 621 has the ability to walk a user through the game process and may then send the information that the user has selected to a gaming facilitator 623 either through an intermediary communications exchange server (not shown) or to the gaming facilitator directly.

FIG. 6C is a schematic diagram illustrating a hybrid-based input system 630. Hybrid-based input systems have some application logic 634A stored at the mobile device 631, for example as part of the mobile application stored on the mobile device 631, to gather user input and display the game specific parameters, but also rely on some application logic 634B stored at a remote host 632 to control the automated lottery system flow. An example of this is a cell phone with an automated lottery system application where the application on the phone controls the layout of the screen, receives user input, and performs basic validation (e.g., prevents the user from inputting text into numeric fields). But the cell phone may communicate with a host 632 to determine the order of the screens to display. The remote host 632 may communicate with a gaming facilitator 633 either through an intermediary communications exchange server (not shown) or with the gaming facilitator directly.

Figure 7A:
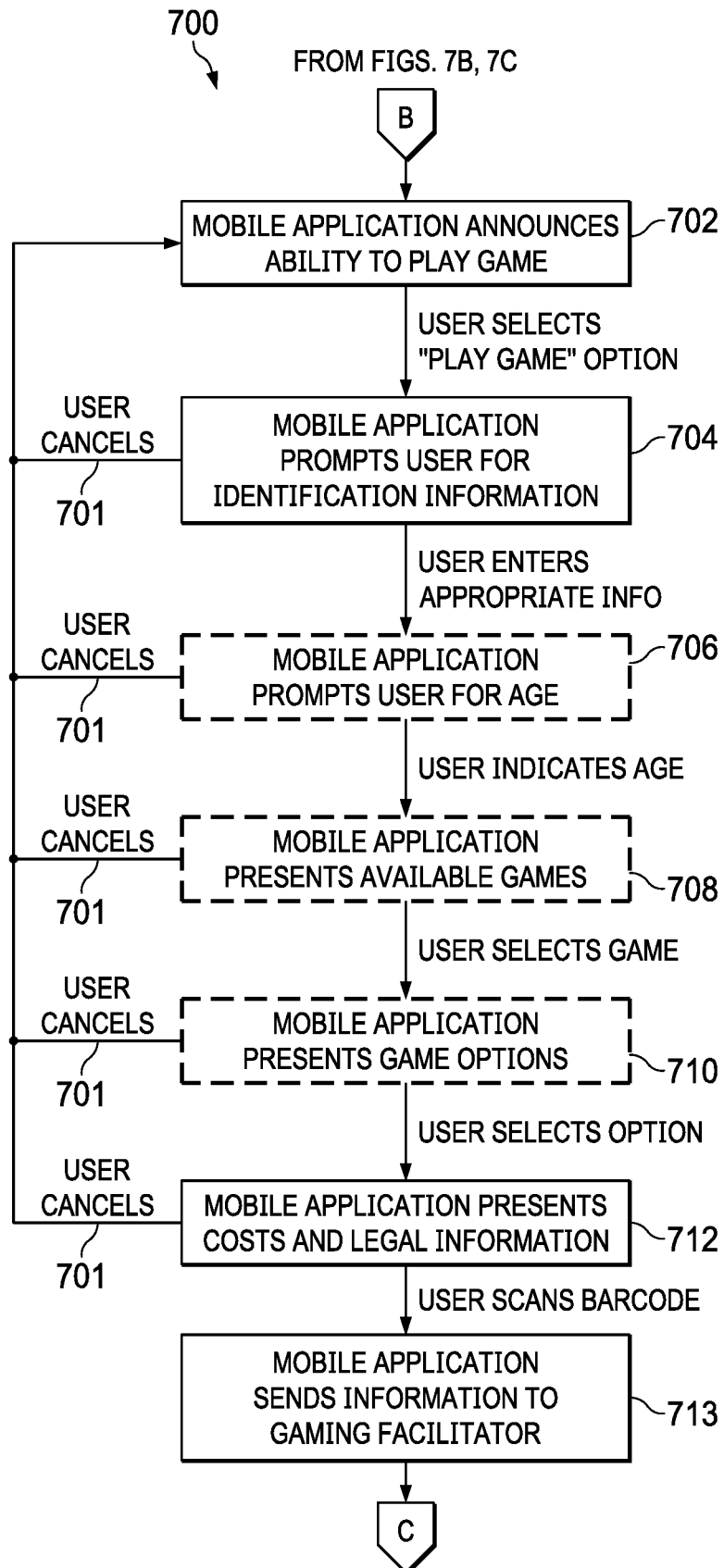
FIGS. 7A, 7B, and 7C are flow diagrams illustrating processes for a mobile application-based play of a lottery system presented game, in accordance with some embodiments.
Figure 7B:
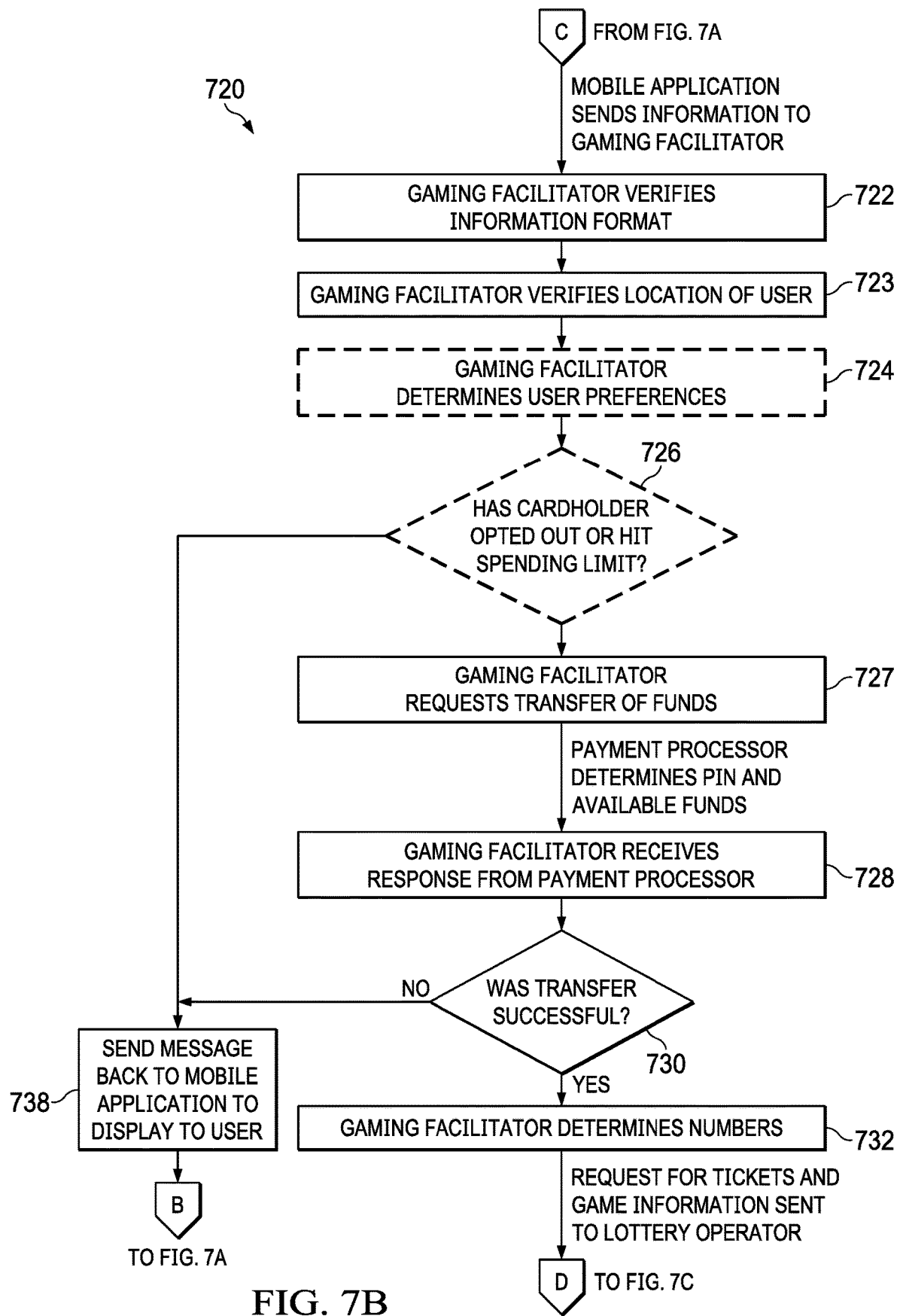
Figure 7C:
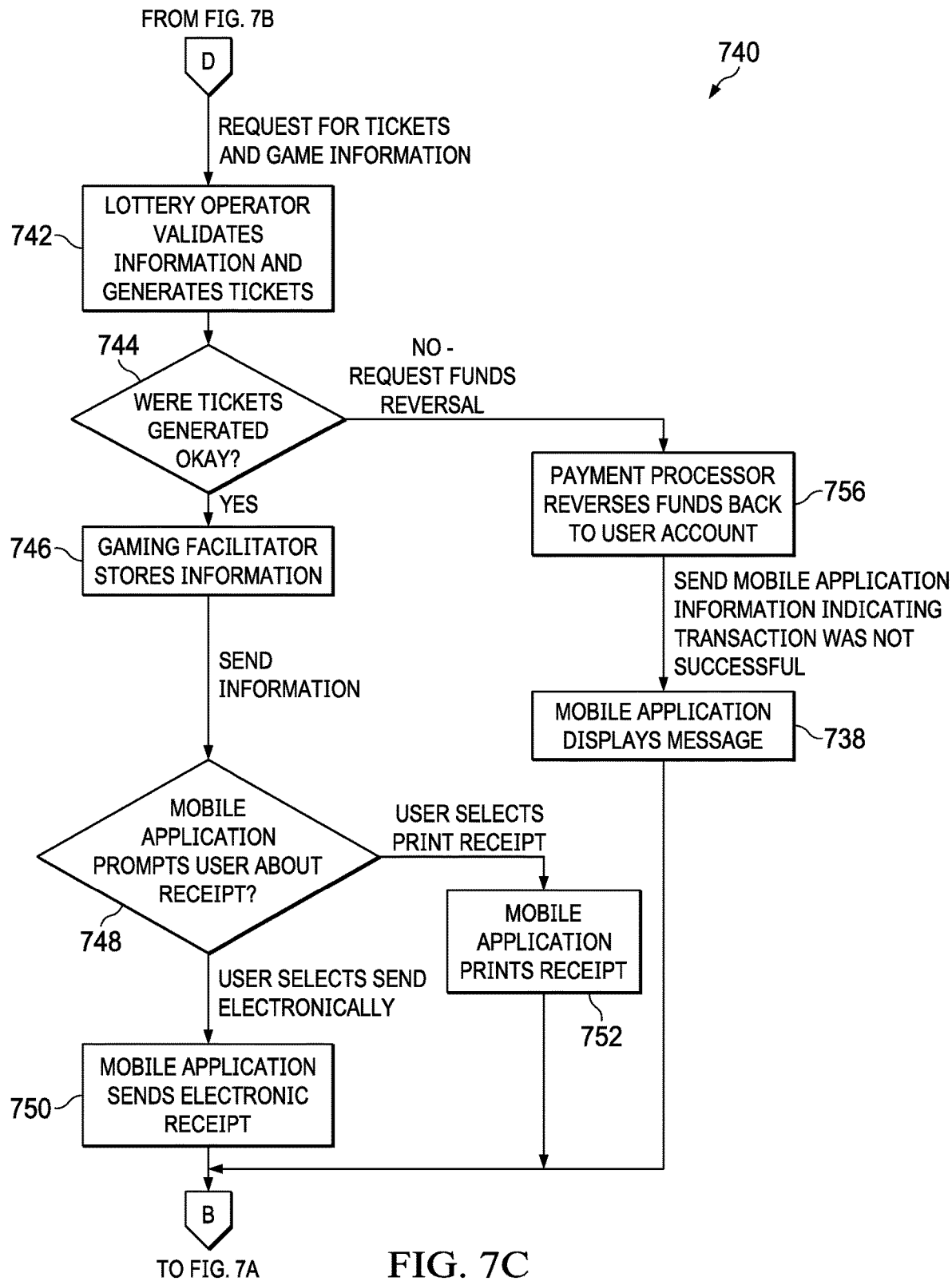

FIGS. 7A, 7B, and 7C are flow diagrams 700, 720, 740 illustrating a process for a mobile application-based play of an lottery system presented game. At action 702, a mobile application announces the ability for a user to play a game. In some embodiments, the mobile application may present a screen indicating that the mobile application is capable of providing game plays to the user. If a user decides to play a game, the mobile application requests that the user input identification information at action 704. For example, the mobile application may ask the user for their preferred language at action 704. For example, the mobile application may request that the user swipe a debit card and enter their debit card pin or provide information regarding an account with an eWallet platform at action 704.

The mobile application may optionally request that the user verify their age at action 706 if the user's age has not been verified by previous input at the mobile application. The mobile application may also optionally present a list of game options available through the mobile application at action 708. The list may include games that will become available at a future time and an indication that those games will be available in the future.

At action 710, the mobile application may present options for the selected game. For example, the mobile application may present the number of tickets available for purchase, game play times available, etc. at action 710. The terminal may also ask the user whether they would like to have their numbers sent to them or a link to their numbers sent to them. The mobile application presents the cost associated with the user's selections as well as any necessary legal disclosures at action 712. At any point in the process, the user may cancel the transaction at action 701.

The user scans a barcode at the retail location, and at action 713, the mobile application sends gaming information collected from the user to a gaming facilitator at action C. The barcode may be static displayed at the retail location on a sign or display or it may be dynamic generated by a terminal device such as an ATM or gas pump. The user may be required to make a selection following a prompt displayed on the terminal to request that the terminal display the barcode. In embodiments where the terminal generates a dynamic (for example random) barcode, the terminal may inform the gaming facilitator and/or gaming authority that the barcode has been generated along with an identifier to identify the barcode. The generated barcode may be valid only for a limited time. Static barcodes may also be valid only for a limited time.

As discussed above, in some embodiments, the mobile application displays the barcode, which is read by a terminal at the retail location at action 713. The terminal then informs the gaming facilitator of the read barcode.

The gaming facilitator may verify information format of the information sent by the terminal at action 722. For example, at action 722, the gaming facilitator may determine whether the information is sufficient and complete for a certain game play. The gaming facilitator may also ensure that the information is not corrupt. The gaming facilitator may also verify a user's age if their driver's license was presented at the terminal. If a driver's license is required by the game, but was not presented at the terminal, the gaming facilitator may cancel the transaction. If the transaction is canceled, the terminal may display a cancel message indicating the reason for the cancellation.

At action 723, the gaming facilitator verifies the location of the user. For example, the gaming facilitator may verify the location of the terminal that generated the barcode by referring to a pre-approval of the terminal with the gaming facilitator and/or the lottery authority. The gaming facilitator may also refer to a list of barcodes that are currently valid.

The gaming facilitator may also confirm the location of the retail location at which the barcode was read in embodiments where the mobile application generates the barcode.

At optional action 724, the gaming facilitator may look up the user to determine preferences for that user. These preferences can include a list of pre-stored or favorite numbers to be used in the game play. Other preferences can include whether the user desires automatic redemption of winning plays, or manual redemption through the delivery of a redemption code to the mobile device 121.

At optional action 726, the gaming facilitator may determine whether the user has opted out of the gaming system, whether the user has already hit their spending limit for a certain time period, etc. If either determination is affirmatively made at optional action 726, then the gaming facilitator sends a message back to the mobile application to display to the user at action 738 and the process may begin again with the same or a new user at action B. If the determination is not affirmatively made at optional action 726, then the process continues.

At action 727, the gaming facilitator may request a transfer of funds for the transaction. For example, the gaming facilitator may request that a payment processor verify the user PIN number, whether enough funds are available in the user account for the transaction, and to transfer the funds. The payment processor determines whether the pin is correct and whether funds are available and sends a response to the gaming facilitator. The gaming facilitator receives the response from the payment processor at action 728. The response may include, for example, verification from the payment processor whether the PIN is correct, whether funds are available, and/or whether the funds were transferred. If the gaming facilitator receives verification that the PIN is correct, that sufficient funds are available, and that the funds have been transferred at action 730, the gaming facilitator generates random numbers or uses user-specified numbers for the game play at action 732. If the gaming facilitator receives notification that the PIN is incorrect, that sufficient funds are not available, or that the funds were not transferred at action 730, the gaming facilitator sends a message back to the terminal to display to the user at action 738 and the process may begin again with the same or a new user at action A. A request for the desired number of tickets and games along with game information is sent by the gaming facilitator to the lottery operator at action D.

The lottery operator validates information received from the gaming facilitator and generates tickets if the information is validated at action 742. The gaming facilitator determines whether the tickets were generated correctly at action 744. If the tickets were not generated correctly, the gaming facilitator requests a funds reversal to the payment processor, and the payment processor may reverse the funds back to the user account at action 756. The gaming facilitator sends a message back to the mobile application to display to the user at action 738 and the process may begin again with the same or a new user at action B. If the tickets were generated correctly, the gaming facilitator will store game play information at action 746. The gaming facilitator sends to the terminal game play numbers, transaction numbers, and a confirmation of the transaction. The mobile application may prompt the user to indicate whether to receive a receipt electronically or obtain a barcode for use in redeeming winnings at action 748. If the mobile device is equipped with a printer or configured to access a printer, the mobile application may prompt the user to indicate whether to receive a printed receipt. If the user selects to print the receipt, the terminal prints the receipt at action 752 and the process may begin again with the same or a new user at action B. If the user selects to receive the receipt electronically, the terminal gathers user information and sends the electronic receipt at action 750. The process may begin again with the same or a new user at action B.

Host-based mobile applications are mobile applications that receive instructions from a host instead of having internal local logic. Accordingly, a process for a host-based play of a lottery system presented game is slightly different than the mobile application-based play. A host-based terminal is connected to a host from the beginning of a transaction or at each step requiring new information between user actions, whereas a mobile application-based terminal might connect to the host or to a gaming facilitator after certain decisions and actions are taken by a user during a transaction. Being connected earlier allows the host-based mobile application to query a gaming facilitator database for information about the user at an earlier time in the transaction. This is also the case for mobile application-based play flow where the mobile application has a substantially constant connection such as with a network connection like Wi-Fi or CDMA/GSM.

Figure 8A:
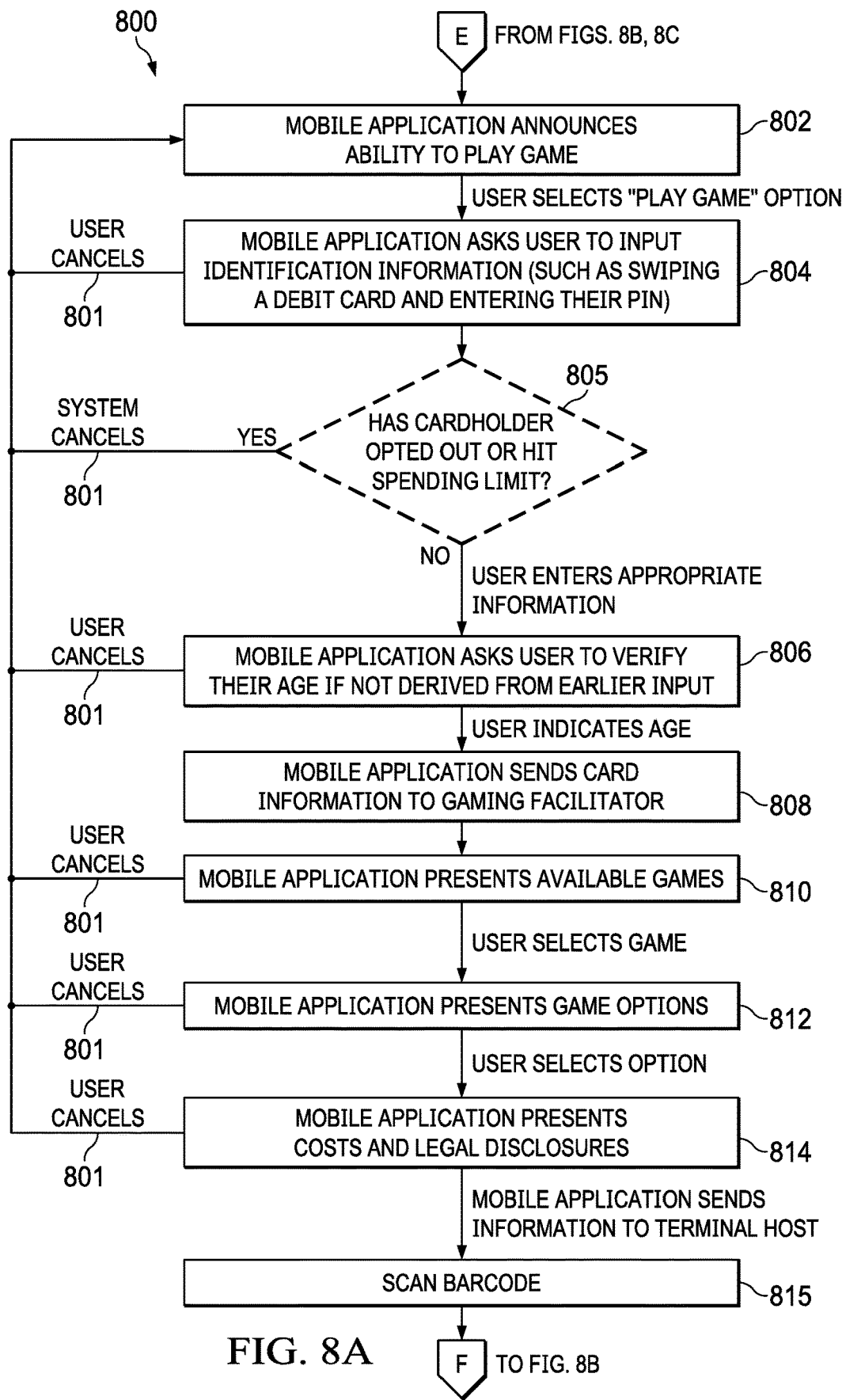
FIGS. 8A, 8B, and 8C are flow diagrams illustrating processes for a host-based play and mobile application-based play where the mobile application has a substantially constant connection of an automated lottery system presented game, in accordance with some embodiments.
Figure 8B:
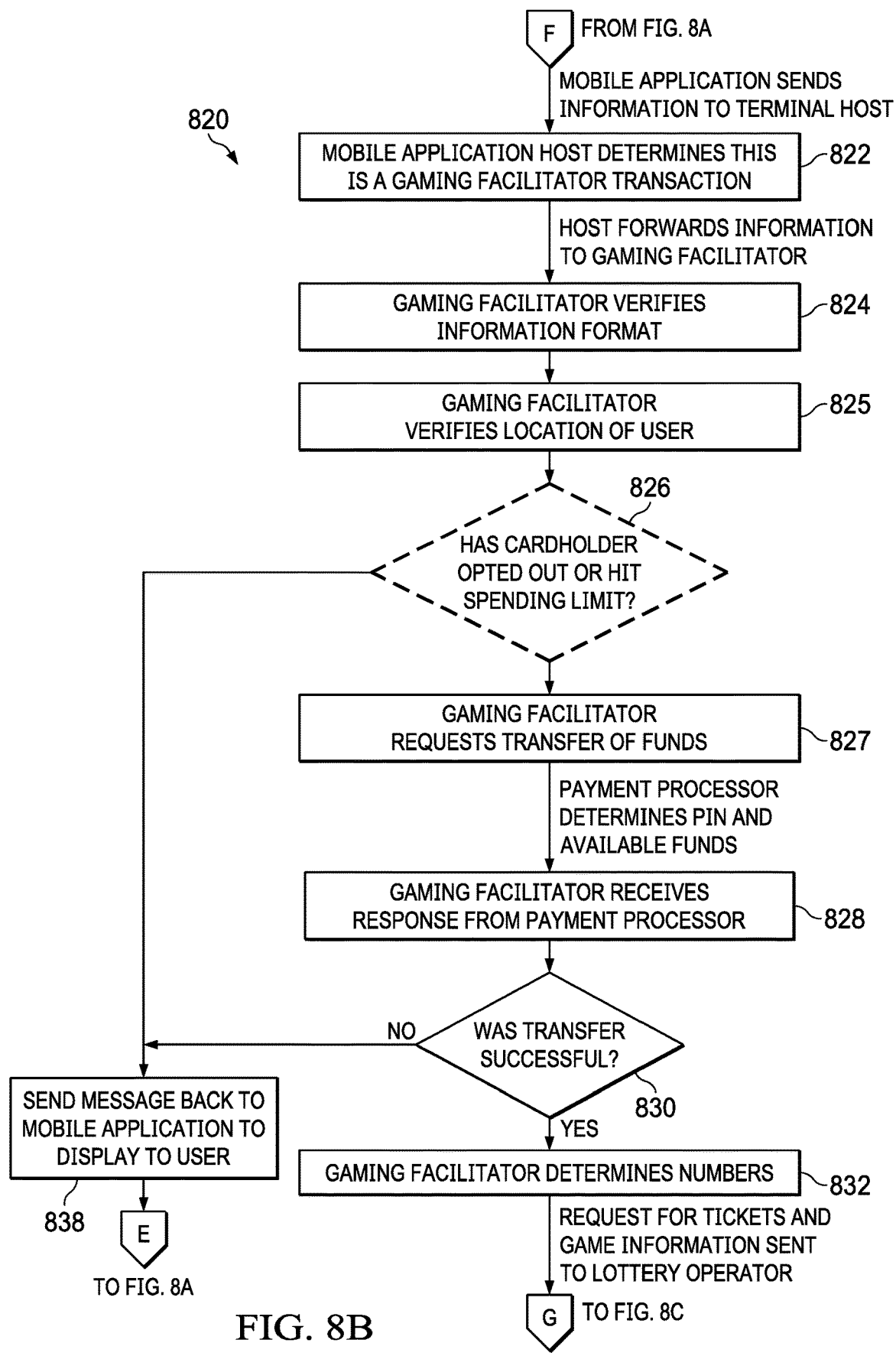
Figure 8C:
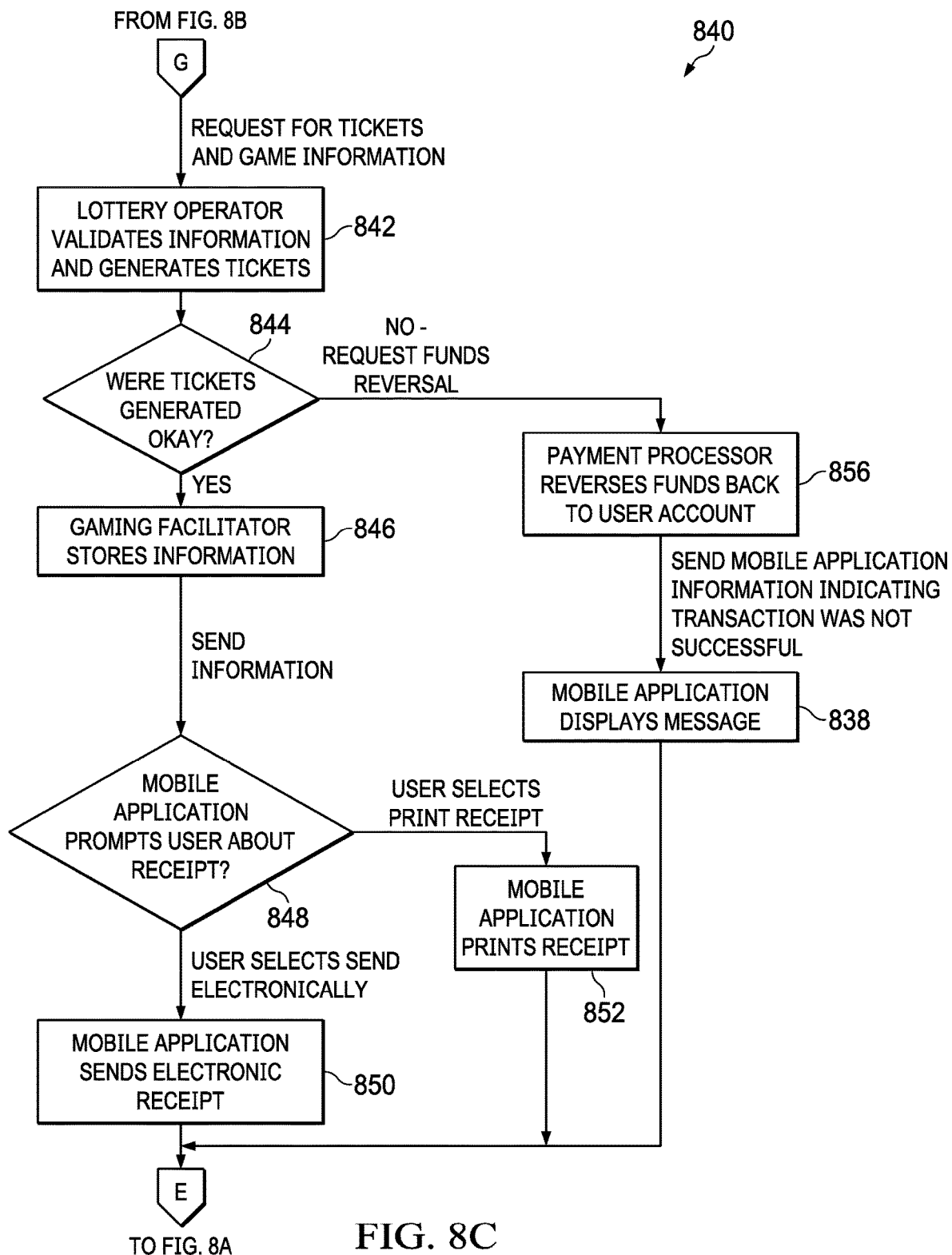

FIGS. 8A, 8B, and 8C are flow diagrams 800, 820, 840 illustrating a process for a host-based play (and mobile application-based play where the mobile application has a substantially constant connection) of an automated lottery system presented game. At action 802, a mobile application announces the ability for a user to play a game. For example, the mobile application may present a screen indicating that the mobile application is capable of providing game plays to the user. If a user decides to play a game, the mobile application requests that the user input identification information at action 804. In some embodiments, the mobile application may ask the user for their preferred language at action 804. In some embodiments, the mobile application may request that the user swipe a debit card and enter their debit card pin or provide information regarding an account with an eWallet platform at action 804.

In an embodiment, at optional action 805, the gaming facilitator may determine whether the user has opted out of the automated gaming system, whether the user has already hit their spending limit for a certain time period, etc. If either determination is affirmatively made at optional action 805, then the gaming facilitator system cancels the transaction at action 801. The system may send a message back to the mobile application to display to the user and the process may begin again with the same or a new user at action E. If the determination is not affirmatively made at optional action 805, then the process continues at action 806.

The mobile application also requests that the user verify their age at action 806 if the user's age has not been verified by previous input at the terminal. The mobile application sends card information to a gaming facilitator (via a mobile device) at action 808 to determine whether the user is a registered user. The mobile application may present a list of game options available at the user's location at action 810. The list may include games that will become available at a future time and an indication that those games will be available in the future. At action 812, the mobile application may present options for the selected game. For example, the mobile application may present the number of tickets available for purchase, game play times available, etc. at action 812. The mobile application may also ask the user whether they would like to have their numbers sent to them or a link to their numbers sent to them. The mobile application presents the cost associated with the user's selections as well as any necessary legal disclosures at action 814. At any point in the process, the user may cancel the transaction at action 801.

The user scans a barcode at the retail location, and at action 815, the mobile application sends gaming information collected from the user to a terminal host at action F. The barcode may be static displayed at the retail location on a sign or display or it may be dynamic generated by a terminal device such as an ATM or gas pump. The user may be required to make a selection following a prompt displayed on the terminal to request that the terminal display the barcode. In embodiments where the terminal generates a dynamic (for example random) barcode, the terminal may inform the gaming facilitator and/or gaming authority that the barcode has been generated along with an identifier to identify the barcode. The generated barcode may be valid only for a limited time. Static barcodes may also be valid only for a limited time.

As discussed above, in some embodiments, the mobile application displays the barcode, which is read by a terminal at the retail location at action 815. The terminal then informs the gaming facilitator of the read barcode.

At action 822, a terminal host determines based on the information sent from the mobile application that the transaction is a gaming facilitator transaction. The host may forward the information to the gaming facilitator. The gaming facilitator may verify information format of the information sent by the mobile application at action 824. For example, at action 824, the gaming facilitator may determine whether the information is sufficient and complete for a certain game play. The gaming facilitator may also ensure that the information is not corrupt. The gaming facilitator may also verify a user's age if their driver's license was presented at the terminal. If a driver's license is required by the game, but was not presented at the terminal, the gaming facilitator may cancel the transaction. If the transaction is canceled, the terminal may display a cancel message indicating the reason for the cancellation.

At action 825, the gaming facilitator verifies the location of the user. For example, the gaming facilitator may verify the location of the terminal that generated the barcode by referring to a pre-approval of the terminal with the gaming facilitator and/or the lottery authority. The gaming facilitator may also refer to a list of barcodes that are currently valid.

The gaming facilitator may also confirm the location of the retail location at which the barcode was read in embodiments where the mobile application generates the barcode.

In an embodiment, at optional action 826, the gaming facilitator may look up the user to determine preferences for that user. At action 826, the gaming facilitator may determine whether the user has opted out of the gaming system, whether the user has already hit their spending limit for a certain time period, etc. If either determination is affirmatively made at action 826, then the gaming facilitator sends a message back to the mobile application (e.g., via the mobile device) host to display to the user at action 838 and the process may begin again with the same or a new user at action E. If the determination is not affirmatively made at action 826, then the process continues.

At action 827, the gaming facilitator may request a transfer of funds for the transaction. For example, the gaming facilitator may request that a payment processor verify the user PIN number, whether enough funds are available in the user account for the transaction, and to transfer the funds. The payment processor determines whether the pin is correct and whether funds are available and sends a response to the gaming facilitator. The gaming facilitator receives the response from the payment processor act action 828. The response may include, for example, verification from the payment processor whether the PIN is correct, whether funds are available, and/or whether the funds were transferred.

The gaming facilitator receives verification from the payment processor whether the PIN is correct, whether funds are available, and/or whether the funds were transferred at action 828. If the gaming facilitator receives verification that the PIN is correct, that sufficient funds are available, and that the funds have been transferred at action 830, the gaming facilitator generates random numbers or uses user-specified numbers for the game play at action 832. If the gaming facilitator receives notification that the PIN is incorrect, that sufficient funds are not available, or that the funds were not transferred at action 830, the gaming facilitator sends a message back to the terminal (e.g., via the terminal host) to display to the user at action 838 and the process may begin again with the same or a new user at action E. A request for the desired number of tickets and games along with game information is sent by the gaming facilitator to the lottery operator at action G.

The lottery operator validates information received from the gaming facilitator and generates tickets if the information is validated at action 842. The gaming facilitator determines whether the tickets were generated correctly at action 844. If the tickets were not generated correctly, the gaming facilitator requests a funds reversal to the payment processor, and the payment processor may reverse the funds back to the user account at action 856. The gaming facilitator sends a message back to the terminal to display to the user at action 838 and the process may begin again with the same or a new user at action E. If the tickets were generated correctly, the gaming facilitator will store game play information at action 846. The gaming facilitator sends to the terminal (e.g., via the terminal host) game play numbers, transaction numbers, and a confirmation of the transaction. The terminal may prompt the user to indicate whether to print a receipt at the terminal or receive a receipt electronically at action 848. If the user selects to print the receipt, the terminal prints the receipt at action 852 and the process may begin again with the same or a new user at action E. If the user selects to receive the receipt electronically, the terminal gathers user information and sends the electronic receipt at action 850. The process may begin again with the same or a new user at action E.

Figure 9:
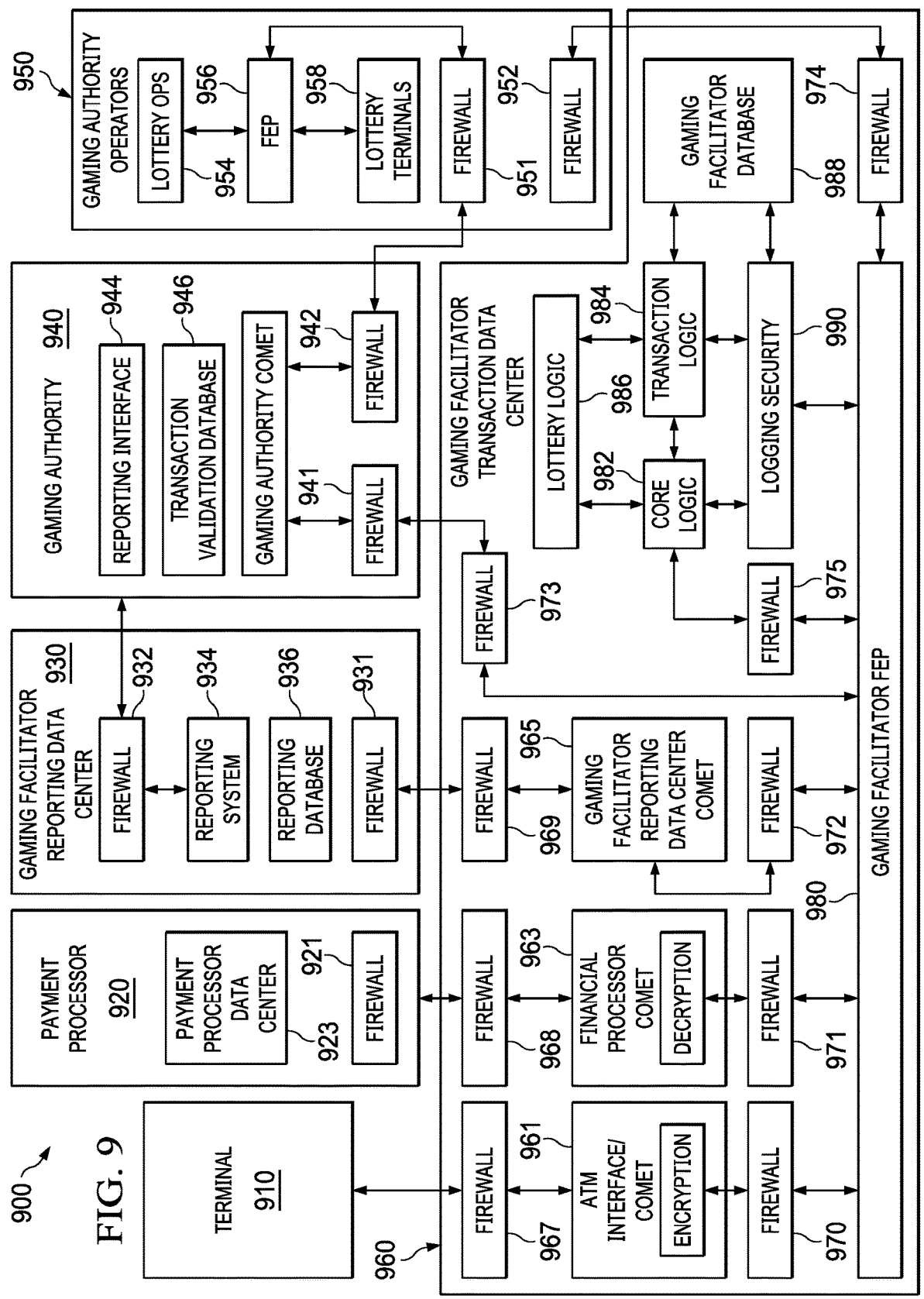
FIG. 9 is a schematic diagram illustrating a gaming facilitator system, in accordance with some embodiments.

FIG. 9 is a schematic diagram illustrating a gaming facilitator system 900. System 900 may include a terminal 910, a payment processor 920, a gaming facilitator reporting data center 930, a gaming authority 940, gaming authority operators 950 and gaming facilitator transaction data center 960.

The gaming facilitator transaction data center 960 is in communication with the terminal 910, the payment processor 920, the gaming facilitator reporting data center 930 and the gaming authority 940. Using alternative connectivity, the gaming facilitator transaction data center 960 may be in communication with the gaming authority operators 950. In some embodiments, the communication with the gaming facilitator transaction data center 950 may be made via communications exchange servers 961, 963 and 965. Firewalls 921, 931, 941, 942, 951, 952 and 967-974 provide isolation between various systems and components in the system 900.

The payment processor 920 may include payment processor data center 923. The payment processor 920 connects with the gaming facilitator transaction data center 960 via a secure connection (e.g., MPLS or other "private" connection) between the firewall 921 at the payment processor 920 and the firewall 968 at the gaming facilitator transaction data center 960.

The gaming facilitator reporting data center 930 may include reporting system 934 and reporting database 936. The gaming facilitator reporting data center 930 connects with the gaming facilitator transaction data center 960 via a secure connection (e.g., MPLS or other "private" connection) between the firewall 931 at the gaming facilitator reporting data center 930 and the firewall 969 at the gaming facilitator transaction data center 960.

The gaming authority 940 may include a reporting interface 944 and a transaction validation database 946. The gaming authority 940 connects with the gaming facilitator transaction data center 960 via a secure connection (e.g., MPLS or other "private" connection) between the firewall 941 at the gaming authority 940 and the firewall 973 at the gaming facilitator transaction data center 960. Also, the gaming authority 940 connects with the firewall 932 of the gaming facilitator reporting data center 930 via a secure connection (e.g., MPLS or other "private" connection.

The gaming authority operators 950 may include a lottery ops (operations) 954, an FEP 956 and lottery terminals 958. The lottery ops 954 is in communication with the FEP 956, which is in communication with the lottery terminals 958. The gaming authority operators 950 connects with the gaming authority 950 via a secure Ethernet connection (e.g., B to B API) between the firewall 942 at the gaming authority 940 and the firewall 951 at the gaming authority operators 950. Alternate connectivity may be provided between the firewall 974 of the gaming facilitator transaction data center 960 and the firewall 952 of the gaming authority operators 950.

The gaming facilitator transaction data center 960 may include a gaming facilitator FEP 980, core logic 982, transaction logic 984, lottery logic 986, a gaming facilitator database 988 and logging security 990. The core logic 982, the transaction logic 984 and the lottery logic 986 are in communication with one another. The core logic 982 is in communication with the gaming facilitator FEP 980 through firewall 975. The gaming facilitator database 988 is in communication with the transaction logic 984. The logging security 990 is in communication with the gaming facilitator 980, the core logic 982, the transaction logic 984 and the gaming facilitator database 988.

It will be appreciated that the above discussion of a ticket, a gaming ticket, a lottery ticket, etc is not limited to a particular type of ticket or transaction and the embodiments described above are applicable to all types of electronically facilitated transactions including, among other things, e-ticketing, the sale of e-tickets, etc.

Figure 10:
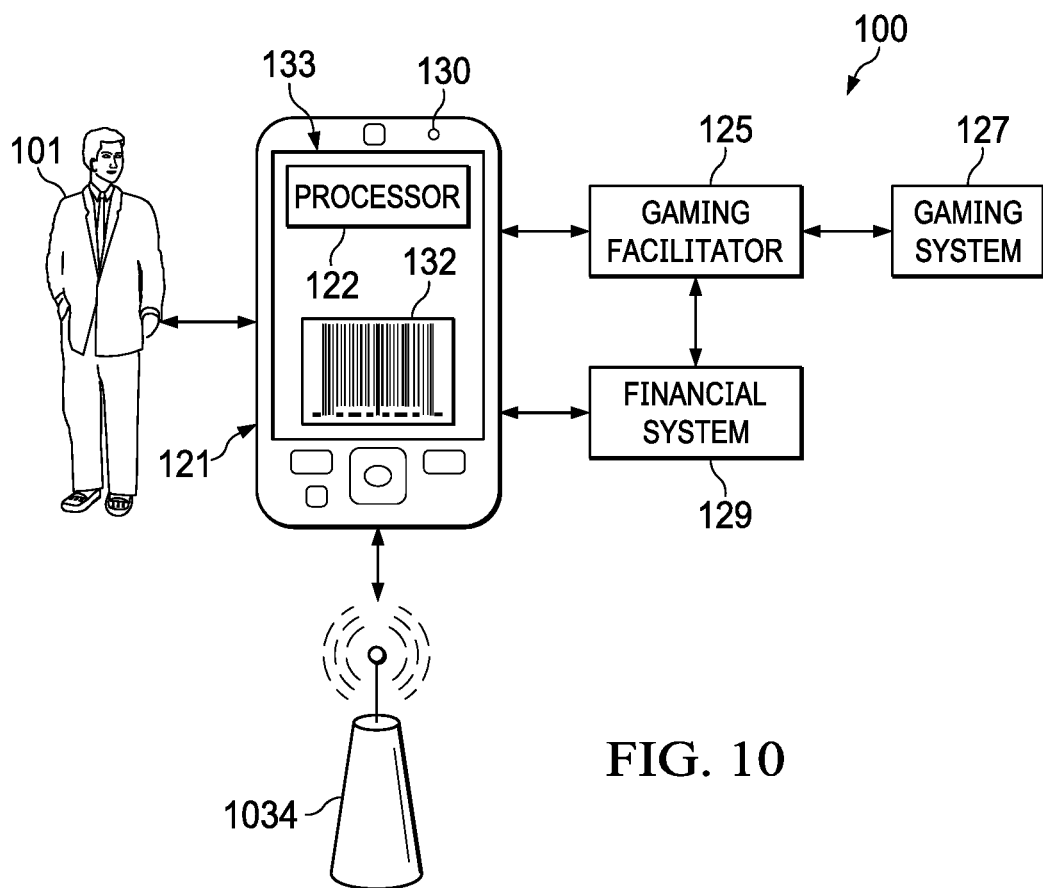
FIG. 10 is a schematic diagram illustrating another game play system, in accordance with some embodiments.

Referring now to FIG. 10, in some embodiments, the device 121 (either a mobile device or a non-mobile device) comprises a first communication interface for communicating with a game-playing terminal 1034. In some embodiments, the game-playing terminal 1034 may be at a gas station. For example, the game-playing terminal 1034 may be integrated into a gas pump or be near a gas pump. Additionally or alternatively, the game-playing terminal 1034 may be located in a store in the gas station. Additionally or alternatively, the game-playing terminal 1034 may be a point-of-sale device, a kiosk, an ATM machine, a coupon terminal, an arcade game-playing machine, a vending machine, etc. In some embodiments, the device 121 may comprise or be comprised in a motor vehicle. The first communication interface comprises a Bluetooth Low Energy (BLE) interface. The game-playing terminal 1034 may be either an electronic or non-electronic terminal and may transmit a code to the device 121 over the first communication interface. Codes from the game-playing terminal 1034 may be transmitted continuously or during certain periods of time (e.g., when activated). A code transmitted from the game-playing terminal 1034 may be a unique identifier for the game-playing terminal 1034. The reception of the code by the device 121 and/or the transmission of the code by the game-playing terminal 1034 may be referred as a transaction conducted between the device 121 and the game-playing terminal. Once the code is received by the device 121, the device 121 sends a request to at least one of the gaming facilitator 125 or the financial system 129. The request may be sent via a second communication interface (e.g., a Wi-Fi or cellular interface). The second communication interface may be associated with longer range communication compared to the first communication interface. The request may be processed based on the location of the device 121 associated with conducting the transaction or sending the request being an approved location associated with the game. The request may be processed by at least one of the device 121, the game-playing terminal 1034, the gaming facilitator 125, or the financial system 129. The location may be determined by the device 121, by the game-playing terminal 1034, by the gaming facilitator 125, or the financial system 129. In some embodiments, the location of the device 121 may be determined using GPS coordinates of the device 121. Multi-factor authentication may be used to determine the location of the device 121. For example, the location of the game-playing terminal 1034 (e.g., the identity of the game-playing terminal 1034) may be used along with the GPS coordinates of the device 121 to determine the location of the device 121.

In some embodiments, the device 121 receives a request from a user of the device. The request may be a game-playing request or a game-purchasing request. Either request may be associated with a mobile game-playing application.

In some embodiments, the mobile game-playing application is initiated on the device 121 upon detecting the presence of the game-playing terminal 1034 within the proximity of the device 121 (e.g., upon detecting a code received at the device 121 from the game-playing terminal 1034). In some embodiments, the device 121 may be configured to prompt a user to play a game on the mobile device in response to determining the device 121 is within a threshold distance (e.g., radius) of the game-playing terminal 1034. In some embodiments, the request transmitted via the second communication interface may comprise at least one of the request received from the user of the device or the code received from the game-playing terminal 1034. In some embodiments, the request is processed (e.g., approved) based on determining a period of validity associated with the code received from the device 121 has not expired. In some embodiments, the request is further processed (e.g., further approved) based on determining a gaming authority associated with the game, and determining the user is located in an approved jurisdiction associated with the gaming authority for the game.

Figure 11:
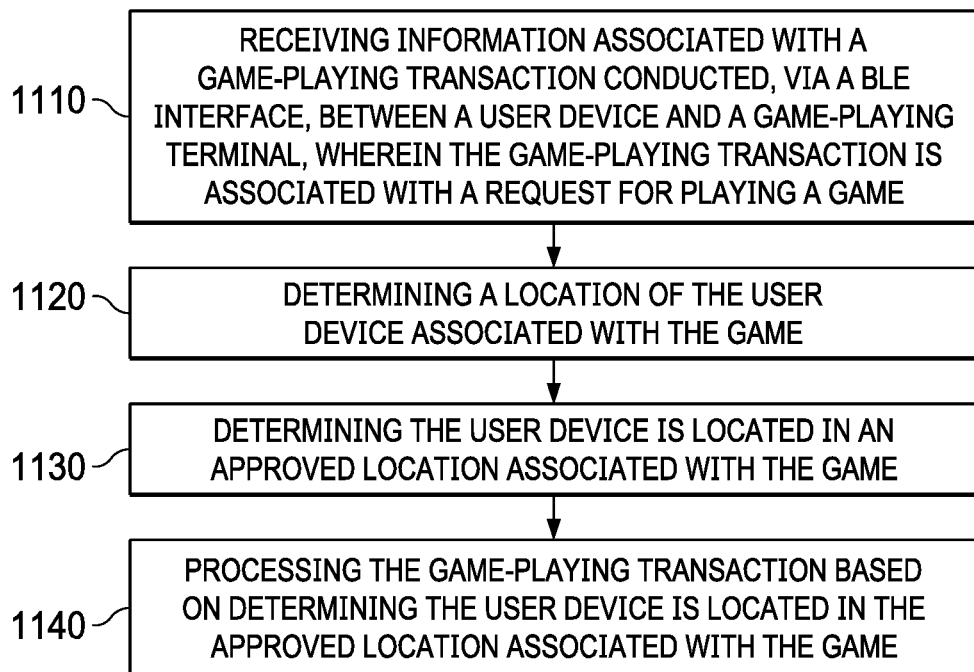
FIG. 11 is a flow diagram illustrating a method for processing game-playing transactions, in accordance with some embodiments.

Referring now to FIG. 11, FIG. 11 presents a method for processing game-playing transactions. At block 1110, the method comprises receiving (e.g., on a second communication interface) information (e.g., from a user device) associated with a game-playing transaction conducted (e.g., on a first communication interface), via a BLE interface, between a user device and a game-playing terminal. In some embodiments, a BLE interface may refer to any form or type of Bluetooth technology. A BLE interface is not limited to any particular minimum or maximum communication range. A BLE interface is also not limited to any particular minimum or maximum energy. In some embodiments, both the first communication interface and the second communication interface may be the same communication interface such that the information is received via the same communication interface on which the game-playing transaction is conducted. The game-playing transaction is associated with a request for playing a game. At block 1120, the method comprises determining a location of the user device associated with the game. In some embodiments, the location of the user device is determined by at least one of the user device, the game-playing terminal, or the device that receives (e.g., from the user device) information associated with the game-playing transaction. At block 1130, the method comprises determining the user device is located in an approved location associated with the game. This determination may be made by the user device or by the device that receives the information associated with the game-playing transaction. At block 1140, the method comprises processing (e.g., approving) the game-playing transaction based on determining the user device is located in the approved location associated with the game. In some embodiments, processing the game-playing transaction is based on determining an identity of the merchant or game-playing terminal associated with the location of the user device or the game-playing terminal. Once the identity of the merchant or game-playing terminal is determined, the game-playing transaction is approved based on determining the identified merchant or game-playing terminal is on a list of approved merchants or game-playing terminals. In some embodiments, the game-playing terminal (or the merchant) may be identified by accessing a correlation matrix and looking up a corresponding merchant (or game-playing terminal).

In some embodiments, a method is provided for processing game-playing transactions. The method comprises:

receiving or sending information associated with a game-playing transaction between a user device and a game-playing apparatus, wherein the game-playing transaction is associated with a game; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location matches the second location information or identification information, or determining a period of validity associated with the information has not expired, wherein the game-playing transaction is conducted on a first communication interface, and wherein the information associated with the game-playing transaction is received or sent on the first communication interface or a second communication interface.

In some embodiments, the identification information comprises merchant information.

In some embodiments, the information associated with the game-playing transaction comprises at least one of game-playing request information, pre game-playing transaction information, post game-playing transaction information, in-game information, game information, user information, location information, user device identification information, game-related information, or game-playing apparatus identification information.

In some embodiments, the game-playing transaction comprises at least one of a gaming transaction, a game purchase transaction, a pre-game transaction, a post-game transaction, an in-game transaction, a game-related transaction, a location determining transaction, a user device identifying transaction, or a game-playing apparatus identifying transaction.

In some embodiments, the location comprises or is determined based on global positioning system (GPS) coordinates of the user device or the game-playing apparatus, or location information or identification information of the game-playing apparatus or the user device.

In some embodiments, the user device comprises a mobile computing device.

In some embodiments, the user device comprises a mobile phone.

In some embodiments, the user device comprises a mobile device, and wherein the game-playing apparatus comprises a remote computing apparatus.

In some embodiments, the information associated with the game-playing transaction is received or sent on the first communication interface.

In some embodiments, the user device comprises a mobile device, and wherein the game-playing apparatus comprises a remote computing apparatus.

In some embodiments, the user device comprises a fuel pump, and wherein the game-playing apparatus comprises a remote server.

In some embodiments, the user device comprises a mobile device, and wherein the game-playing apparatus comprises a local computing apparatus.

In some embodiments, the information associated with the game-playing transaction is received or sent on the first communication interface.

In some embodiments, the information associated with the game-playing transaction is received or sent on the second communication interface.

In some embodiments, the second communication interface is located between the user device and game-playing apparatus.

In some embodiments, the second communication interface is located between the game-playing apparatus and a remote computing apparatus.

In some embodiments, the first communication interface is located between the user device and the game-playing apparatus.

In some embodiments, the second communication interface is located between the user device and the game-playing apparatus.

In some embodiments, the game-playing apparatus comprises a gaming facilitator.

In some embodiments, the game-playing facilitator comprises a firewall, logging security, core logic, and transaction logic.

In some embodiments, the game-playing apparatus comprises a communications exchange server.

In some embodiments, the game comprises a lottery game.

In some embodiments, the game comprises a non-lottery game.

In some embodiments, the game-playing transaction was conducted between the user device and the game-playing apparatus.

In some embodiments, the user device is integrated with a fuel pump.

In some embodiments, the processing the game-playing transaction or enabling initiation or conduction of the game-playing transaction is based on determining the user device or the game-playing apparatus is located in the approved location associated with the game based on cross-referencing second location information or identification information, and determining the location matches the second location information or identification information.

In some embodiments, the processing the game-playing transaction or enabling initiation or conduction of the game-playing transaction is based on determining a period of validity associated with the information has not expired.

In some embodiments, the location information comprises a parameter, and the second location information comprises a second parameter.

In some embodiments, the receiving or sending information is executed before the game-playing transaction between the user device and the game-playing apparatus.

In some embodiments, the receiving or sending information is executed after the game-playing transaction between the user device and the game-playing apparatus.

In some embodiments, the receiving or sending information is executed substantially simultaneously with the game-playing transaction between the user device and the game-playing apparatus.

In some embodiments, the determining the user device or the game-playing apparatus is located in the approved location associated with the game comprises cross-referencing the second location information or identification information, and determining the location matches the second location information or identification information.

In some embodiments, the first communication interface comprises at least one of a Bluetooth interface, a near-field communication (NFC) interface, a code-based interface, a Wi-Fi interface, or a cellular interface.

In some embodiments, the first communication interface and the second communication interface are the same communication interface.

In some embodiments, the location is determined based on global positioning system (GPS) coordinates of the device.

In some embodiments, the user device comprises a non-electronic user device or wherein the game-playing apparatus comprises a non-electronic game-playing apparatus.

In some embodiments, the user device or the game-playing apparatus comprises at least one of a pump, an ATM, a servicing station, a retail station, a local computing apparatus, or a remote computing apparatus.

In some embodiments, the user device or the game-playing apparatus comprises a local computing apparatus and a remote computing apparatus.

In some embodiments, the user device comprises a local computing apparatus and a remote computing apparatus.

In some embodiments, the game-playing apparatus comprises a local computing apparatus and a remote computing apparatus.

In some embodiments, the receiving or sending information comprises receiving or sending information between a second user device and the game-playing apparatus.

In some embodiments, the local computing apparatus comprises a retail station.

In some embodiments, a method is provided for processing game-playing transactions. The method comprises: receiving or sending information associated with a game-playing transaction conducted or to be conducted between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, a method is provided for processing game-playing transactions. The method comprises: receiving or sending information associated with a game-playing transaction conducted or to be conducted between a user device and a game-playing apparatus, wherein the game-playing transaction is associated with a game, wherein the game is associated with or comprises second information; determining a location of the user device or the game-playing apparatus associated with the game-playing transaction; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, the location is consistent with the second location information or identification information when the location matches the second location information or identification information.

In some embodiments, a method is provided for processing game-playing transactions. The method comprises: receiving or sending information associated with a game-playing transaction between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; modifying or configuring the user device or the game-playing apparatus based on the user device or the game-playing apparatus being located in the approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining information associated with the location meets third information (e.g., parameter information), or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, modifying or configuring the user device or the game-playing apparatus comprises modifying or configuring a user interface of the user device or the game-playing apparatus.

In some embodiments, modifying or configuring the user device or the game-playing apparatus comprises modifying or configuring a hardware element of the user device or the game-playing apparatus.

In some embodiments, modifying or configuring the user device or the game-playing apparatus comprises modifying or configuring a software element of the user device or the game-playing apparatus.

In some embodiments, a method for processing game-playing transactions is provided. The method comprises: receiving or sending information associated with a game-playing transaction between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; modifying or configuring the user device or the game-playing apparatus based on the user device or the game-playing apparatus being located in the approved location associated with the game, and based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, an apparatus is provided for processing game-playing transactions. The apparatus comprises a computing device processor configured for: receiving or sending information associated with a game-playing transaction conducted or to be conducted between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, the user device or the game-playing apparatus comprises at least one of a pump, an ATM, a servicing station, a retail station, a local computing apparatus, a remote computing apparatus, or the apparatus.

In some embodiments, the apparatus comprises at least one of a pump, an ATM, a servicing station, a retail station, a local computing apparatus, a remote computing apparatus, a user device, or the game-playing apparatus.

In some embodiments, the apparatus comprises or is comprised in a gaming facilitator.

In some embodiments, the apparatus comprises or is comprised in a customized gaming facilitator.

In some embodiments, the apparatus comprises or is comprised in a communications exchange server.

In some embodiments, an apparatus is provided for processing game-playing transactions. The apparatus comprises a computing device processor configured for: receiving or sending information associated with a game-playing transaction between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; modifying or configuring the user device or the game-playing apparatus based on the user device or the game-playing apparatus being located in the approved location associated with the game, and based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, a fuel pump is provided for processing game-playing transactions. The fuel pump comprises a computing device processor associated configured for: receiving or sending information associated with a game-playing transaction between a user device and a game-playing apparatus, wherein the game-playing transaction is associated with a game; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information has not expired, wherein the game-playing transaction is conducted or is to be conducted on a first communication interface, and wherein the information associated with the game-playing transaction is received or sent on the first communication interface or a second communication interface.

In some embodiments, processing a game-playing transaction or enabling initiation or conduction of the game-playing transaction is further based on verifying or validating an identity (e.g., name, age, other identification information) associated with a user of the user device or game-playing apparatus. The identity of the user may be verified or validated using any method, including the method described in U.S. application Ser. No. 14/856,421, filed Sep. 16, 2015, published as US 2017/0076293.

U.S. application Ser. No. 15/614,490, filed Jun. 5, 2017, issued as U.S. Pat. No. 9,824,340 on Nov. 21, 2017, which is incorporated by reference herein in its entirety, is a continuation-in-part of, and claims priority to, U.S. patent application Ser. No. 14/856,421, filed Sep. 16, 2015, the disclosure of which is hereby incorporated by reference in its entirety for all purposes. U.S. application Ser. No. 15/818,569, filed Nov. 20, 2017, is also a non-provisional of and claims benefit of U.S. Provisional Application No. 62/458,457, filed on Feb. 13, 2017, the disclosure of which is incorporated by reference in its entirety for all purposes.

This application also incorporates by reference the entirety of PCT/US18/18071, filed Feb. 3, 2018, for all purposes.

The application also incorporates by reference the entirety of U.S. application Ser. No. 15/818,041, filed Nov. 20, 2017, which is a continuation of, and claims priority to U.S. patent application Ser. No. 15/614,486, filed Jun. 5, 2017, issued as U.S. Pat. No. 9,824,530 on Nov. 21, 2017, which is a continuation of, and claims priority to, U.S. patent application Ser. No. 14/958,715 filed on Dec. 3, 2015, issued as U.S. Pat. No. 9,672,687 on Jun. 6, 2017, which is a continuation of, and claims priority to, U.S. patent application Ser. No. 14/018,276 filed on Sep. 4, 2013, issued as U.S. Pat. No. 9,227,136 on Jan. 5, 2016, which claims priority to U.S. Provisional Patent Application No. 61/696,533 filed on Sep. 4, 2012, all the disclosures of which are hereby incorporated by reference in their entirety for all purposes.

This application also incorporates the entirety of U.S. application Ser. No. 15/818,603, filed Nov. 20, 2017, which is a continuation of and claims priority to Ser. No. 15/818,569, filed Nov. 20, 2017, which is a continuation-in-part of, and claims priority to U.S. application Ser. No. 15/614,490, filed Jun. 5, 2017, issued as U.S. Pat. No. 9,824,340 on Nov. 21, 2017, which is a continuation-in-part of, and claims priority to, U.S. patent application Ser. No. 14/958,720 filed on Dec. 3, 2015, issued as U.S. Pat. No. 9,672,697 on Jun. 6, 2017, which is a continuation-in-part of, and claims priority to, U.S. patent application Ser. No. 14/018,276 filed on Sep. 4, 2013, issued as U.S. Pat. No. 9,227,136 on Jan. 5, 2016, which claims priority to U.S. Provisional Patent Application No. 61/696,533 filed on Sep. 4, 2012, all the disclosures of which are hereby incorporated by reference in their entirety for all purposes.

The present application incorporates-by-reference the entirety of U.S. application Ser. No. 13/757,512, filed Feb. 1, 2013, published as US 2013/0196733, titled "Systems and Methods for Integrated Game Play Through the Use of Proximity-Based Communication on Smart Phones and Hand Held Devices," for all purposes.

The present application incorporates-by-reference the entirety of U.S. Application No. 61/593,762, filed Feb. 1, 2012, titled "Systems and Methods for Integrated Game Play and Sales of State Sponsored Lottery Products Through the Use of Near Field Communication on Smart Phones and Hand Held Devices," for all purposes.

The present application incorporates-by-reference the entirety of U.S. application Ser. No. 14/856,421, filed Sep. 16, 2015, published as US 2017/0076293, titled "Creating, verification, and integration of a digital identification on a mobile device" for all purposes.

The present application incorporates-by-reference the entirety of U.S. application Ser. No. 13/842,709, filed Mar. 15, 2013, published as US 2014/0274314, titled "Systems and Methods for Integrated Game Play at Payment-Enabled Terminals," for all purposes. The present application incorporates-by-reference the entirety of PCT/US14/22877, filed Mar. 10, 2014, titled "Systems and Methods for Integrated Game Play at Payment-Enabled Terminals," for all purposes.

The present application incorporates-by-reference the entirety of U.S. application Ser. No. 15/055,866, filed Feb. 29, 2016, titled "Validating a Short-Range Mobile Device Transaction Using a Long-Range Mobile Device Transaction," for all purposes.

The present application incorporates-by-reference the entirety of U.S. application Ser. No. 13/280,196, filed Oct. 24, 2011, published as US 2012/0244930, titled "Game Play System for Automated Terminals," for all purposes. U.S. application Ser. No. 13/280,196 claim priority to U.S. application Ser. No. 11/734,207, filed Apr. 11, 2007, titled "Systems and Methods for Providing Lottery Game Play Through an Unmanned Terminal," which claims priority to U.S. Application No. 60/886,818, filed Jan. 26, 2007, titled "Systems and Methods for Integrating ATM and Lottery Functions," all of which are incorporated by reference in their entirety for all purposes.

The present application incorporates-by-reference the entirety of PCT/US12/61744, filed Oct. 24, 2012, titled "Game Play System for Automated Terminals," for all purposes. The present application incorporates-by-reference the entirety of U.S. application Ser. No. 13/839,558, filed Mar. 15, 2013, titled "Game Play System for Automated Terminals," for all purposes.

The present application incorporates-by-reference the entirety of U.S. application Ser. No. 13/829,776, filed Mar. 14, 2013, titled "Systems and Methods for Providing Lottery Game Play Through an Unmanned Terminal," for all purposes. The present application incorporates-by-reference the entirety of U.S. application Ser. No. 13/839,469, filed Mar. 15, 2013, titled "Systems and Methods for Providing Lottery Game Play Through an Unmanned Terminal," for all purposes. The present application incorporates-by-reference the entirety of PCT/US08/51955, filed Jan. 24, 2008, titled "Systems and Methods for Providing Lottery Game Play Through an Unmanned Terminal," for all purposes.

In general, the present disclosure relates to gaming provider system and method of operation thereof. The gaming provider system of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure. Any part of this disclosure may be used in combination with any other part of this disclosure.

In some embodiments, any game described herein may be an augmented or virtual reality game. In some embodiments, any game described herein may additionally be a video game.

In some embodiments, a user obtains (e.g., purchases) a game-playing card (e.g., a lottery game card) at a retail store, kiosk, etc. The place of purchase may be a physical or electronic store. At a retail checkout terminal (or any other local computing apparatus), an operator or the user may swipe or otherwise transmit information associated with the gaming card to a remote computing apparatus (e.g., a backend server). The information associated with the game-playing card may be transmitted as a data packet. For example, the retail checkout terminal may extract information from the code (e.g., a barcode) of the card, and transmit the extracted information to the remote computing apparatus (e.g., backend server). In other embodiments, the information associated with the code is transmitted from the retail checkout terminal to the remote computing apparatus, and the remote computing apparatus extracts unique identification information associated with the card. The data packet transmitted from the retail checkout terminal may additionally include identification or location information associated with the location or identity of the retail checkout terminal (e.g., store identification information, terminal identification information, network identification information, merchant information, location information, etc.). In some embodiments, this information may be embedded into the card itself. This information may be cross-referenced or compared to approved identification or location information to determine whether the two quantities are consistent with or correspond to (e.g., match) each other (or are mappable to each other). If yes, this means that the data packet (i.e., the data packet received at the remote computing apparatus) is received from an approved location (i.e., an approved retail store or terminal) associated with the game associated with the card.

The scratch off code (or alphanumeric indicia which has to be scratched off to be visible) as described herein has a one-to-one relationship with unique identification information of the card, which may be a unique number (e.g., PAN number) associated with the card. When the scratch-off code is received by the backend server, which may be associated with any network described herein, the backend server searches for the unique identification information associated with the received scratch off code. The backend server proceeds to associate the phone number (and/or other mobile device identification information associated with the mobile device that sent the scratch off code such as the mobile device make, model, user, location, operation system, etc., from which the scratch off code is received, etc.) with at least one of the unique identification information of the card or the scratch off code of the card.

There may be a one-to-many relationship between mobile device identification information and card identification information because a single mobile device may be associated with one or more game-playing cards associated with one or more gaming partners and/or one or more games and/or one or more approved jurisdictions associated with the games.

Assume a user has exhausted funds on a particular gaming card (e.g., the user has played all games on a particular card). The user now reloads a card at the retail checkout terminal or via any other reloading mechanism (e.g., including via a mobile device). The reloading process may comprise swiping the card at the retail checkout terminal or any other transaction mechanism (e.g., a short-range or long-range wireless transaction) between the card and the a computing apparatus such as the retail checkout terminal. The reloading process may include a financial transaction similar to the transaction when the card was initially purchased. A data packet comprising the unique identification information of the card is transmitted to the remote computing apparatus (i.e., the backend server). The backend server identifies or finds the mobile device information (e.g., phone number or any other information described herein) associated with the unique card identification information. The backend server facilitates automatically obtaining a ticket (e.g., automatically purchasing a ticket) from a gaming partner associated with the card, and transmits a ticket associated with the card electronically to the mobile device via any messaging mechanisms described herein.

In some embodiments, one or more elements of any embodiments described herein (e.g., such as messaging features) may be realized using a mobile application. In some embodiments, the reloading of a card may be processed or approved at any retailer (or any retail checkout terminal) in an approved jurisdiction associated with the card or associated with the game associated with the card. In some embodiments, the reloading of a card approved for games in a particular jurisdiction may need to occur in that jurisdiction. In other embodiments, the reloading of a card approved for games in a particular jurisdiction may occur outside that jurisdiction.

In some embodiments, any game-playing card described herein may not have an expiry date. In such embodiments, any funds on a card may be used (e.g., automatically by the backend server) to obtain (e.g., purchase) a ticket (or multiple tickets) for the next draw associated with the game associated with the card. In some embodiments, the backend server obtains a single ticket for each draw. In other embodiments, a user of the card may have control over which draw and/or games to participate in using excess or remaining funds on the card. In some embodiments, a period of validity may be associated with a game-playing transaction or game information or any other information described herein.

Some embodiments provide a gaming provider system that can include a gaming facilitator in communication with a network and may include application logic operable to execute a gaming transaction. One or more lottery gift cards can be issued by the gaming provider and each may include a universal product code for barcode scanning for purchase by a user at a retail store. The gaming facilitator can include a card issuing system for tracking purchases and gaming transactions associated with the one or more lottery gift cards. The gaming facilitator can be in communication with at least one mobile device associated with the user through the network for commencing the gaming transaction. The gaming facilitator may be in communication with a gaming system of a jurisdiction for generating the gaming transaction and with a third party payment provider for providing payment to the user. The one or more lottery gift cards can identify at least one lottery game and have a card number and a unique scratch off code and are reusable by the user to initiate the gaming transaction. The one or more lottery gift cards can also each include a short code for entry by the user using the at least one mobile device to initiate a messaging session (e.g., a text messaging session or other messaging session such as through a mobile application) with the gaming facilitator. The unique scratch off code can be unique across all lottery jurisdictions and have one or more characters for entry by the user using the at least one mobile device during the text messaging session. As used herein, a text message may refer to any kind of message, including mobile application messages, etc.

In some embodiments, the gaming facilitator can be configured to log a purchase of the one or more lottery gift cards at the retail store for providing a commission to the retail store and initiate the gaming transaction through the gaming system in response to the user entering the short code in the at least one mobile device. Additionally, the gaming facilitator can be configured to commence a text messaging session with the at least one mobile device, communicate with the at least one mobile device using the text messaging session, and receive the scratch off code as a first user text message during the text messaging session. The gaming facilitator can then be configured to communicate with the gaming system to receive at least one lottery number set generated by the gaming system and transmit a first gaming facilitator text message including the at least one lottery number set to the at least one mobile device in the text messaging session.

In some embodiments, the gaming facilitator can be configured to determine if the at least one lottery number set is a winning lottery number set and determine if the winning lottery number set qualifies as a low tier win or a high tier win. Then, the gaming facilitator can be configured to transmit a second gaming facilitator text message including a notification of winning and a winning link having one or more payment options to the at least one mobile device in response to the at least one lottery number set being the winning lottery number set. The gaming facilitator may also be configured to provide instructions to the user using the text messaging session for payment in response to the winning lottery number set qualifying as the high tier win. The gaming facilitator can be configured to confirm an identity of the user in response to the winning lottery number set qualifying as the low tier win in response to the user utilizing the winning link and initiate payment to the user through the third party payment provider in response to confirmation of the identity of the user.

Figure 12:
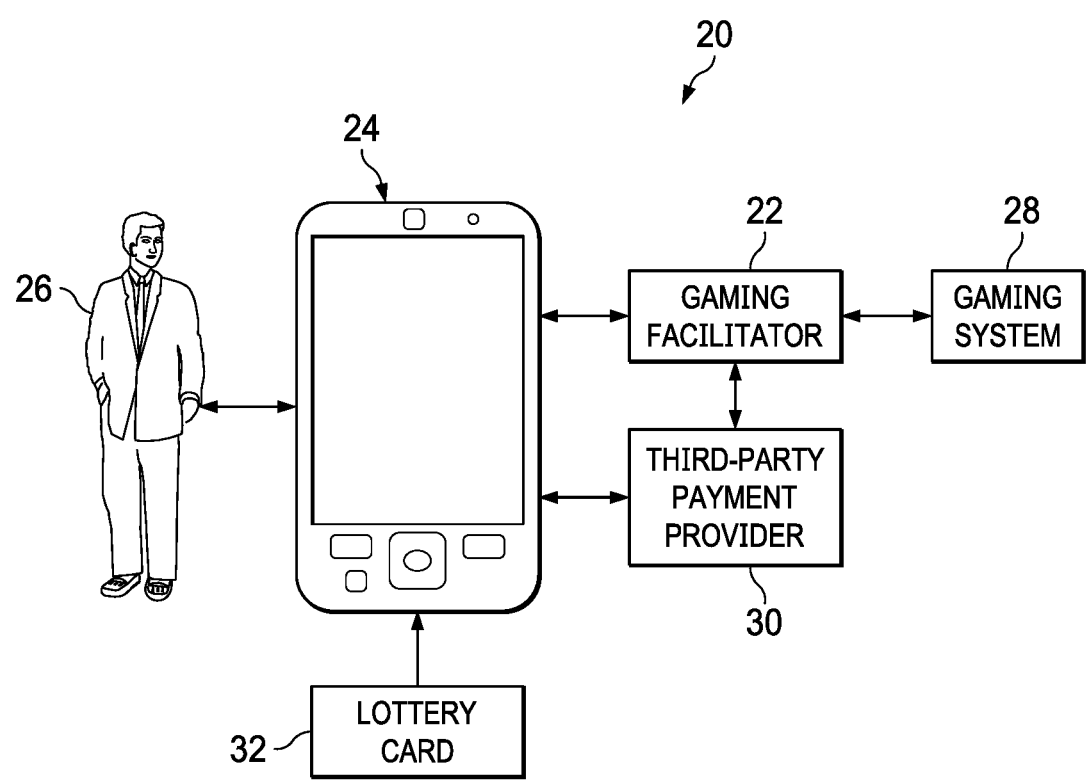
FIG. 12 is a block diagram of a gaming provider system, in accordance with some embodiments.

As best shown in FIG. 12, a gaming provider system 20 can include a gaming facilitator 22 in communication with a network and may include application logic operable to execute a gaming transaction. The gaming facilitator 22 may include one or more software-customized processors. The gaming facilitator 22 can be in communication with at least one mobile device 24 (e.g., Android® phone, iPhone®, etc.) associated with a user 26 through the network for commencing the gaming transaction. The gaming facilitator 22 may also be in communication with a gaming system 28 of a jurisdiction (and/or of a particular gaming company or partner) for generating the gaming transaction and with a third party payment provider 30 (e.g., PayPal®) for providing payment to the user 26. Alternatively, payment can be provided through automated clearing house (ACH) transfers.

One or more lottery gift cards 32 can be issued by the gaming facilitator 22 and each may include a universal product code (UPC) for barcode scanning (e.g., by a terminal at a retail store) for purchase by the user 26 at a retail store. Any code as described herein may also be referred to as indicia, which can be visual or non-visual indicia. The terminal may be a manned or unmanned checkout station. In some embodiments, the gift card may include another mechanism (e.g., RFID, NFC, Bluetooth, Bluetooth Low Energy, Infrared, cellular, WiFi, etc.) for transmitting the information on the card. In some embodiments, the card may be a physical card. In other embodiments, the card may be an electronic card stored on a mobile device such as a mobile phone, watch, or other mobile or portable computing device. Specifically, the lottery gift cards 32 may be purchased at participating (lottery-enabled) retail stores, known as distribution partners or at point of sale (POS) terminals using any form of payment allowed by the jurisdiction in which the sale takes place (some jurisdictions do not allow credit card payment for lottery games). In some embodiments, the cards may be purchased over the Internet using a computing device such as a mobile computing device. In some embodiments, any payment for any game or card described herein may be an electronic payment using cryptocurrency. The gaming facilitator 22 can include or be associated with a card issuing system (e.g., utilizing a database) for tracking purchases and gaming transactions associated with the one or more lottery gift cards 32. The one or more lottery gift cards 32 can identify at least one lottery game (e.g., on the face of a card) and have a card number 34 (or other card identification information) and are reusable by the user 26 to initiate gaming transactions. After their initial use, value may be added to the lottery gift cards 32 at a retail store, kiosk, or via a mobile device, in order to play future lottery games (i.e., the lottery gift cards 32 are rechargeable). Any mechanism (e.g., swiping, short-range wireless transaction, etc.) used for purchase of the card can be used to reload the card. In some embodiments, users 26 or players can reuse the card multiple times (no limit) across all participating jurisdictions associated with a particular game.

In some embodiments, players may not reload lottery gift cards 32 that have not been played if the reload attempt is within a jurisdiction that is different from the one in which the lottery gift card 32 was purchased and activated. In other embodiments, players may reload gift cards 32 in any jurisdiction, regardless of whether it is the same or different from the jurisdiction where the lottery gift card 32 was purchased and activated. Additional requirements may specify what happens when a reload is delayed at a computing terminal (e.g., POS terminal, mobile terminal, etc.) due to draw breaks, off sale times, and system issues (outages). In all of these scenarios, the reload attempt (lottery purchase attempt) may be retried (e.g., automatically) at the next available open window unless the reload attempt has been previously canceled by the user. In some embodiments, four different lottery gift cards 32 (four different UPCs) may be used to enable the user 26 to play three or five plays for the Powerball® lottery ($6 card value and $10 card value, respectively) or five or ten plays of the Mega Millions® lottery ($5 card value and $10 card value). The lottery gift cards 32 may also display other items such as, but not limited to terms and conditions and instructions for how to play.

The lottery gift card 32 becomes activated once the payment is processed. Specifically, the activation goes from the POS terminal to the network of the gaming facilitator 22. The activation process completes within seconds after the payment is processed; however, the activation of the purchased lottery gift card 32 does trigger the purchase of the corresponding lottery game. Thus, the lottery gift card 32 may be used at a later time or given as a gift to another person. The lottery gift card 32 may include one or more games, each game may be associated with one or more same or different gaming partners or providers. In some embodiments, each game may be associated with one or more jurisdictions. In some embodiments, all games on a lottery card are associated with a single gaming partner and/or a single jurisdiction.

Figure 13:
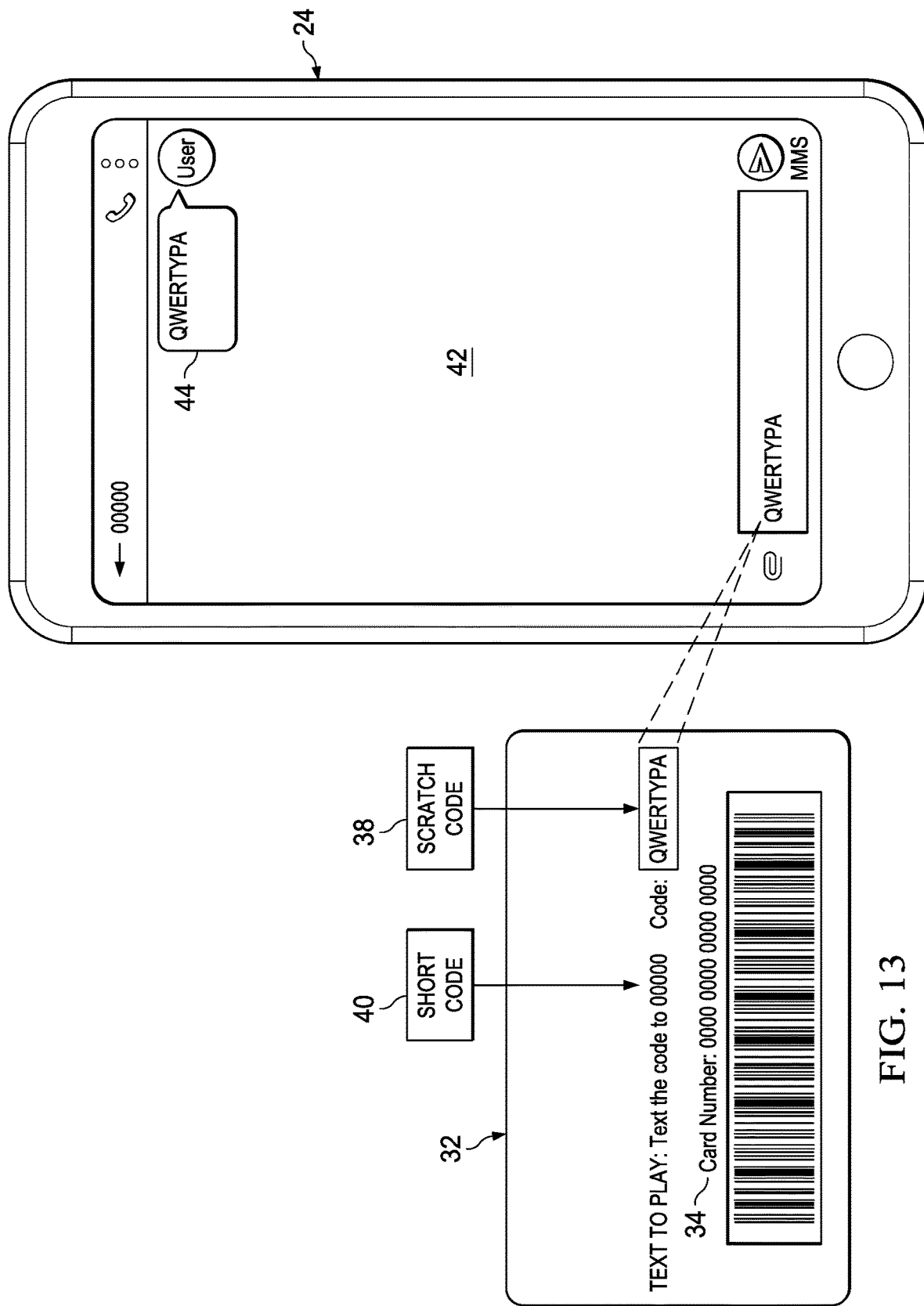
FIG. 13 illustrates the back of a lottery gift card and a screen shot of a mobile device texting a short code to initiate a text messaging session with a gaming facilitator, in accordance with some embodiments.

As best shown in FIG. 13, the one or more lottery gift cards 32 each can include a unique scratch off code 38 and can also each include a short code 40 (e.g., 26370) for entry by the user 26 using the at least one mobile device 24 to initiate a text messaging session 42 with the gaming facilitator 22. The unique scratch off code 38 can be unique across all lottery jurisdictions and have one or more characters (e.g., eight alphabetic characters) for entry by the user 26 using the at least one mobile device 24 during the text messaging session 42. So, the user 26 can text the scratch off code 38 to the short code 40. In some embodiments, the scratch off code may be some other visual or non-visual indicia stored on the card. In some embodiments, the scratch off code may be input to the mobile device via some other input mechanism (e.g., capturing an image of the code, or some other wireless communication mechanism described in this disclosure). In some embodiments, the short code may be some other visual or non-visual indicia stored on the card. In some embodiments, the scratch off code may be communicated to the short code via any communication mechanism (e.g., cellular, WiFi, Bluetooth Low Energy, RFID, NFC, or another wireless communication mechanism described herein). Any wireless communication mechanism or process described herein may additionally or alternatively be performed via a wired communication mechanism or process. In some embodiments, any lottery card described herein may refer to any card, whether associated with a lottery game or some other game.

Figure 14:
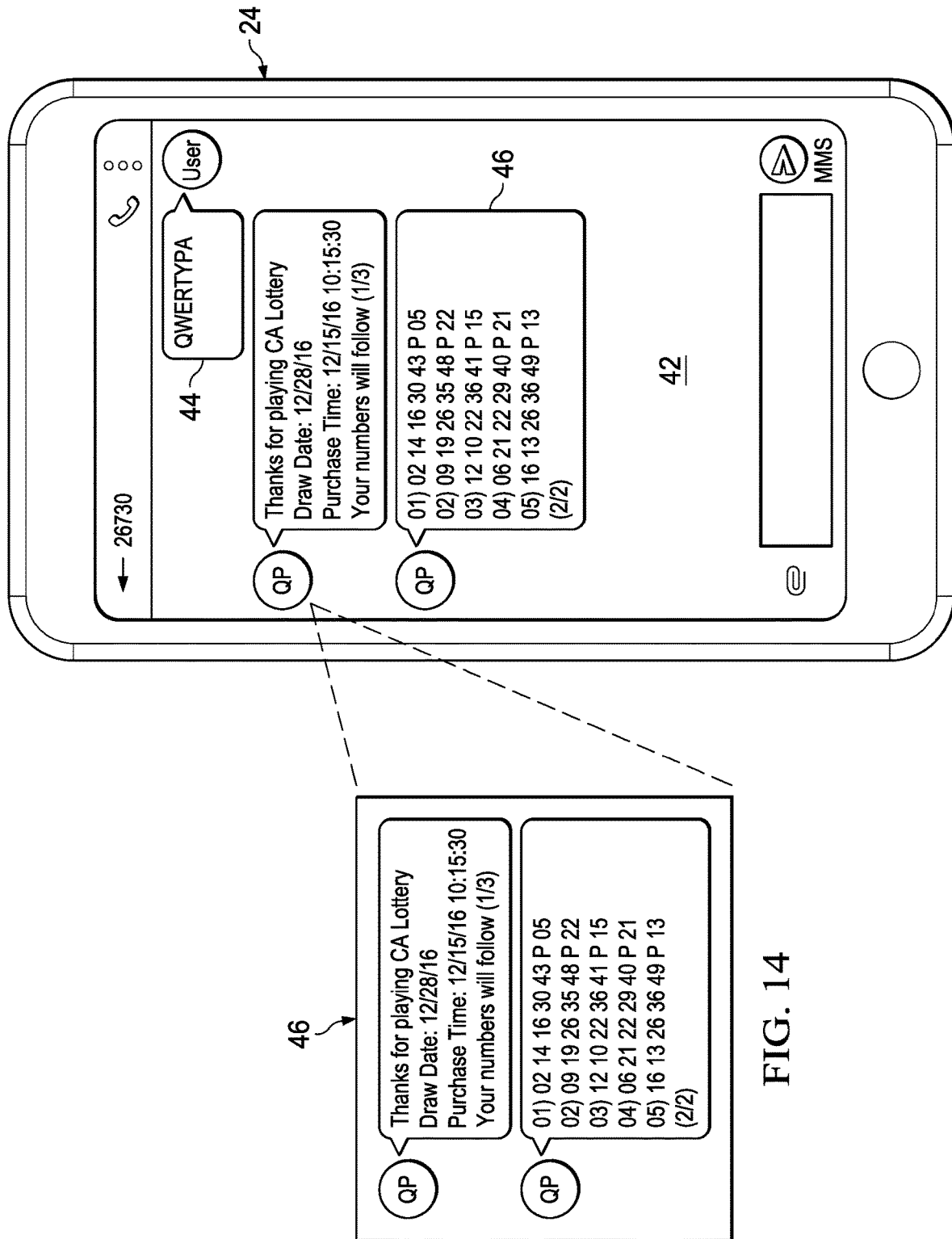
FIG. 14 illustrates a screen shot of the mobile device text messaging session with the gaming facilitator sending a lottery number set generated by a gaming system, in accordance with some embodiments.
Figure 15:
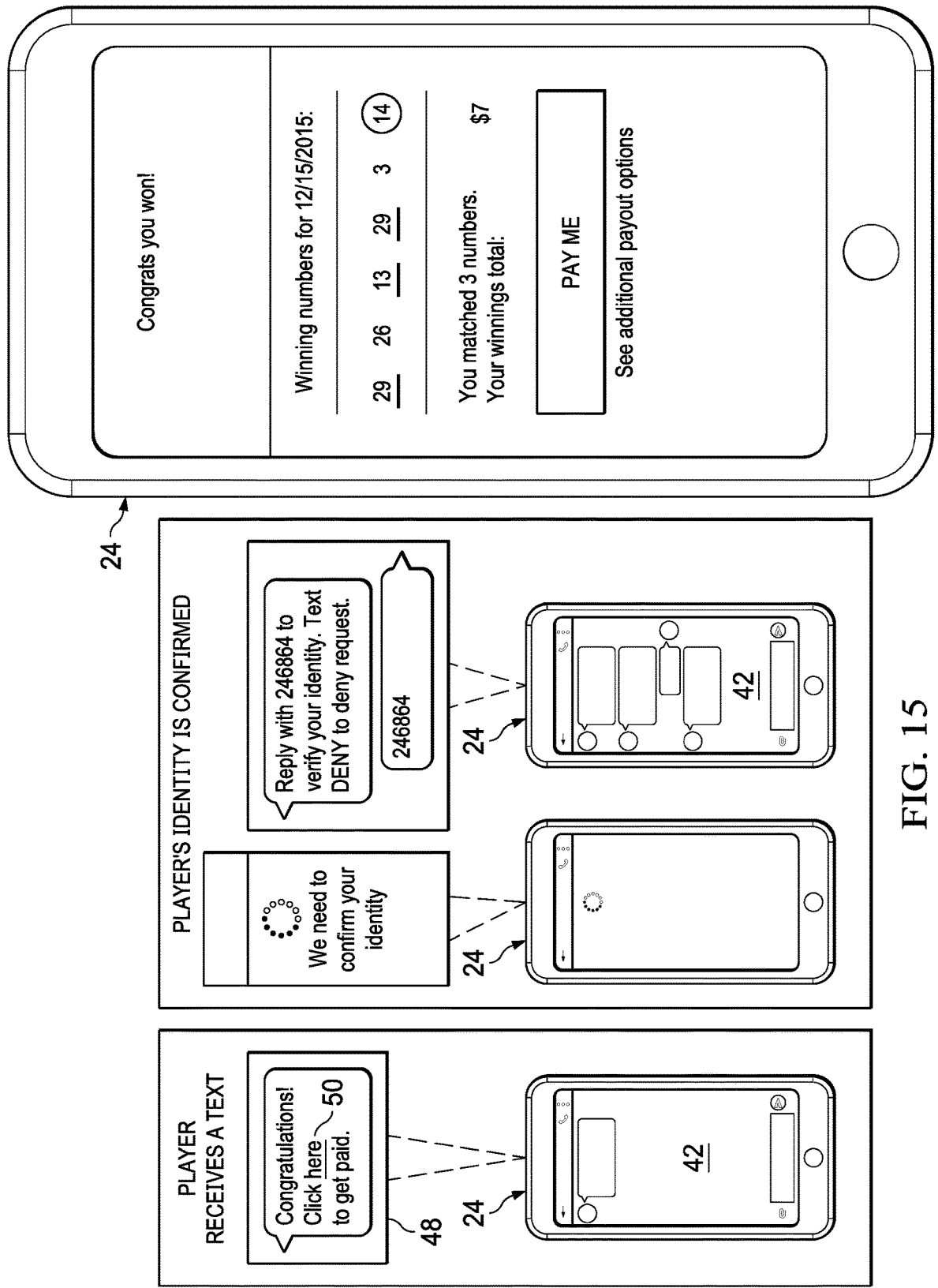
FIG. 15 illustrates a screen shot of the mobile device notifying the user of winning and confirming the identity of the user, in accordance with some embodiments.

The gaming facilitator 22 can be configured to log a purchase (e.g., details of the lottery card, user buying the lottery card, etc.) of the one or more lottery gift cards 32 at the retail store for providing a commission to the retail store and initiate the gaming transaction through the gaming system 28 in response to the user 26 entering the short code 40 in the at least one mobile device 24. Additionally, the gaming facilitator 22 can be configured to commence or participate in a text messaging session 42 (FIGS. 13-15)

with the at least one mobile device 24, communicate with the at least one mobile device 24 using the text messaging session 42, and receive the scratch off code 38 as a first user text message 44 during the text messaging session 42. The gaming facilitator 22 can then be configured to communicate with the gaming system 28 (or any other system) to receive at least one lottery number set (i.e., board) generated by the gaming system 28 and transmit a first gaming facilitator text message 46 including the at least one lottery number set to the at least one mobile device 24 in the text messaging session 42. Any text messaging session described herein may alternatively be any information sending and/or receiving session.

Figure 16:
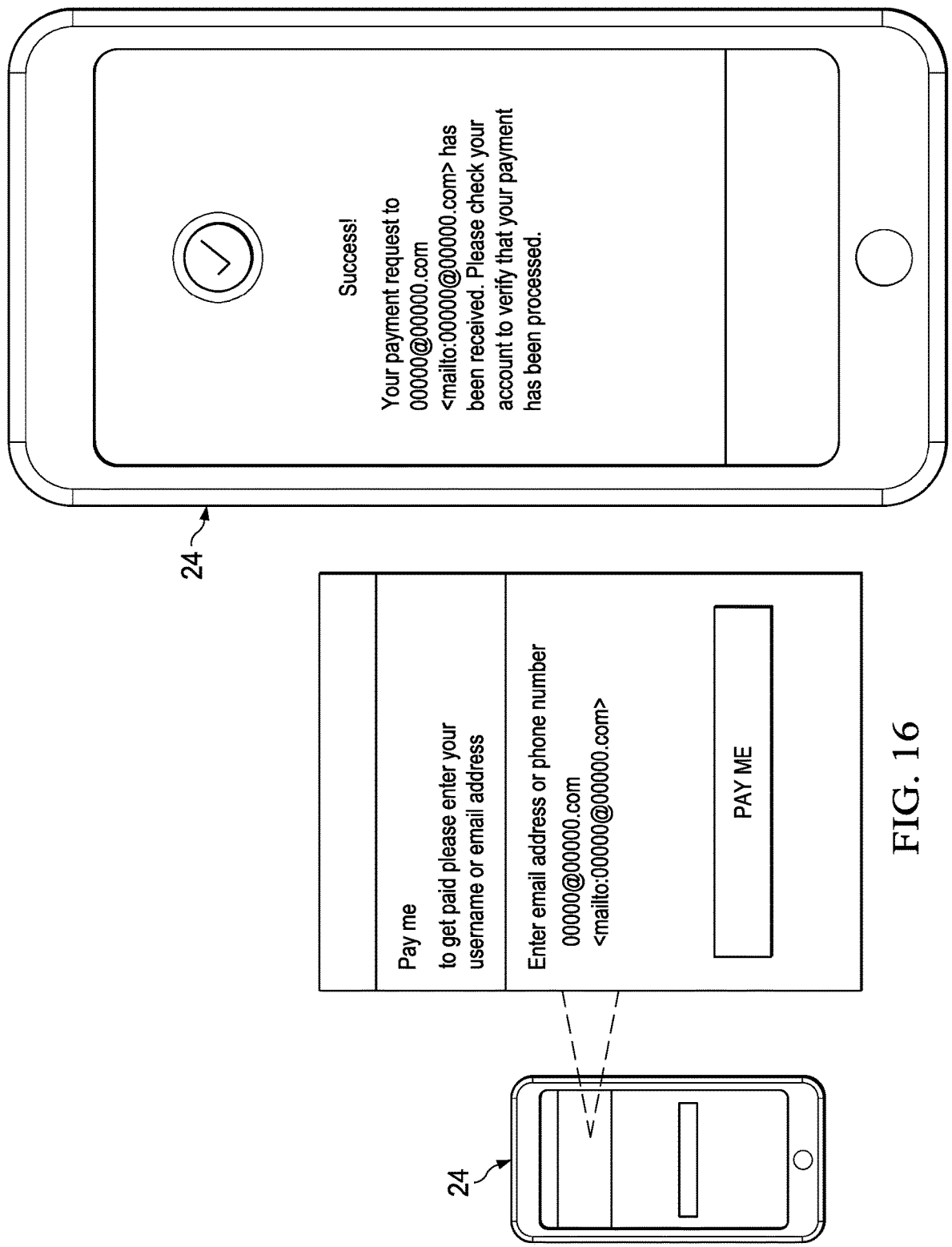
FIG. 16 illustrates screen shots of the mobile device during payment by a third party payment provider for a low tier win, in accordance with some embodiments.
Figure 17:
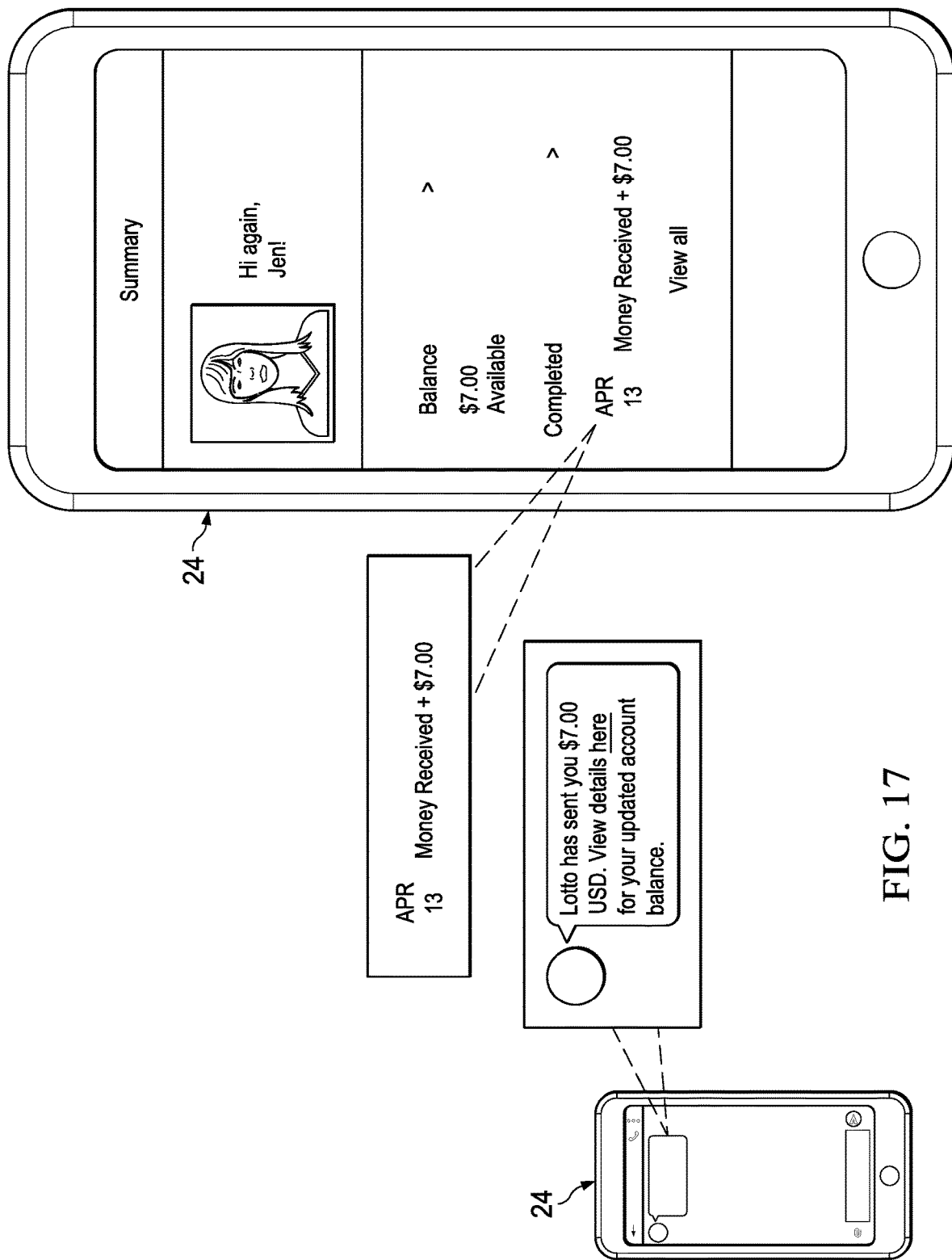
FIG. 17 illustrates screen shots of the mobile device during payment by a third party payment provider for a low tier win, in accordance with some embodiments.
Figure 18:
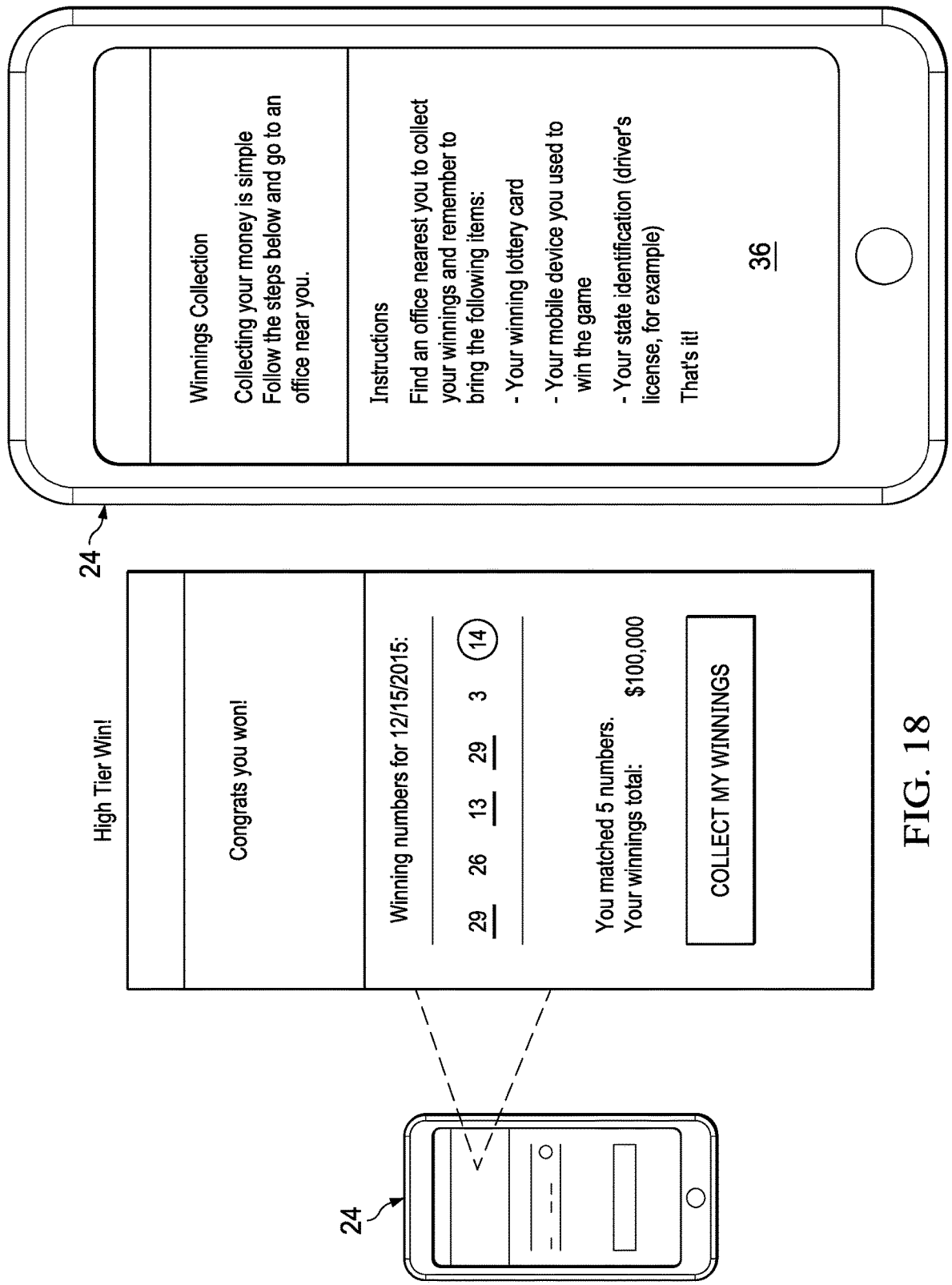
FIG. 18 illustrates a screen shot of the mobile device providing instructions for payment for a high tier win, in accordance with some embodiments.
Figure 19:
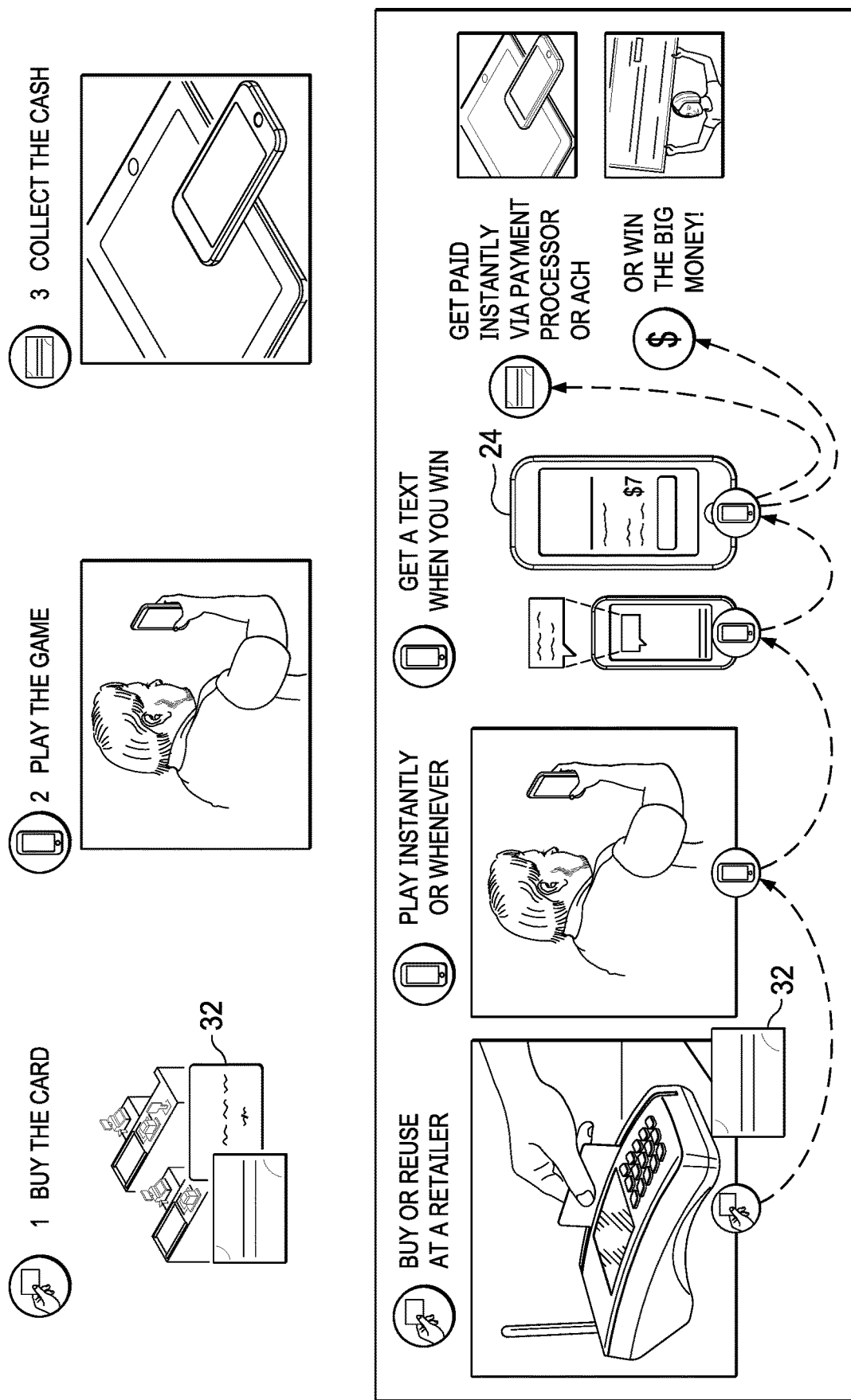
FIG. 19 illustrates a method for providing a gaming transaction using the gaming provider system of FIG. 12 or using any other system described herein, in accordance with some embodiments.

Additionally, the gaming facilitator 22 can be configured to determine if the at least one lottery number set is a winning lottery number set and determine if the winning lottery number set qualifies as a low tier win or a high tier win ("low tier" for smaller jackpots and "high tier" for larger jackpots). Then, the gaming facilitator 22 can be configured to transmit a second gaming facilitator text message 48 including a notification of winning and a winning link 50 (e.g., hypertext link to a secure website that employs the secure Hypertext Transfer Protocol, for instance) having one or more payment options to the at least one mobile device 24 in response to the at least one lottery number set being the winning lottery number set (FIG. 15). The gaming facilitator 22 may also be configured to provide instructions 36 to the user 26 for payment in response to the winning lottery number set qualifying as the high tier win (FIG. 18). The gaming facilitator 22 can be configured to confirm an identity of the user 26 in response to the winning lottery number set qualifying as the low tier win in response to the user 26 utilizing the winning link 50 (FIG. 15) and initiate payment to the user 26 through the third party payment provider 30 in response to confirmation of the identity of the user 26 (FIG. 16). In the event that payment is provided through an ACH transfer, an ACH data entry page can be provided on the website that allows the user 26 to enter their preferred ACH account information: Full Name, Routing number, Account number, Bank Name. This information can then be validated and a confirmation can be sent to the user 26 (e.g., text message).

The user's identity may be confirmed through any identification mechanism described herein. In some embodiments, the user may enter a code. In some embodiments, the user may provide a photo of any body part of the user such as the user's face. In some embodiments, the user may provide a fingerprint. The user's identity may be confirmed by comparing or cross-referencing the user provided information to information comprised in an identification database.

Referring now to FIG. 8, a method for providing a gaming transaction using a gaming provider system 20 is also disclosed. The method can include the step of providing one or more lottery gift cards 32 having a universal product code and a card number 34 and a short code 40 and a scratch off code 38 for purchase at a retail store by a user 26. The method can continue by verifying the age of the user 26 intending to purchase the one or more lottery gift cards 32 at the retail store. Such age verification may be carried out just as is done for alcohol purchases (i.e., a store clerk checks the driver's license or other ID to confirm the age of the user 26). It should be appreciated that other age verification steps may be used in addition to or in place of age verification by the store clerk, such as, but not limited to a later exchange of additional text messages to confirm the age of the user 26 once the lottery gift card 32 has been purchased. In some embodiments, age verification of the user may be performed as part of identification verification of the user. The method can proceed with the steps of receiving a notice (e.g., at the mobile device or the POS terminal) of a purchase of the one or more lottery gift cards 32 at the retail store at a gaming facilitator 22 in response to the universal product code being scanned at the retail store and logging the purchase of the one or more lottery gift cards 32 at the gaming facilitator 22 to provide a commission to the retail store. More specifically, the gaming facilitator 22 can digitally record all transactions of lottery gift cards 32 and provide reporting of the transactions to the appropriate retail stores or retailers by brand, location, or partner or to the gaming partners by game type, location, or retail store. In addition, the gaming facilitator 22 can also provide a real time journal file to the appropriate lottery security group or lottery internal control system. The gaming facilitator 22 may also manage settlement of funds to the appropriate lottery or gaming partner for these transactions.

Next, the method can include the step of commencing or conducting a text messaging session 42 (or other information sending and/or receiving session) with at least one mobile device 24 in response to the user 26 entering the short code 40 in the at least one mobile device 24. Then, the method can continue by initiating a gaming transaction through a gaming system 28 in communication with the gaming facilitator 22 and communicating with the at least one mobile device 24 using the text messaging session 42. When such a play request is received for a lottery gift card 32, all outstanding plays will be played in the jurisdiction where the monies were received for those transactions. So, for example, if the lottery gift card 32 was purchased in North Carolina and then played in California, the North Carolina lottery will be played. The method can continue with the steps of receiving a scratch off code 38 as a first user text message 44 during the text messaging session 42 and marrying the card number (or other identification information) of the at least one lottery gift card 32 to a phone number of the mobile device 24. Thus, once the lottery gift card 32 is associated with the phone number of the mobile device 24, the user 26 may make future plays without any additional registration or verification.

On a subsequent play after reloading the card, if the user 26 sends the scratch off code 38 to the short code 40 using a different mobile number than the initial play, then the user 26 may receive an error text message (e.g., "This card has already been played. To view the numbers for this play, you need to send the scratch off code from the mobile device 24 that was used to play the first time."). Similar error messages can be provided if the user 26 sends the scratch off code 38 multiple times without reloading the lottery gift card 32. In some embodiments, the user may make subsequent plays using the same scratch off code but a different mobile number. In such embodiments, multiple mobile numbers (or other user identification information) will be associated with the card number (or other card identification information).

The method can continue with the step of communicating with the gaming system 28 to receive at least one lottery number set generated by the gaming system 28. If user 26 sends an incorrect, duplicate, or inactive scratch off code 38, they can receive an error message (e.g., "Your play cannot be completed at this time. Please call 1-855-###-#### for further assistance."). Similarly, if a play attempt fails because the request was made during a draw break or game is off sale, the user 26 can be sent a text message with another error message (e.g., "Sorry, lottery is off sale right now. We will send your numbers when lottery is on sale again."). Once the lottery goes on sale again, user 26 receives play success message with played numbers. Next, the method can include the step of transmitting a first gaming facilitator text message 46 including the at least one lottery number set to the at least one mobile device 24 in the text messaging session 42. Then, the method can include the step of maintaining a record of historical plays including the at least lottery number set for each gaming transaction previously completed. If the user 26 sends "VIEW" to the short code 40, and has already played they can receive a text message to indicate that the numbers will be resent (e.g., "This card has already been played. Your numbers will be resent below.") along with their played numbers. Likewise, if the user 26 sends "VIEW" to the short code 40, and have not yet played they should receive a text message requesting that they send the scratch off code 38 (e.g., "Send the scratch off code from the back of your Lottery Card to play and view your numbers!"). The user 26 can text similar commands to the short code 40, such as, but not limited to "STOP" to stop receiving any associated marketing text messages, or "HELP" to receive instructions on how to play or access the website. The gaming facilitator 22 records all transactions and provides reporting of transactions to the appropriate lottery authority or gaming system 28 by jurisdiction.

The method may then continue by determining if the at least one lottery number set is a winning lottery number set and determining if the winning lottery number set qualifies as a low tier win or a high tier win. The method may then include the step of transmitting a second gaming facilitator text message 48 including a notification of winning and a winning link 50 (e.g., hypertext link to the website) having one or more payment options to the at least one mobile device 24 in response to the at least one lottery number set being the winning lottery number set. Notifications may even be sent for some other event, such as when the user 26 does not win (e.g., a message from the retail store saying "better luck next time, but here's a 10% digital coupon to our store") or notifications when the lottery jackpot becomes large. The method can then proceed by providing instructions 36 (e.g., using a hypertext link the website) to the user 26 for payment in response to the winning lottery number set qualifying as the high tier win. The user 26 may also send "REDEEM" to the short code 40, and then they can receive a text message concerning their winnings (e.g., "lotterycardwebsite.com to view your Winnings and choose how to get paid if you win"). The method may also include the step of confirming an identity of the user 26 in response to the winning lottery number set qualifying as the low tier win or high tier win in response to the user 26 utilizing the winning link 50. Identification verification may be performed by any technique described herein. The method can conclude with the step of initiating payment to the user 26 through the third party payment provider 30 in response to confirmation of the identity of the user 26 for a low tier win. In some embodiments, the user 26 may be given the option of requesting payment for winning in the form of a retailer gift card that may even have a value greater than what the cash winnings would be (e.g., $7 cash winnings, but can alternatively receive an $8 gift card).

In some embodiments, the user 26 does not have to register to claim high tier winnings, but does need to visit the lottery office. When the user 26 is at the lottery office to redeem their high tier winnings and the lottery clerk can select the "Click here to enter PIN on PIN Pad" button on a tool, the user 26 can be sent a six digit code to their mobile number that was used to play. The user 26 can then enter this six digit code in the tool to verify their identity and proceed with claiming their high tier winnings.

Figure 28:
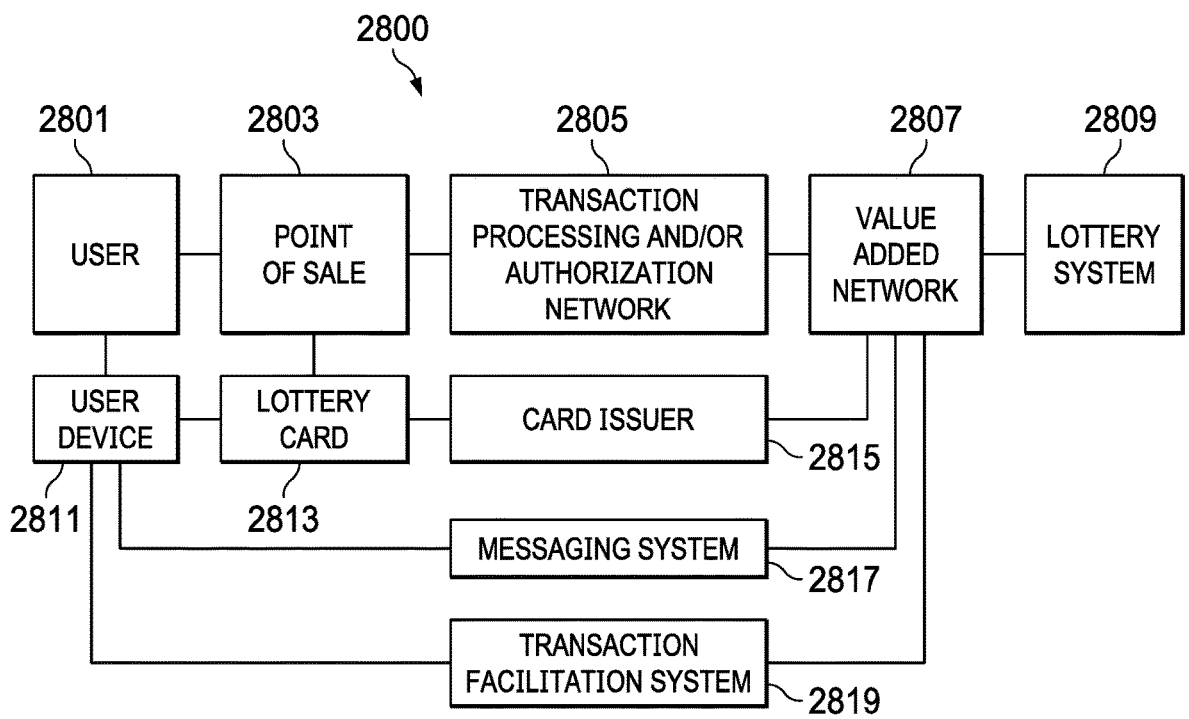
FIG. 28 is a block diagram of another gaming provider system, in accordance with some embodiments.

FIG. 28 illustrates some entities that may be involved in a gaming provider system. A user 2801 may purchase a lottery play at a point of sale (POS) 2803. The user 2801 may purchase a physical lottery card 2813 with an identifying barcode or other card identifying mechanism. The identifying barcode or mechanism may be to record transactions (e.g. in order to avoid repurchase or reactivation of the same lottery card) and/or authorize transactions (e.g. via lookup in a database system associating at least one lottery card 2813 with at least one merchant and/or POS 2803). Alternatively, the user 2801 may acquire a virtual lottery card 2813 by way of electronic communication (e.g. RFID, NFC, Bluetooth, Bluetooth Low Energy, Infrared, cellular, WiFi, QR code) involving a user device 2811 and a POS 2803. Alternatively, the electronic communication may involve a user device 2811 while not involving a POS 2803. Upon purchase, the POS 2803 and/or associated identifying information may be analyzed by a transaction processing and/or authorization network (TPN) 2805 to determine whether or not the POS 2803 and/or its retail location is authorized to sell lottery cards 2813, e.g. based on geographic location or network membership. The TPN 2805 may further facilitate financial transactions between the POS and a value added network (VAN) 2807, e.g. by recording POS 2803 activity associated with lottery cards 2803 and/or sending payments between the POS 2803 and VAN 2807. Upon successful lottery card 2813 purchase and/or POS 2803 approval, the lottery card 2813 may be activated automatically or by submission of associated lottery card 2813 information, e.g. from user device 2811 to the VAN 2807.

Unique information associated with each lottery card 2813 may be generated and recorded by a value added network (VAN) 2807 and/or card issuer 2815. Physical lottery cards 2813 may further be printed by a card issuer 2815 for distribution to a POS 2803. The unique information may include a primary account number (PAN) and/or a scratch code. Upon purchase, the POS 2803 may access a TPN 2805 to authorize the lottery card 2813 purchase based on the unique information, e.g. by cross-referencing location information with a database. In the case of a lottery replay purchase (e.g. using a previously purchased lottery card 2813) or lottery play stacking (i.e. purchasing multiple plays before exhausting existing play(s) 2813), historical and/or jurisdictional information may be referenced to authorize the lottery card 2813 purchase, e.g. based on allowable number of replays and/or whether the jurisdiction allows replays from a given geographical location. Additionally, lottery card 2813 and/or user device 2811 activity may be monitored to determine unintended, malfunctioning, or fraudulent behavior (e.g. based on play purchase velocity or geographic location of purchases).

All information associated with the lottery play (e.g. purchase, activation, registration, play, replay, play results, messaging, financial transactions) may be communicated to and recorded by a VAN 2807. This communication may occur through one or more intermediary entities, such as a POS 2803, TPN 2805, card issuer 2815, user device 2811, messaging system 2817, financial system 2819, and/or lottery system 2809. The VAN 2807 may utilize the information to inform internal (i.e. within the VAN) or external activities (e.g. lottery system, card issuer) rule-based events.

The user device 2811 may be a cellular and/or Internet-enabled device. The messaging system 2817 may relay text, image, audio, and/or video messages, e.g. via SMS, MMS, or Internet URL. The financial system 2819 may comprise a third party electronic payment system capable of sending ACH transfers or transferring money among accounts within the financial system The lottery system 2809 may comprise a system capable of transmitting game play offerings, transmitting game play purchase prices, receiving requests for one or more game plays, returning results of one or more game plays, receiving payments for game play purchases, and/or sending payments associated with game play results.

In some embodiments, the phone number and/or location information (e.g. from cellular towers, GPS) associated with a user device may be analyzed to determine jurisdictional and/or fraud compliance. In some embodiments, location information associated with a user device and/or lottery card may be analyzed to determine game play offerings and/or promotional offers.

In some embodiments, lottery plays may be transferred from one user device to another user device.

In some embodiments, an event-based system (e.g. based on time or location) may be utilized to determine periods to avoid sending communications to the user device.

In some embodiments, a user may manually select information related to a game play, e.g. a user may select the virtual and/or physical scratch-off locations associated with a scratch-off game as a lottery player might traditionally do with physical lottery tickets. The user may also allow the user device and/or remote system (e.g. VAN, lottery system) to automatically select and/or generate information related to a game play, e.g. numbers chosen for a board-based lottery game.

In some embodiments, a threshold may be established such that all prizes associated with game play outcomes ("prizes") below the threshold may be automatically sent via a financial system, whereas all prizes above or equal to the threshold may require further verification steps before payment (e.g. user and/or user device verification at a designated physical location).

In some embodiments, an unclaimed prize may expire based on the user, game play jurisdiction, game play geographical location, lottery system associated with the game play, and/or expiration events (e.g. time thresholds).

In some embodiments, a purchase of a game card is initiated by scanning a barcode at a point of sale terminal. In other embodiments, the purchase may be initiated at an unmanned terminal. In some embodiments, the purchase may be initiated by conducting a chip-based transmission of information from the game card to the point of sale terminal. In some embodiments, the game card may be a lottery card. Any gaming card described herein may be a physical card or a digital card. In some embodiments, the purchase may be made directly by a mobile computing device associated with a user. Therefore, in some embodiments, the user's mobile computing device (or non-mobile computing device) may be the POS terminal.

If the first network is not online, the POS terminal may directly send the information (e.g., the scanned information) to the second network. Alternatively or additionally, the POS terminal may send a signal to the first network that causes the first network to resolve any issues and come online. Once the first network comes online, the first network forwards the information to the second network. Once the second network receives the information (e.g., from the first network and/or from the POS terminal), the second network processes the transaction (e.g., the purchase transaction for purchasing the gaming card), and sends a response regarding either successfully or unsuccessfully processing the transaction back to the POS terminal (e.g., either directly to the POS terminal or via the first network). The second network may have access to a database that includes authorized retailer locations (e.g., merchants, entities, geographical locations, network locations, etc.) for selling the gaming card. The location of the purchase may be included in the information transmitted from the POS terminal. If the location is not present in the database, a transaction declined message is transmitted to the POS terminal.

If the location is present in the database, a determination is made (e.g., by the second network) as to whether the gaming card status is generated or disabled. If the gaming card is disabled, a decline message is transmitted to the POS terminal (e.g., directly or via the first network) because the card is disabled. If the gaming card is not disabled, the second network determines whether the card is already activated. If the gaming card is already activated, a decline message is transmitted to the POS terminal (e.g., directly or via the first network) because the card is already activated. If the gaming card is not already activated, the second network determines whether the gaming card has already been played. If the gaming card has been played, a decline message is transmitted to the POS terminal (e.g., directly or via the first network) because the card has already been played.

If the gaming card has not been played and/or if a funds balance to play a game is present, the second network sends an approval message to the first network and/or the POS terminal, wherein the approval message may be displayed on the POS terminal. The second network also sets the PAN card status to activated and sets the card state to active. The second network also records the state-specific (e.g., jurisdiction specific) PAN obligation associated with the card, sets the obligation date, and records purchase details for the record. The card is now registered for play.

The information from the point of sale (POS) terminal is transmitted to a first network. The process flow then moves on to determine whether a first network is online. The first network may be a game card network, a card network, a game network, a first server specifically configured for card-based gaming transactions, etc. If the first network is online, the information from the first network is transmitted to a second server. The second network may be a gaming facilitator network, a communication processing network, a second server specifically configured for gaming transactions such as card-based gaming transactions, etc.

Any features associated with any one figure may be associated with or combined with features of any other figure, even if not illustrated in the figures. Additionally, steps of each figure may be performed in any order that may be the same as or different from the order shown in the figure. Any feature (e.g., any element) may be combined with any other element described or illustrated herein.

Figure 20:
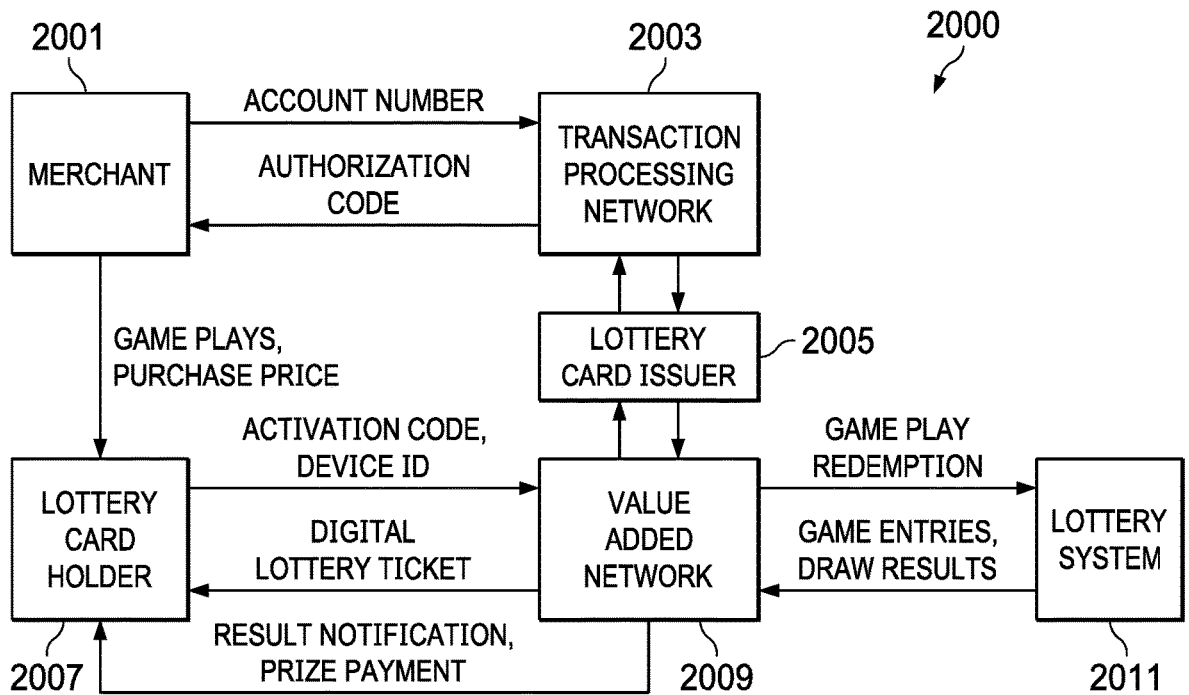
FIG. 20 is a block diagram of a gaming provider system and process, in accordance with some embodiments.

FIG. 20 illustrates a system 2000 for mixed mode lottery game play. For example, multiple lottery games and/or types of lottery games may be played on a single user device. A user device may be a mobile phone, a tablet, a personal computer, a wearable device (e.g. fitness tracker, wrist-worn computer), smart jewelry (e.g. ring or necklace), or any electronic device a configured to receive external information with which a user can interact. Any network described herein may include one or more local or remote computing apparatuses such as game-playing apparatuses. Any box in any figure may represent one or more local or remote computing apparatuses, which may be specially configured (e.g., specially purposed processors or hardware, specially purposed or customized software, etc.) for performing specific operations associated with game-playing transactions. Transactions may include financial data.

Lottery cards may be created and distributed to a merchant 2001. A merchant 2001 may comprise a retail POS terminal, and a lottery card holder 2007 may comprise a user and/or an Internet-enabled user device. A retail POS terminal may be a checkout terminal (e.g. at a grocery store or gas station), a gas pump terminal, or an electronic kiosk (either dedicated for lottery activity or one utilized for other activities, such as movie rental, electronic equipment purchase, or food purchase). Each lottery card may be associated with a unique account number, a unique activation code, a denominated number of game plays, and/or a purchase price. A lottery card may be presented for purchase at a POS. The POS may receive the unique account number and access a TPN 2003 to authorize and complete the purchase of the lottery card, e.g. based on geographic location information of the POS, lottery card, and/or user device. The TPN may further communicate through a lottery card issuer 2005 to inform another system (e.g. a VAN 2009) of transaction information. The lottery card issuer 2005 may be an entity which generates lottery cards and their associated data for distribution to merchants 2001. Additionally, a lottery card issuer may be incorporated within the VAN 2009, or it may not be. Additionally, a lottery card issuer may simply record activity associated with lottery cards (e.g. purchase, activation), but not be involved in generation of lottery card information. After purchase, the lottery card holder may redeem the game plays via an Internet-enabled device (e.g., a mobile telecommunication device such as a mobile phone) by entering the unique activation code from the lottery card on the device. Alternatively, the game plays may be automatically redeemed upon purchase of the lottery card; in such a scenario, the automatic redemption may require submission of user device information (e.g. phone number or NFC information) in order to transfer the redeemed game play to the user device. The device may transmit the unique activation code and lottery card holder's device identification to the VAN 2009. The VAN 2009 may comprise an intermediary system for facilitating game play and/or other transactions among a lottery card holder 2007, merchant 2001, and lottery system 2011. The VAN 2009 may receive and validate the unique activation code, register the lottery card's unique account number with the lottery card holder's device ID (which could be a phone number), and request game entries from the lottery system 2011. The lottery system 2011 may comprise a governmental-run (e.g. state-run) system or government-authorized system, which may define rules, prices, and/or prices of lottery game plays, and which may further facilitate lottery-based transactions (e.g. involving game play or transaction data). The VAN 2009 may receive the game entries and transmit them via a digital lottery ticket to the lottery card holder's device. Upon lottery draw occurrence, the lottery system may transmit results to the VAN 2009. The VAN 2009 may process the results and transmit a result notification to the device registered to the lottery card. If the digital lottery ticket is a low-tier prize winner, the VAN 2009 may send a prize payment to the lottery card holder's registered device (e.g. without additional verification required). If the digital lottery ticket is a high-tier winner, the VAN may provide instruction via the player's device on how to claim the prize with the lottery system.

Figure 21:
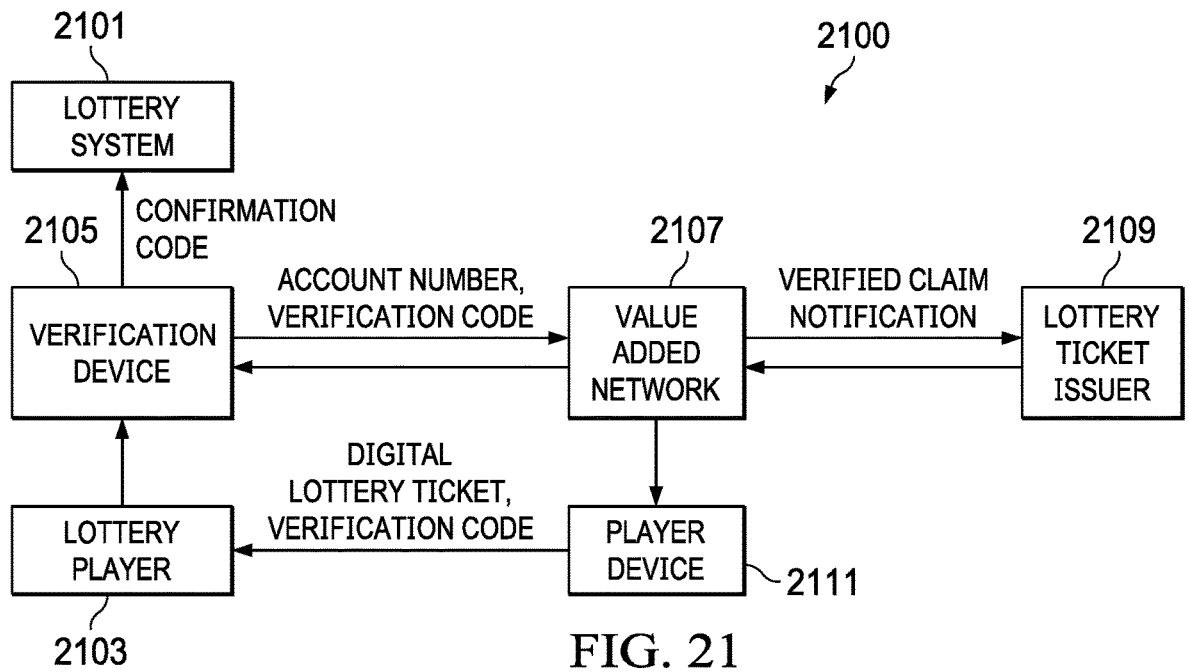
FIG. 21 is a block diagram of a winner verification system and process, in accordance with some embodiments.

FIG. 21 illustrates a verification system and method 2100 for verifying the winner of a digital lottery game play. Such a system and method 2100 may also be advantageous by making the lottery prize redemption process more convenient (e.g. by auto-detect and notify a player) as well as reducing the possibility of lost lottery tickets (e.g. via alternative winner verification methods and/or winner account recovery).

A digital lottery ticket may be issued by a value added network (VAN) 2107 to a lottery player's Internet-enabled device 2111 via two identifying elements: a device identification code (device ID) and a unique account number (PAN). The device ID and/or PAN may be fixed information associated with a player device 2111 and/or lottery card, or they may be mutable information changeable by a lottery player 2103, a VAN 2107, a lottery system 2101, and/or a lottery ticket issuer 2109. A lottery draw may occur and the lottery player with a digital lottery ticket may win a prize. The player 2103 may present the winning digital lottery ticket to a lottery system 2101 to claim the prize. The player may enter the PAN and/or any other identifying information (e.g., associated with the device, the digital lottery ticket, the user, etc.) on an Internet-enabled verification device 2105. The Internet-enabled verification device 2105 may have wireless communication abilities (NFC, RFID, WiFi, Bluetooth, cellular, etc.). The PAN and/or other identifying information may be transmitted to a VAN 2107. The VAN 2107 may analyze the PAN for validation purposes and send a unique prize verification code (PVC) to the device 2111 registered to the PAN. The player may receive the PVC on the registered device 2111 and enter the PVC on the Internet-enabled verification device 2105. The device 2105 may transmit the PVC entered on the device 2105 to the VAN 2107, e.g. to close the validation loop. The VAN 2107 may validate the PVC, send a winner verification code (WVC) to the Internet-enabled verification device 2105, and transmit a verified claim notification to the lottery ticket issuer 2109. The lottery ticket issuer may proceed by granting the verified user the prize. The lottery ticket issuer 2109 may be incorporated within the lottery system 2101, or it may not be. The lottery ticket issuer 2109 may be responsible for generating information associated with lottery games and distributing lottery tickets, or it may just be responsible for distribution of lottery tickets based on lottery game information received from another entity (e.g. a lottery system 2101).

In addition to utilizing a verification device 2105 for "high tier" prize winners, the verification system may enable automatic checking and notification of lottery play results regardless of prize tier. Therefore, the verification system can make the lottery game play process more convenient by not requiring the lottery player to determine the results of a game play (e.g. whether lottery ticket numbers match drawn numbers). Additionally, because only the player device needs to be retained to win and claim a lottery prize, a lottery player cannot lose the lottery ticket as might be the case with physical (e.g. paper) tickets. Further, in the case that a player device 2111 is lost, stolen, or broken, virtual information associated with the player and/or player device 2111 may allow recovery of the lottery account and/or prize winnings associated with the player 2103 and/or player device 2111.

Figure 22:
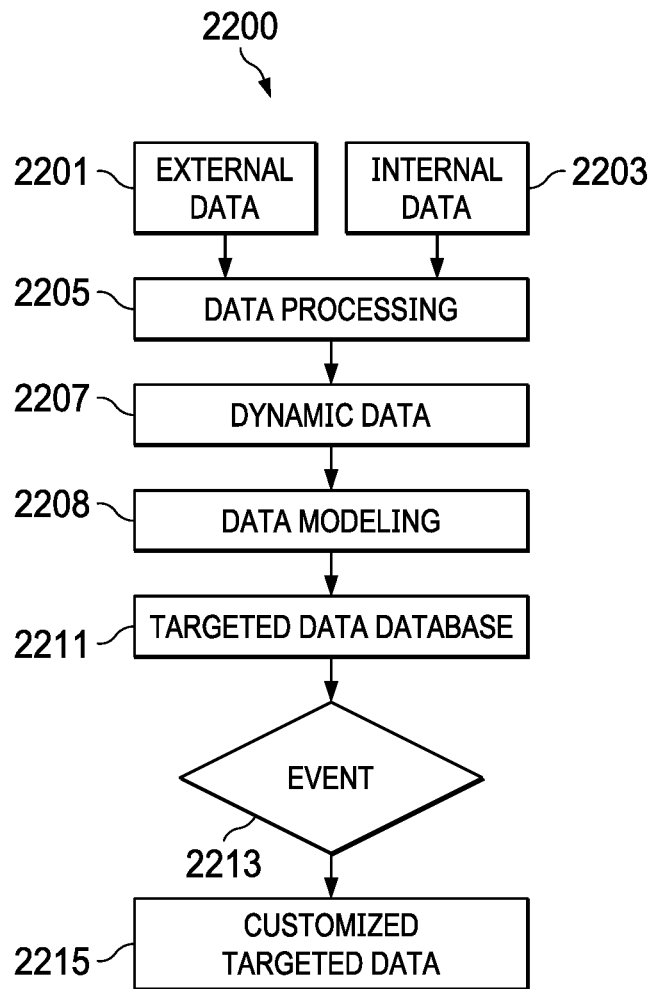
FIG. 22 is a block diagram of an event-driven lottery player marketing system and process, in accordance with some embodiments.

FIG. 22 illustrates a system and method 2200 for delivering event-driven, customizable targeted data (e.g. marketing promotions) to lottery players via an Internet-enabled device.

Patterns of event data may be identified (e.g., over a period of time) to form player profile data. The player profile data may comprise metadata (e.g., player's game playing history including identity of mobile devices used to play games, play's game playing purchase history, player's identification information include age, location, name, other details, etc.) describing a lottery player associated with lottery game play via an Internet-enabled digital device. Player profile data and/or event data may be external data 2201 or internal data 2203. The player data may be processed or combined (e.g., dynamically at the time of delivering the targeted data) to form dynamic data 2207. Customized targeted data 2215 (e.g., targeted signal) may be generated for the player using the dynamic data 2207 based on events 2213 (e.g., winning, losing, purchasing one or more tickets, etc.) associated with lottery game play. For instance, such an event 2213 may include losing a lottery game, and the associated customized targeted data 2215 may include a coupon for the retailer of the lottery ticket. Additionally, a game multiplier purchase may be offered post game entry but pre-draw. Additionally, dynamic data may change on external and/or internal data; for example, a different day of the week may result in different dynamic data, which may in turn result in different customized targeted data. External data 2201 may comprise the prize awarded to the lottery player (e.g. dollar amount) or lottery ticket merchant rules for modifying the prize associated with a lottery win or loss (e.g. offer in-store credit in addition to lottery winnings in order to incent lottery ticket purchase from that merchant). Additionally, external data may comprise any data not collected by a VAN (e.g. data from merchant, transaction processing and/or authorization network, lottery ticket issuer, and/or lottery system). Internal data 2203 may comprise VAN rules (e.g. for rule-based events) or any other data captured by a VAN. Based on the external data 2201 and internal data 2203, a data processing transformation 2205 produces dynamic data 2207 that may change depending on an event 2213. Data processing 2205 may include processing based on defined rules (e.g. set by the VAN) or intelligently generated rules at the time of processing, or it may include processing based on ad hoc rules (e.g. via unclassified pattern recognition). Additionally, data processing may reduce or compress the input sources of data (i.e. external and/or internal data). The dynamic data 2207 can be further informed or modified by a data modeling process 2209 and/or by information from a targeted data database 2211. A targeted data database 2211 may be populated with targeted data by a VAN, merchant, and/or lottery system. Any gaming and/or transaction (e.g. financial transaction) may be a type of computing operation.

Benefits of such a system and method 2200 may include the ability to give lottery ticket merchants more information about lottery players (e.g. regarding their purchase behaviors), and the ability to target specific lottery players with customized targeted data. Such benefits could be employed, e.g., to optimize a lottery player's in-store spending at the merchant location. Such a system and method 2200 could also allow other entities to benefit from lottery player information and the ability to customize targeted data to lottery players (e.g. a lottery system associated with a first state may wish to offer a discount to a lottery ticket purchaser who has just arrived from a second state). Note that regardless of whether such a system and method 2200 is employed, other entities beyond the VAN (e.g. merchant, lottery system) could still receive and/or benefit from information processed by the gaming provider system. For example, the VAN may provide merchants with lottery player purchase information to incentivize merchant participation.

Figure 23:
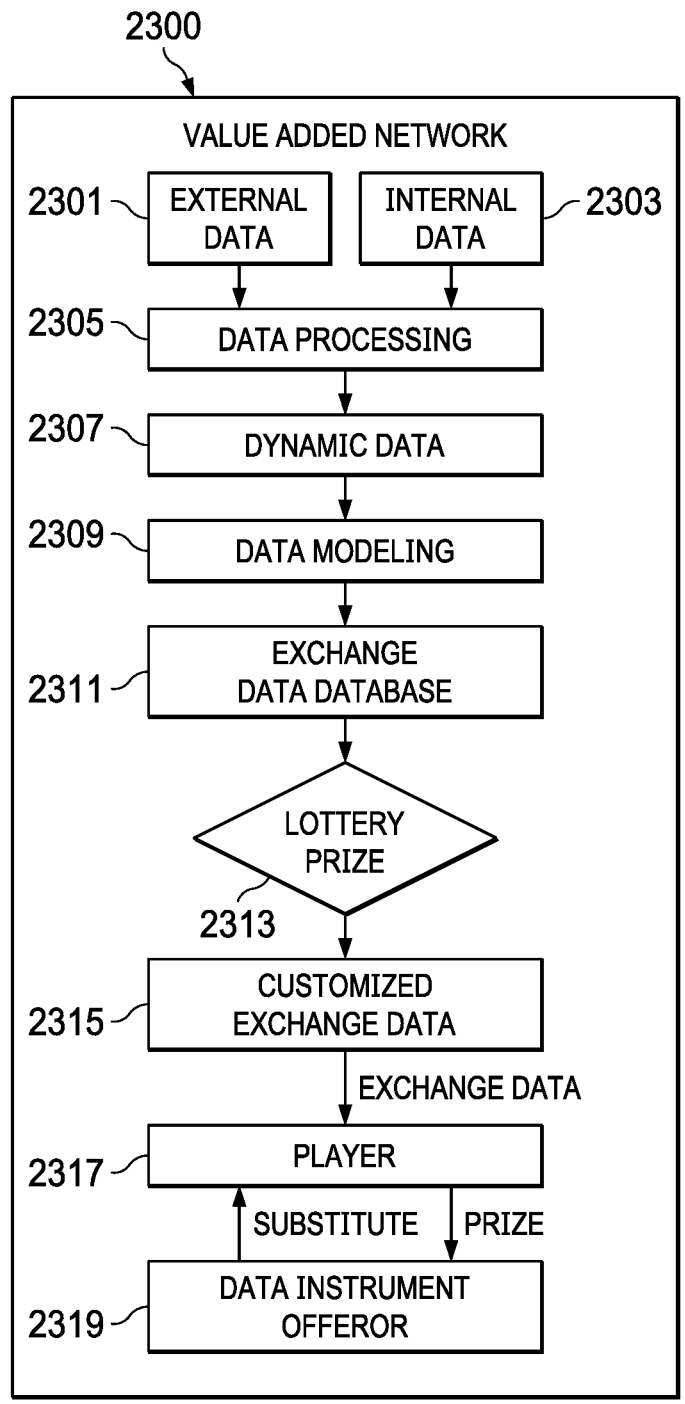
FIG. 23 is a block diagram of a lottery prize exchange system and process, in accordance with some embodiments.

FIG. 23 illustrates a system and method for enabling a lottery player to exchange the denominated monetary value of a prize for a substitute monetary instrument of equal or greater value.

Within a value added network (VAN), patterns of event data may be identified to form customer profile data. The customer profile data may comprise metadata describing a lottery player associated with lottery game and metadata describing a customer associated with a loyalty program. This metadata may include external data 2301 and/or internal data 2303. The customer data may be processed 2305 to form dynamic data 2307 (e.g., at the time of presenting the exchange data). After a lottery draw occurs, a lottery game entry associated with the customer playing the lottery may win a low-tier prize in a lottery drawing. Using the dynamic data 2307, customized exchange data 2315 (e.g. exchange offer) to exchange the denominated monetary value of a lottery prize 2313 for a monetary instrument of equal or greater value may be generated based on a data modeling process 2309 and exchange data database 2311. This may involve cross-referencing an exchange data database and suggesting one or more exchange data consistent with the customer profile data (e.g., based on other players with similar profile data selecting or being presented with particular exchange data). The exchange data database may contain exchange data and their associated lottery prizes. The exchange data database may be populated by a VAN, merchant, and/or lottery system (e.g., and may be populated based on historical or predicted player preferences). The player 2317 may accept or decline the exchange data 2315. If a player 2317 accepts the exchange data 2315, a monetary instrument may be provided to the player at the agreed upon value and the ownership of the prize 2313 is transferred to the data instrument offeror 2319 of the substitute monetary instrument. Such a system and method 2300 may be employed to augment the winnings for a player 2317 while also benefiting the data instrument offeror 2319. For example, a merchant may offer a gift card of higher value to a prize-winning player 2317 in order to increase the player's 2317 loyalty to that merchant.

Figure 24:
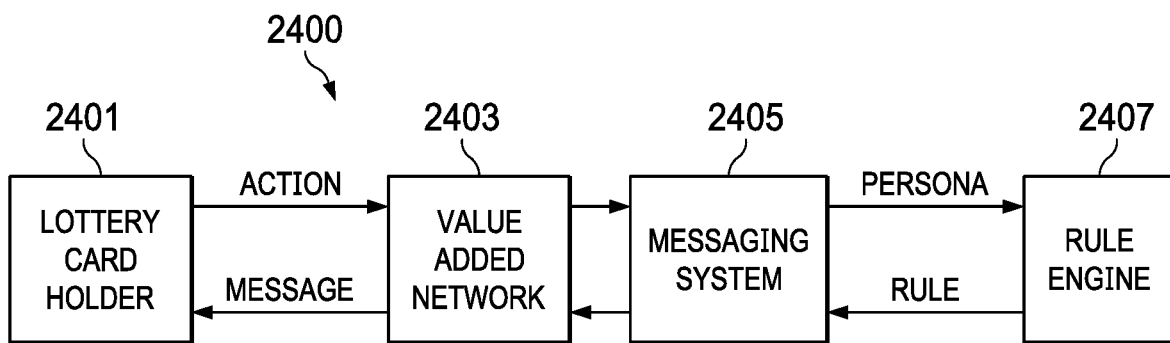
FIG. 24 is a block diagram of an event-driven lottery messaging system and process, in accordance with some embodiments.

FIG. 24 illustrates a system and method for event driven rule-based messaging for device-enabled lottery gameplay.

A flexible, event driven and conditional rule-based messaging system (e.g., an intelligent messaging system) may be implemented for use in lottery applications. A rule mechanism may be implemented having a "When-If-Then" event-driven, conditional, action-invoking approach that permits definition of a repertoire of events considered to be significant events upon which to trigger actions specific rule-based messages. Each particular event may be associated with a specific mail message and/or rules to promote context relevant messaging. It is possible that only relevant rules, i.e. those associated with a satisfied event, need to be further processed. A graphical user interface to a structured rule editor may facilitate synthesis of rules by a lottery application via a rule engine 2407. The rule engine 2407 may be substantially transparent. A modular architecture for the structured rule editors could allow an extensible and portable facility invoking selected rule scripting language to implement various functions in the context of various lottery game play environments. Such a rule-based messaging system and method 2400 for lottery gameplay may transmit messages originating from a rule engine 2407 and messaging system 2405 to a lottery card holder 2401 via a value added network 2403. The rule engine 2407 may be informed in part by a persona. A persona may be data associated with a user and/or a user device (e.g. lottery game play purchase activity, game play wins, game play losses, game play prize amounts, location information, jurisdiction information, and/or user-defined preferences relating to rule-based messaging system interaction). Rules may be based on a user profile (e.g. prior user behavior or disclosed user preferences and/or characteristics), a user location, and/or other technical logic. For example, a lottery card holder 2401 may be notified of new lottery gameplay data instruments when it is determined that the lottery card holder's 2401 location has changed from a first state to a second state. A messaging system may be used to relay information from a rule engine 2407 to the lottery card holder 2401. Such messages may be transmitted over a cellular network, or via the Internet. The rule engine may be a part of and/or population by a VAN, lottery system, and/or merchant.

Figure 25:
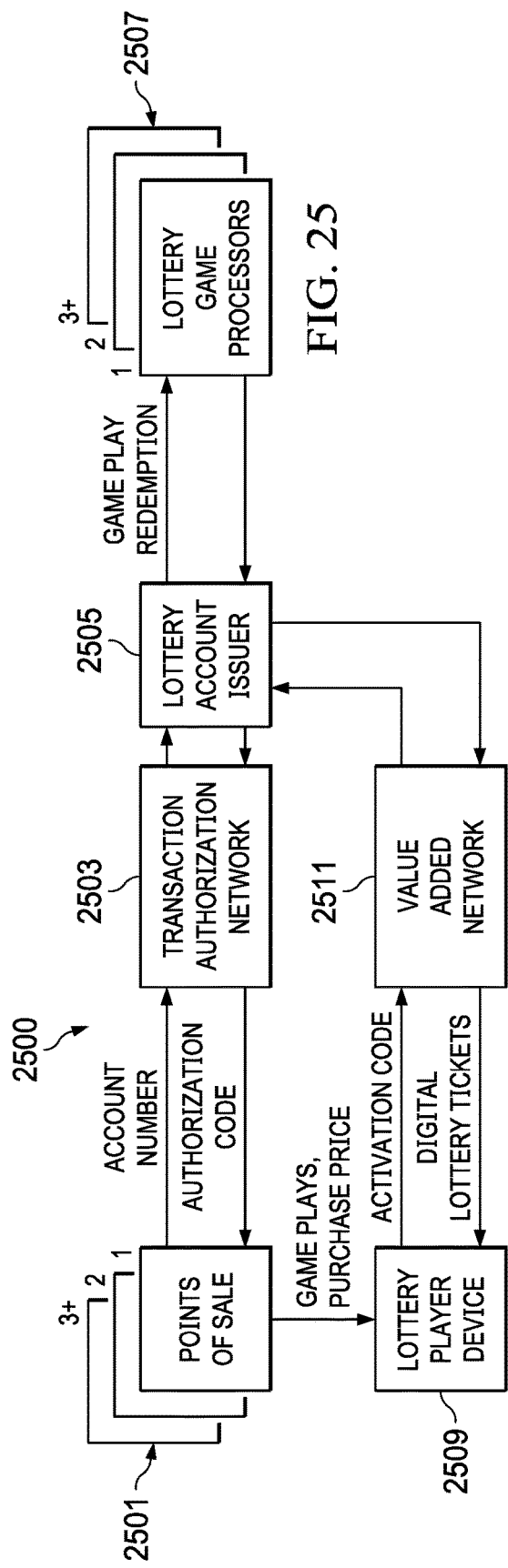
FIG. 25 is a block diagram of a multi-jurisdictional gaming provider system and process, in accordance with some embodiments.

FIG. 25 illustrates a system and method for entering lottery games in more than one lottery system jurisdiction via a single Internet-enabled device.

Lottery game play may be enabled by a point-of-sale solution (POS) 2501, lottery account (account), transaction authorization and/or processing network (TPN) 2503, value added network (VAN) 2511, and Internet-enabled device (device) 2509. Lottery game play may be further enabled by a lottery account issuer 2505 and one or more lottery game processors 2507. A lottery player may purchase a lottery game entry using an account at a POS 2501 in one jurisdiction. The game entry purchase is processed via an account, TPN 2503, VAN 2511 and a device 2509. A lottery account may be associated with a lottery card, lottery player, lottery player device 2509, none of these, or some combination of the previously listed. A lottery account may be utilized to verify lottery game compliance, lottery game-associated transaction, and/or lottery player identification. The account holder enters the lottery game via a device 2509. The device 2509 receives a digital lottery ticket following game entry. The lottery player then purchases a lottery game entry in a separate lottery jurisdiction using the same account. Following the purchase, the cardholder may receive an additional digital ticket for the new lottery jurisdiction on the device 2509. The process can repeat indefinitely, allowing the player to enter in one or more lottery games in two or more lottery jurisdictions without limitation. Such a system and method 2500 may be beneficial by automating lottery gameplay compliance regardless or user location and/or lottery jurisdiction. Additionally, such a system and method 2500 may allow gameplay of multiple lottery games from different jurisdictions on a single player device and/or within one or more locations and/or jurisdictions. Note that a lottery jurisdiction may be associated with a state, may be associated with a region within a state, or may not be associated with either. The TPN may facilitate, authorize, and/or record transactions at at least one POS, and may further relay information to/from a lottery account issuer 2505. A lottery account issuer may be part of a VAN 2511 or it may not be. A lottery account issuer may generate and distribute lottery account information, or it may distribute lottery account information received from another entity (e.g. VAN 2511 and/or lottery game processors 2507). Lottery game processors 2507 may be government—(e.g. state-) run, or they may be authorized by a governmental entity. Further, lottery game processors may generate and/or distribute information associated with lottery gameplay (e.g. game play price, game play prize(s), game play information, game play eligibility based on location and/or jurisdictional information).

Figure 26:
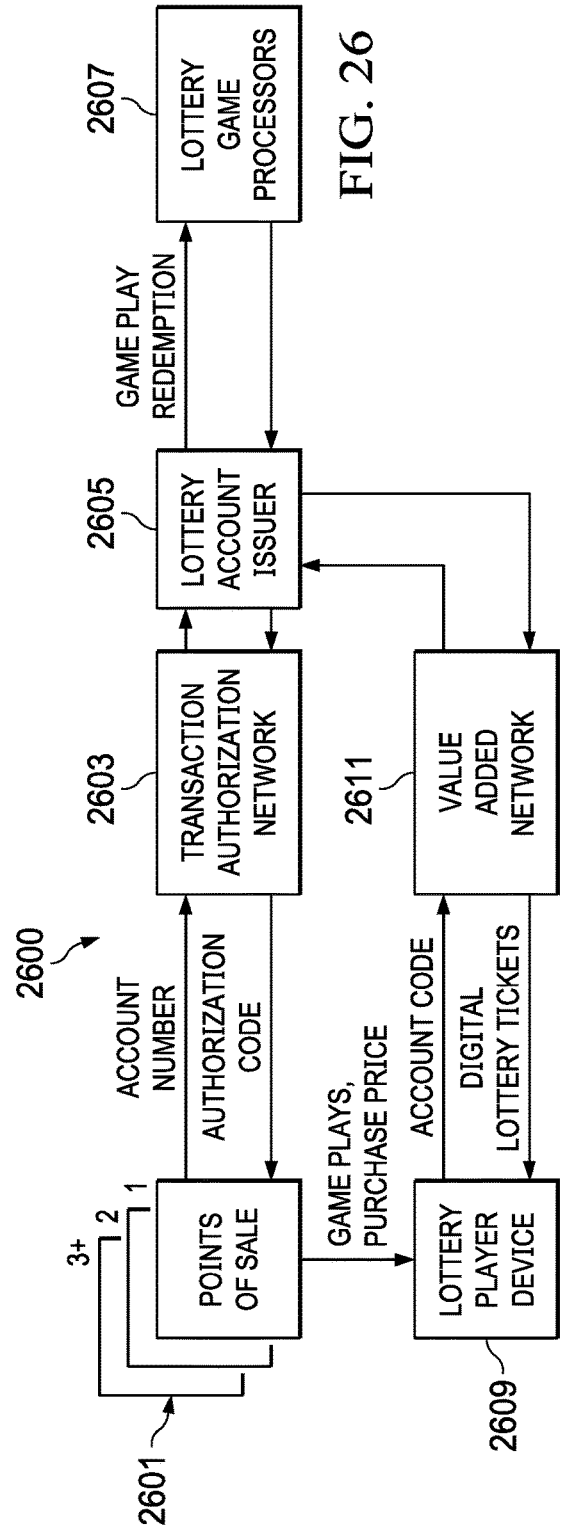
FIG. 26 is a block diagram of a multi-game entry gaming provider system and process, in accordance with some embodiments.

FIG. 26 illustrates a system and method for purchasing lottery game entries in more than one lottery system jurisdiction.

Lottery game play may be enabled by a point-of-sale solution (POS) 2601, lottery account (account), transaction authorization and/or processing network (TPN) 2603, value added network (VAN) 2611, and Internet-enabled device (device) 2609. Lottery game play may be further enabled by a lottery account issuer 2605 and lottery game processors 2607. A lottery player may purchases a lottery game entry using a lottery account at a POS 2601. The lottery game purchase is processed via a lottery account, TPN 2603, VAN 2611 and a device 2609. The lottery account holder may enter the lottery game via the device 2609. The device 2609 may receive a digital lottery ticket on the device 2609 following game entry. The lottery player may purchase a subsequent lottery game entry at a POS 2601, and the process repeats resulting in two or more lottery game entries for an account (e.g., associated with at least one of device identification information, phone number, user identification information, etc.) and two or more digital lottery tickets received on a single device 2609. Such a system and method 2600 could allow for multiple lottery games to be played on the same device 2609, even if the lottery games originate from different jurisdictions or are associated with different gaming providers. Additionally, prizes from different game plays (e.g., associated with different gaming providers and/or jurisdictions, or associated with different game types) could be aggregated into a single prize, which may be more convenient for the lottery player and/or any other entity in the lottery gameplay system. Additionally lottery game play activity from multiple different lottery games could be summarized in one location (e.g. visible on virtual page of a user device).

Figure 27:
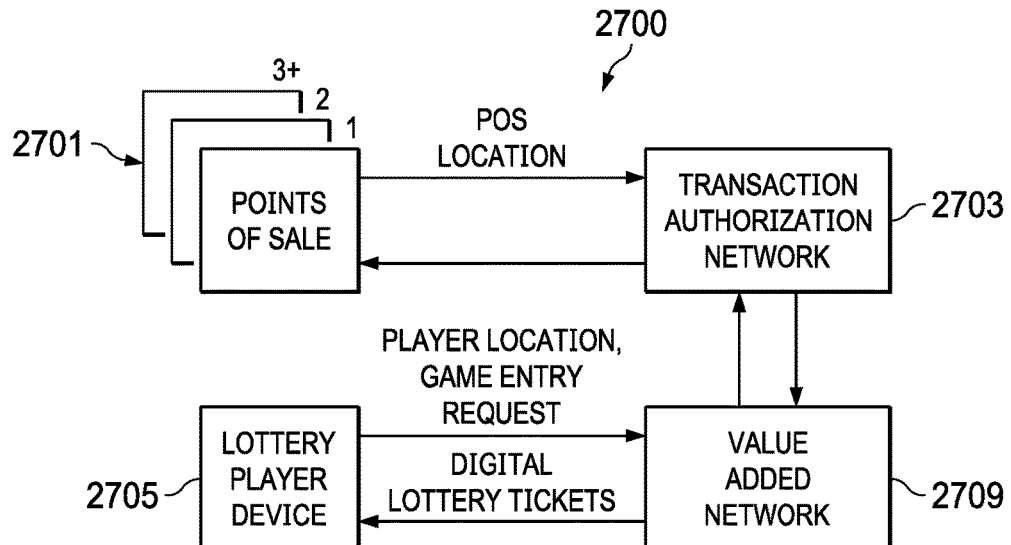
FIG. 27 is a block diagram of a location-aware gaming provider system and process, in accordance with some embodiments.

FIG. 27 illustrates a system and method for location-aware lottery gameplay.

Lottery game play may be enabled by a point-of-sale solution (POS) 2701, lottery account (account), transaction authorization and/or processing network (TPN) 2703, value added network (VAN) 2709 and Internet-enabled device (device) 2705. A lottery player may purchase a lottery game entry using a lottery account at a POS 2701. The lottery game purchase is processed via a lottery account, TPN 2703, VAN 2709 and a device 2705. The VAN 2709 may receive and/or record the POS 2701 location information. The lottery account holder may request entry into the lottery game via the device 2705. The device 2705 may transmit the lottery account holder's location to the VAN 2709. The VAN 2709 may cross-reference and/or compare the location of the POS 2701 location (e.g., at the time of purchase) and the location of the lottery account holder's device 2705 at the time of request to confirm at least partially matching jurisdictions. Game entry may be conditionally allowed if jurisdictions match (or at least partially match). Game entry may be conditionally disallowed if jurisdictions do not match (or do not at least partially match). Such a system and method 2700 may utilize GPS signals, cellular tower localization, IP address, user input, or other information to determine device 2705 and/or POS 2701 location and/or jurisdiction.

FIG. 28 illustrates a system diagram of a gaming provider system 2800. Some embodiments may use all the elements shown in the FIG. 2800, while some may not. Additionally, some embodiments may employ additional elements not shown in the FIG. 2800, while others may not. The elements of such a gaming provider system 2800 have previously been described. Such a system may comprise a user 2801, POS 2803, TPN 2805, VAN 2807, lottery system 2809, user device 2811, lottery card, 2813, card issuer 2815, messaging system 2817, and/or transaction facilitation system 2819. The transaction facilitation system 2819 may facilitate financial transactions, such as post or pre-gaming financial transactions.

In some embodiments, motion and/or orientation sensors (e.g. accelerometer, gyroscope, magnetometer) associated with the lottery player device may be utilized to influence lottery registration, lottery card issuance, lottery gameplay, lottery prize, lottery prize payment mechanism, customized targeted data, exchange data, customer data, fraud detection, and/or user identification. For example, a unique motion associated with a user may be required to be performed before a purchase is allowed or a prize is claimed. Additionally, some games may be played in part or in whole by physical device motions (e.g. shake, tilt).

Figure 29:
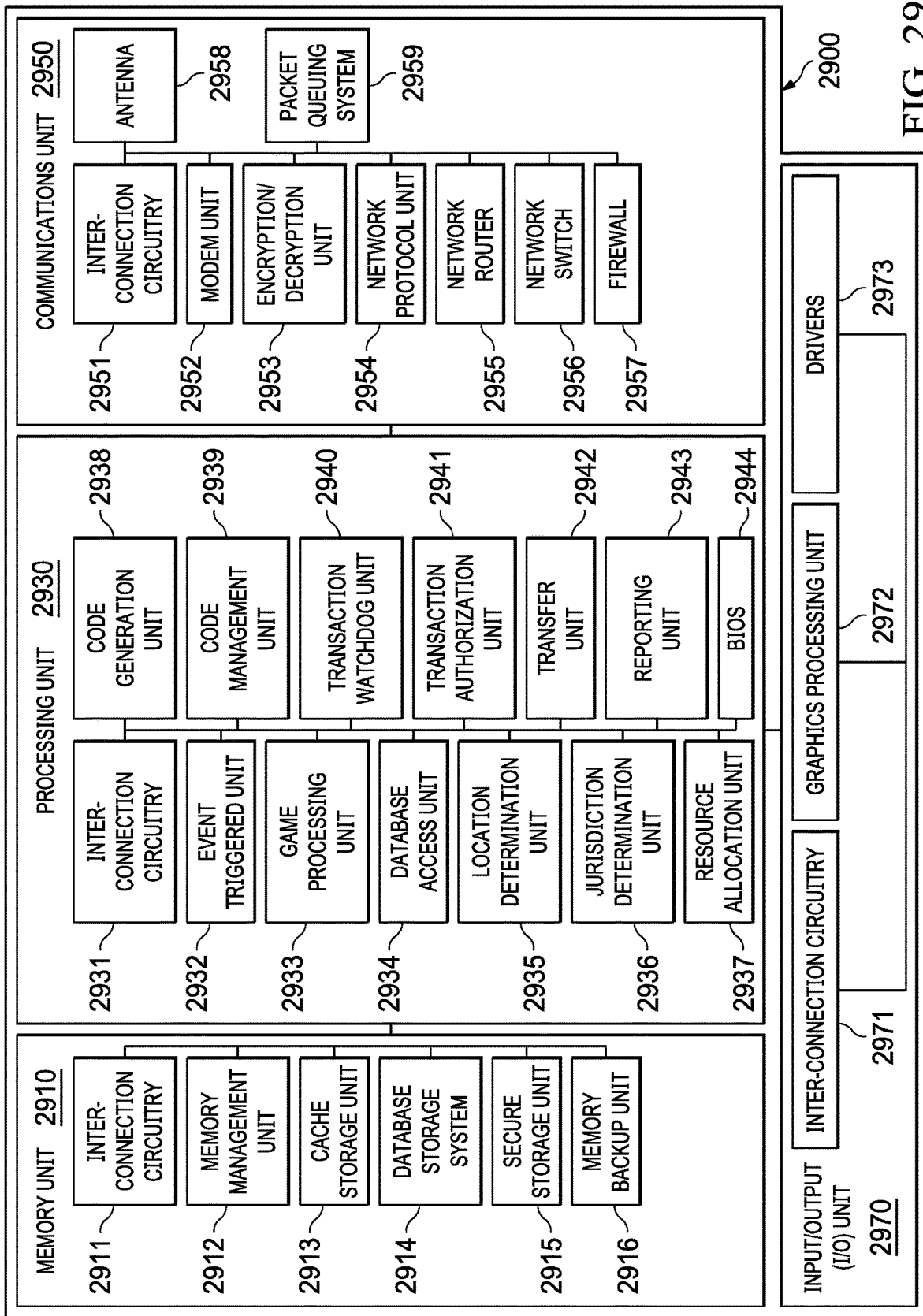
FIG. 29 is a block diagram of another gaming provider system, in accordance with some embodiments.

FIG. 29 illustrates a system diagram of a gaming provider system. Some embodiments may use all the elements shown in the FIG. 2900, while some may not. Additionally, some embodiments may employ additional elements not shown in the FIG. 2900, while others may not. Any element may communicate with any other element via inter-communication circuitry 2911, 2931, 2951, 2971 and connections between functional blocks 2910, 2930, 2950, 2970. The various elements may be present in any local or remote computing device described in this disclosure, such as any of the boxes illustrated in any of the preceding figures. In some embodiments, one or more of the elements may be specialize hardware or software elements for specifically performing an operation associated with a gaming transaction.

A processing unit 2930 may contain an event triggered unit 2932, for example to implement rule-based messaging. Further, the processing unit 2930 may contain a game processing unit 2933, for example to send and receive gameplay information between a lottery player device and lottery system. Further, the processing unit 2930 may contain a database access unit 2934, for example to efficiently store and access gaming provider system information via a database storage system 2914. This information may include user profile data, transaction histories, lottery account numbers, and/or numbers associated with lottery cards. The processing unit 2930 may further comprise a location determination unit 2935, for example to determine lottery player device or point of sale jurisdiction or to determine appropriate targeted data or exchange data. The processing unit 2930 may further comprise a jurisdiction determination unit 2936, for example to determine lottery jurisdiction from location information. Location information (and/or associated jurisdiction information) may be used to authorize lottery game play purchase and/or determine lottery game play exchange data. The processing unit 2930 may further comprise a code generation unit 2938, for example to appropriately generate lottery card codes based on previously issued codes and in order to avoid fraud issues. A code management unit 2939 may further monitor issued, expired, and or pending codes, as well as inform the code generation unit 2938 of preferable codes to use in the future. A transaction watchdog unit 2940 may monitor transactions and/or lottery card activations associated with the gaming provider system 2900 in order to detect malfunctioning or fraudulent activity. A transaction authorization unit 2941 may receive and either authorize or reject transactions associated with the gaming provider system 2900 depending on, e.g., jurisdiction information, lottery system rules, gaming provider system 2900 rules, and/or transaction facilitation system information. A transfer unit 2942 may direct payments from the appropriate sender to the appropriate receiver, e.g. from a lottery system to a transaction facilitation system or a transaction account associated with a lottery player. A reporting unit 2943 may record, process, and/or report transfers that have occurred via the transfer unit 2942 (including financial transfers). A resource allocation unit 2937 may monitor resource usage of the processing unit 2930 and appropriately allocate resources, e.g. depending on resource needs, constraints, and/or processing unit 2930 rules.

A memory unit 2910 may be used to store information associated with the gaming provider system 2900, potentially utilizing a cache storage unit 2913, a database storage system 2914, a secure storage unit 2915, and/or a memory backup unit 2916. Further, a memory management unit 2912 may be utilized to monitor memory resource usage and/or appropriately direct send and/or receive requests from the processing unit 2930. A communications unit 2950 may be employed to facilitate communications between the gaming provider system 2900 and external entities, e.g. a lottery system, transaction facilitation system, messaging system, transaction processing network, card issuer, and/or lottery player device. The communications unit 2950 may employ a modem unit 2952, encryption/decryption unit 2953, network protocol unit 2954, network router 2955, network switch 2956, firewall 2957, antenna 2958, and/or packet queuing system 2959. The packet queuing system 2959 may prepare packets associated with lottery system, transaction facilitation system, messaging system, and/or communications network metadata for transmittal or reception. A input/output unit 2970 may be employed to facilitate human interaction with the lottery provider system 2900. A graphics processing unit 2972 and/or hardware peripheral drivers 2973 (e.g., one or more specialized drivers) may be utilized.

Figure 30:
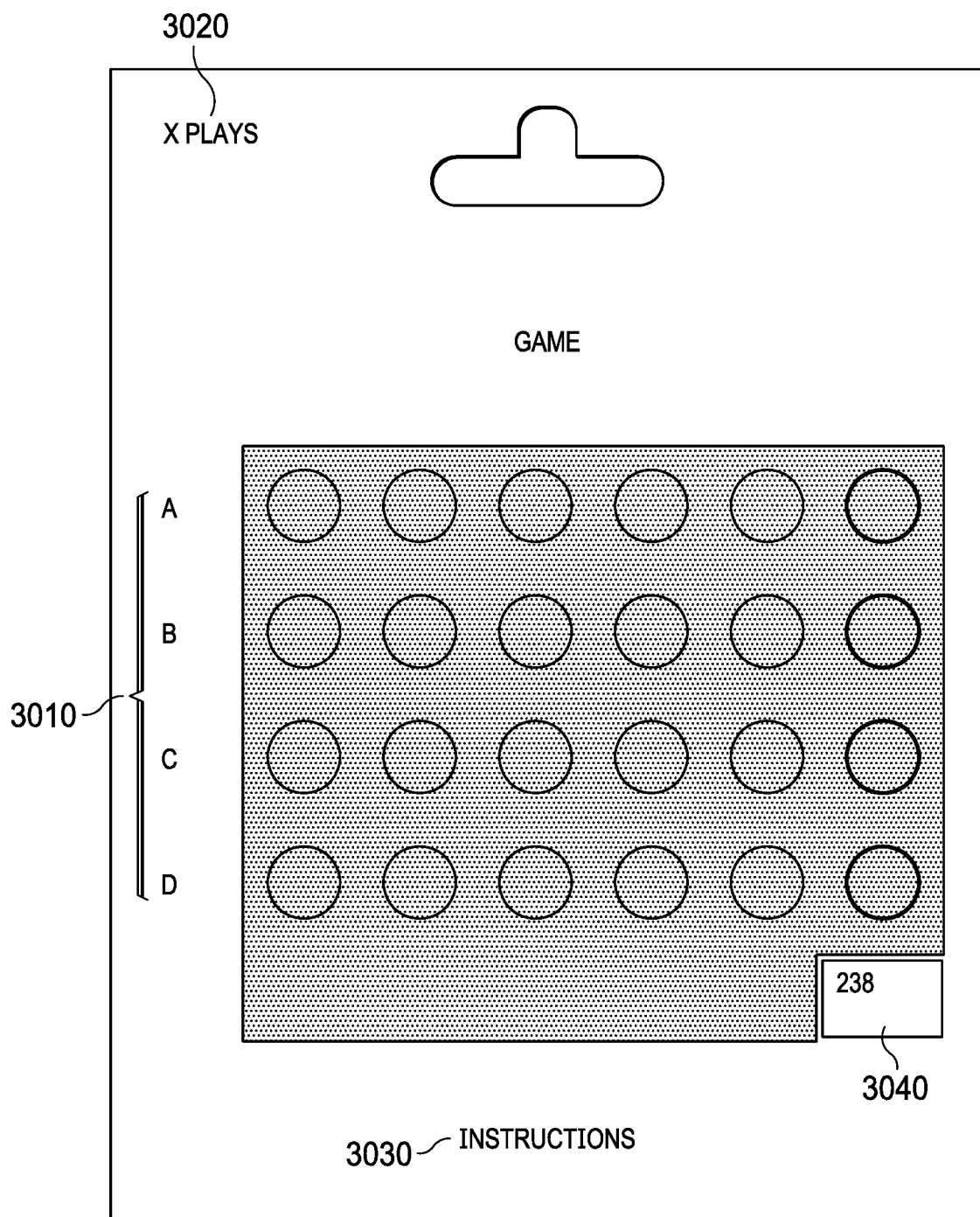
FIG. 30 shows an unscratched gaming card, according to some embodiments.

FIG. 30 shows an unscratched gaming card (i.e., a gaming card in a first state), according to some embodiments. The gaming card may also be referred to as a gaming apparatus, a gaming instrument, a gaming device, a user apparatus, a user instrument, a user device, a game card, a gaming ticket, a lottery card, a non-lottery gaming card, etc. The gaming card may be a one-time use/play/draw card or multiple-time use/play/draw card. The gaming card may be used to play one or more games of the same type or of different types (e.g., two different lottery game types associated with different entities). The structure or shape of the card may be similar to that of a gift card. The number of plays 3020 may be indicated in the top left hand corner of the card. The number of plays may correspond with the number of rows of numbers, e.g., four plays refer to four rows of numbers. The numbers may be covered and not visible and may become visible in response to user interaction with one or more portions of the card (e.g., scratching off the surface of the card, mechanical contact-based interaction with the surface of the card, or any other interaction including electronic interactions such as contactless transactions between a device or other instrument and the card). The number 3040 could be a sequence number or information for a card in a pack of cards. The numbers associated with all the plays on the card may be referred to as a game board 3010. Each play may be associated with a particular draw date or the same draw date. In some embodiments, multiple plays may be associated with one or more draw dates. A draw date may refer to a date on which the winning numbers associated with the game are revealed. In some embodiments, at the time of purchasing the card, the card may be customized for a user-specified number of plays. In other embodiments, the card may include a pre-determined number of plays. In such embodiments, a price associated with the card may be indicated on the card (e.g., on the top right side). In some embodiments, instructions 3030 for playing may be presented on the card. In some embodiments, the card may printed at the time of purchase. In some embodiments, the card may be pre-printed and stacked with other gift cards in a store. In some embodiments, the card is, additionally or alternatively to the physical card, an electronic card that is visible on a display screen of a mobile computing device or other computing device.

Figure 31:
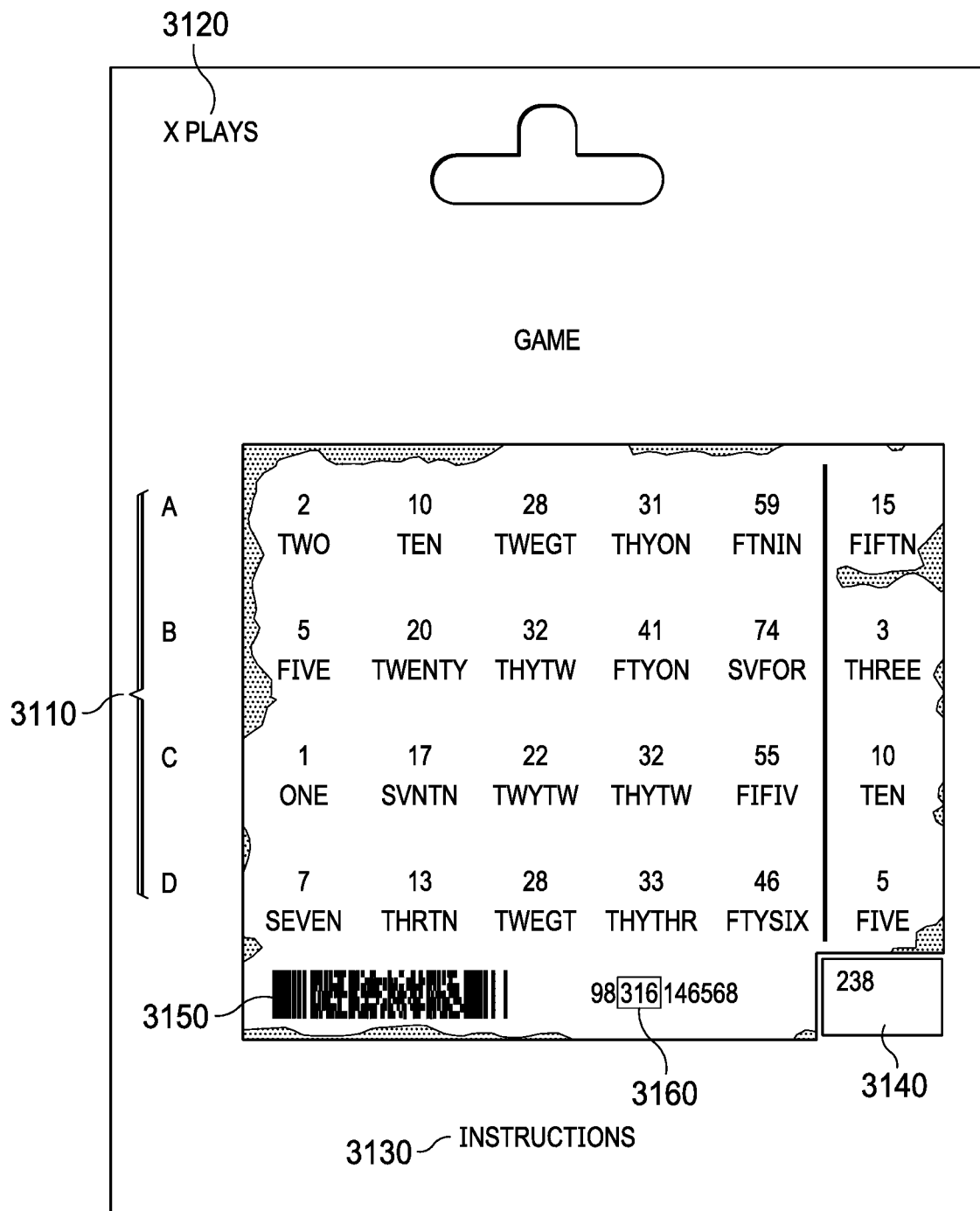
FIG. 31 shows a front side of a scratched gaming card, according to some embodiments.

FIG. 31 shows a front side of a scratched gaming card (i.e., a gaming card in a second state), according to some embodiments. As described previously, the numbers in the card may be revealed using scratching, or one or more other contact-based or contactless interactions. The numbers may be randomly generated numbers and pre-printed on the card. The numbers may be within ranges associated with a particular game. In some embodiments, the numbers may alternatively or additionally include text or other information. In some embodiments, the interaction also reveals a redemption code 3150 (e.g., barcode, QR code, or other type of readable indicia, which may be invisible or invisible). The redemption code 3150 may also be associated with a number 3160, which may represent identification information associated with the card, a play, a location or store where the card is located (for purchase) or was generated, etc.

Figure 32:
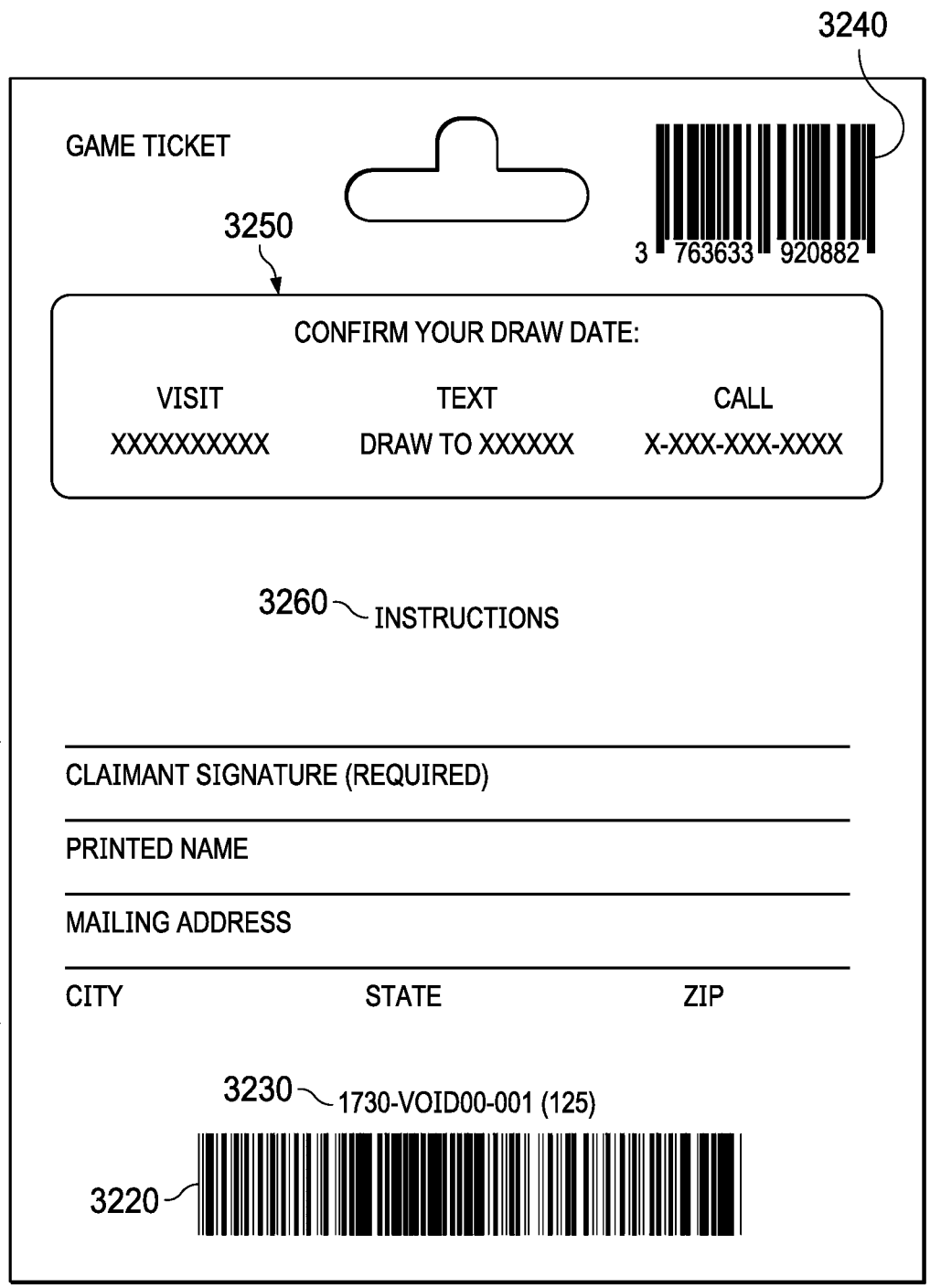
FIG. 32 shows a back side of a gaming card, according to some embodiments.

FIG. 32 shows a back side of a gaming card (e.g., a scratched gaming card), according to some embodiments. Any of the codes (e.g., 3220, 3240, 3150) presented in FIGS. 31 and 32 may be presented on any side (i.e., front or back) of the card, an/or may be presented as fewer or more codes. The code 3240 may be an identification code for the card. For example, the code 3240 may be scanned at the time of purchase. This code 3240 and any other code described herein may refer to a barcode, QR code, or other type of readable indicia, which may be invisible or invisible. At any time, the user (e.g., the holder, possessor, purchaser, customer, or giftee) may verify or confirm the draw date associated with the card (or any one or all plays associated with the card) by visiting a website, texting a code (e.g., "draw") to a particular number, or calling a particular number. In some embodiments, the back of the card includes information associated with redemption of prizes (e.g., instructions 3260) and an area 3210 for a user to input user information. The back of the card may also include a number 3230 or other information indicative of a serial number of the card (or other card identification information, play information, or any location information described herein including store or merchant associated with the card, etc.), or a pack (i.e., pack of cards) associated with the card. In some embodiments, the number 3230 may comprise activation information for activating the card. In some embodiments, the back of the card may also include a code 3220 for activating the card. The activation procedure is described in further detail below. While three codes are presented in FIGS. 31 and 32, fewer (e.g., one code) or more codes may perform the functions of the three codes. In some embodiments, the instructions 3260 include prize redemption instructions, how to associate the plays with upcoming draws, etc. For example, after the card is purchased, play A (i.e., the numbers associated with play A) is entered into the next draw (e.g., June 15) associated with the game. Plays B, C, and D may also be entered into the next draw associated with the game. Alternatively, play B may be reserved for a future draw (e.g., the next contiguously scheduled draw on June 18 after the next draw on June 15). Play B may not be entered into that future draw until after the next draw. Alternatively, play B may be directly entered into that future draw.

In some embodiments, code 3240 is scanned at the time of purchase. Code 3220 may also be scanned at the time of purchase, e.g., before, after, or simultaneously with code 3240. The scanning may be performed at or by a retail terminal (e.g. comprising a scanner), which may be a mobile computing device or a non-mobile computing device, which may be located at an store or entity described herein. In some embodiments, scanning may refer to any form of interaction between the card and the retail terminal. For example, the interaction may be any contact-based or contactless interaction. Code 3150 (e.g., for redeeming a prize or checking whether the play or numbers are winning numbers for a draw) may be scanned (or otherwise interacted with) at a gaming terminal such as a lottery terminal. Code 3150 may be covered at the time of purchase such that it is not visible to an observer, though in other embodiments code 3150 is not covered at the time of purchase. Each of the codes described herein may be scanned at the same or different terminals, which may even be a user's mobile phone.

Figure 33:
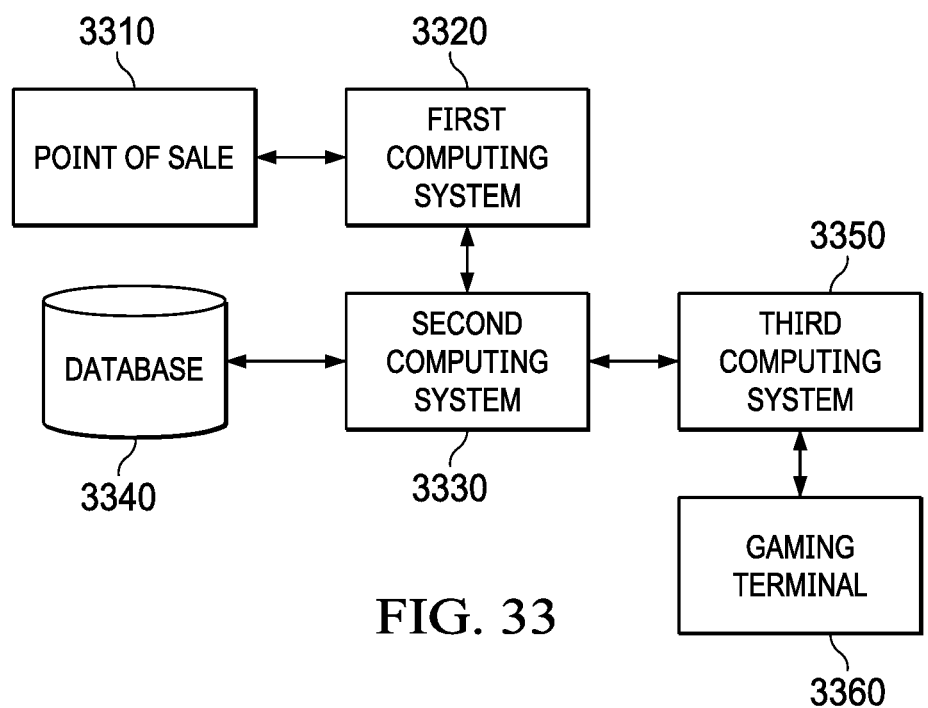
FIG. 33 shows a gaming network environment, according to some embodiments.

FIG. 33 shows a gaming network environment, in accordance to some embodiments. Any communication described herein with respect to this or any other environment may be accomplished using any wired or wireless mechanisms such as short-range or long-range wireless mechanisms, including any described in this disclosure. While the operations are described as being performed by three computing systems, they could alternatively be performed by fewer or more computing systems. The first computing system 3320, the second computing system 3330, and/or the third computing system 3350, and/or the POS terminal 3310 may include or comprise any elements or features that are described as being present in at least one of any other device, system, apparatus, instrument, etc., of this disclosure, and/or may perform any operations or transactions described as being performed by at least one of any other device, system, apparatus, instrument, etc., of this disclosure. The communications described and indicated in FIG. 33 could be either one-way or two-way communications. In some embodiments, the terms "operation" and "transaction" may be used interchangeably.

Any gaming card or lottery card (e.g., the card of FIG. 30) described herein may be scanned or otherwise caused to be interacted with at a point-of-sale (POS) terminal 3310. The POS terminal 3310 may be located in a retail store, and may be a mobile or non-mobile computing device. In some embodiments, the mobile computing device may be a mobile phone. The various computing systems may be associated with one or more entities. In some embodiments, when a card is scanned at the POS terminal 3310 (e.g., the code 3220 and/or the code 3240 is scanned), the POS terminal 3310 sends a card activation request to the first computing system 3320. The card activation request may be associated with one play, all plays, or a selective number of plays associated with the card. The activation request may include a serial number or other identification information associated with the scanned card. Additionally, the activation request may include POS information, e.g., at least one of POS terminal identification information, store or merchant information (e.g., identification information) associated with the POS terminal, location information associated with the POS terminal, or partial portions thereof, etc. In some embodiments, any location or location information may additionally or alternatively include identification information, and vice versa. Any location information described herein may include location indicators, identifiers, etc. In some embodiments, the first computing system 3320 forwards the activation request to the second computing system 3330. In other embodiments, the first computing system 3320 processes or performs operations on the activation request, and then sends the processed activation request to the second computing system 3330. In some embodiments, functions associated with one or more computing systems may be performed by fewer or more computing systems. In some embodiments, the activation request comprises information in the code 3220 (and/or in the information 3230). The information in or represented by the code 3220 (and/or in or represented by the information 3230) may comprise information described as being comprised in or transmitted in an activation request.

In some embodiments, the second computing system 3330 includes or communicates with a database 3340. The database 3340 comprises plays (i.e., randomly generated number sets) associated with identification information of cards. In some embodiments, card identification information may refer to ticket (e.g., lottery ticket) identification information associated with one or more game plays (e.g., associated with one or more games). Therefore, communication with the database 3340 reveals a randomly generated number set (or more than one set) associated with card identification information received at the second computing system 3330, either from the first computing system 3320 or received directly from the POS terminal 3310.

In some embodiments, the second computing system 3330 receives the card identification information and the POS information (e.g., in the activation request) and compares the received information with information stored (e.g., location and/or identification information associated with the POS terminal, merchant, store and/or card identification information, or partial portions thereof) in the database 3340 to determine correspondence (e.g., partial or full correspondence) or a match (e.g., full correspondence). For example, the second computing system 3330 determines whether the POS information received in the activation request at least partially corresponds (or matches) with the POS information, associated with the card identification information, stored in the database 3340. As a further example, the second computing system 3330 determines, based on the information in the activation request and based on accessing the information stored in the database 3340, one or more game plays listed on the card. Therefore, the second computing system 3330 uses the received card identification information to find matching or corresponding card identification information in the database 3340, and then determine one or more plays associated with that card identification information.

If a match is found, by the second computing system 3330, for the card identification information and/or the POS information, the second computing system 3330 sends a game wager request or a game-playing request to the third computing system 3350, which may be a gaming system associated with one or more games. The game wager request includes one or more game plays (or randomly generated number sets) associated with the card identification information. The game wager request may also include the card identification information, or identification information associated with or generated based on the card identification information.

In some embodiments, a user of the card may scan the card or allow the card to be scanned at a terminal 3360 (e.g., a gaming lottery terminal comprising a scanner) following a draw time. If the user is a winner, the terminal may send a redemption request from the terminal 3360 to the third computing system 3350, either directly or via at least one of the first computing system 3320 and/or the second computing system 3330. The third computing system 3350 may access a database or file (e.g., the same database as or different from database 3340) to compare the card identification information included in the redemption request with winning card identification information included in the file (e.g., the winner's file). If a match is found, the third computing system 3350 sends the prize amount to the terminal 3360 or a different terminal (e.g., associated with a user of the card) for initiating or executing a payment process, or directly to a previously registered account associated with the card identification information.

Alternatively, in some embodiments, the second computing system 3330 may send winning card identification information to the third computing system 3350, wherein the second computing system 3330 uses a process similar to that used by the third computing system 3350 to determine winning card identification information.

The third computing system 3350 also sends confirmation of payment to the second computing system 3330, and the second computing system accordingly updates a record associated with the card identification information in the database 3340. The second computing system 3330 may send a confirmation of the update to the third computing system 3350.

Figure 34:
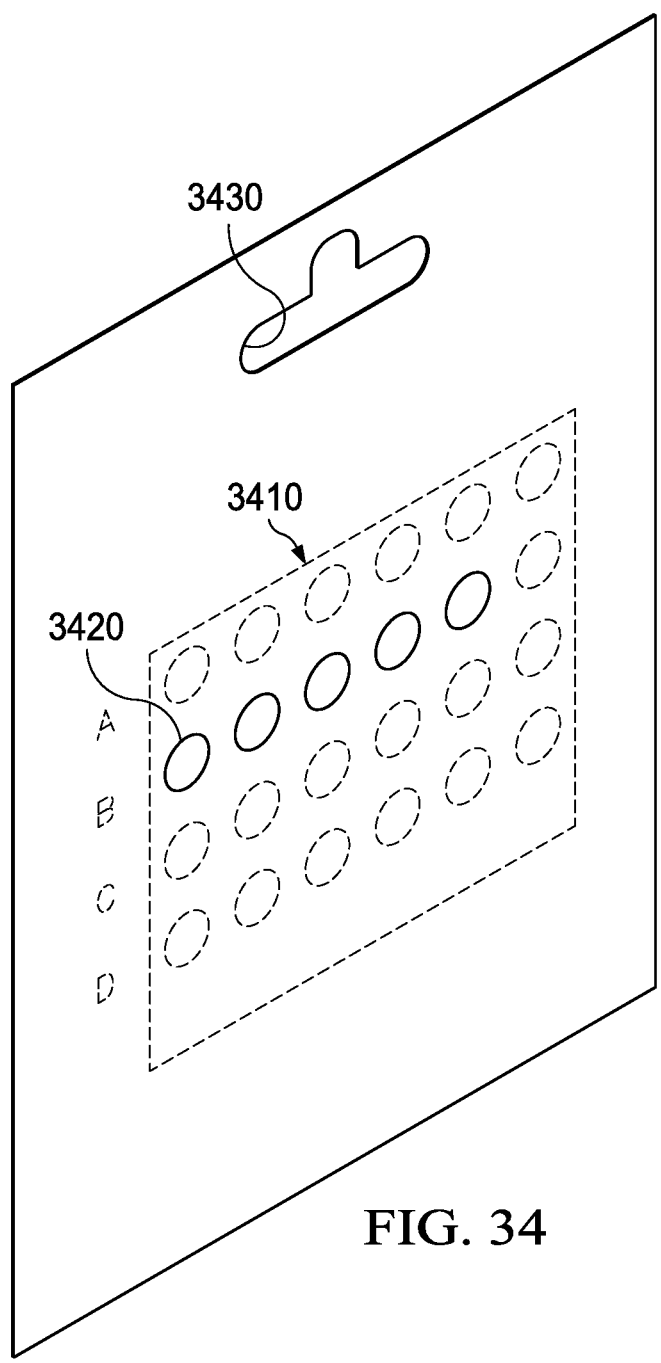
FIG. 34 is a perspective view of a lottery card (or gaming card), in accordance with some embodiments.

FIG. 34 is a perspective view of a lottery card, in accordance with some embodiments. In some embodiments, the lottery card may be used for other games, and therefore may be a gaming card such as a non-lottery gaming card. FIG. 34 shows a game board 3410 and indicators associated with or covering numbers such that the numbers are not visible to an observer. One of the indicators is indicator 3420. In other embodiments, the circular indicators may be replaced with other shapes, e.g., three-sided, four-sided, five-sided, elliptical, irregular shape, etc. The cutout 3430 may also be replaced by other shapes, e.g., three-sided, four-sided, five-sided, elliptical, irregular shape, etc. In some embodiments, the cutout may be for ornamental purposes. In other embodiments, the cutout may have utility such that it is used for placing on a shoulder of a rack at a store such as a retail store. In some embodiments, the indicators may be nearer or farther away from each other compared to that shown in FIG. 34.

Figure 35:
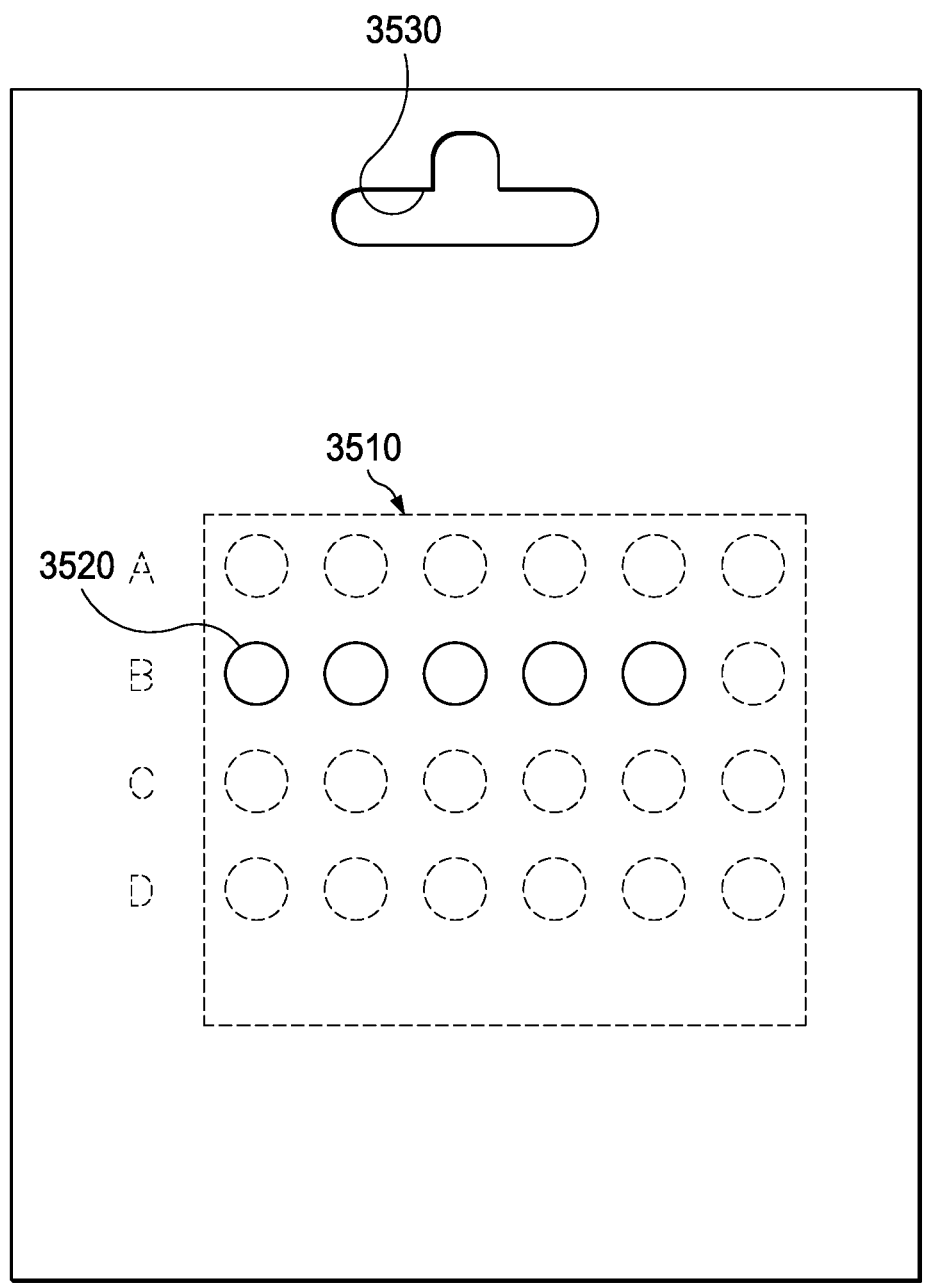
FIG. 35 is a front view of a lottery card, in accordance with some embodiments.
Figure 36:
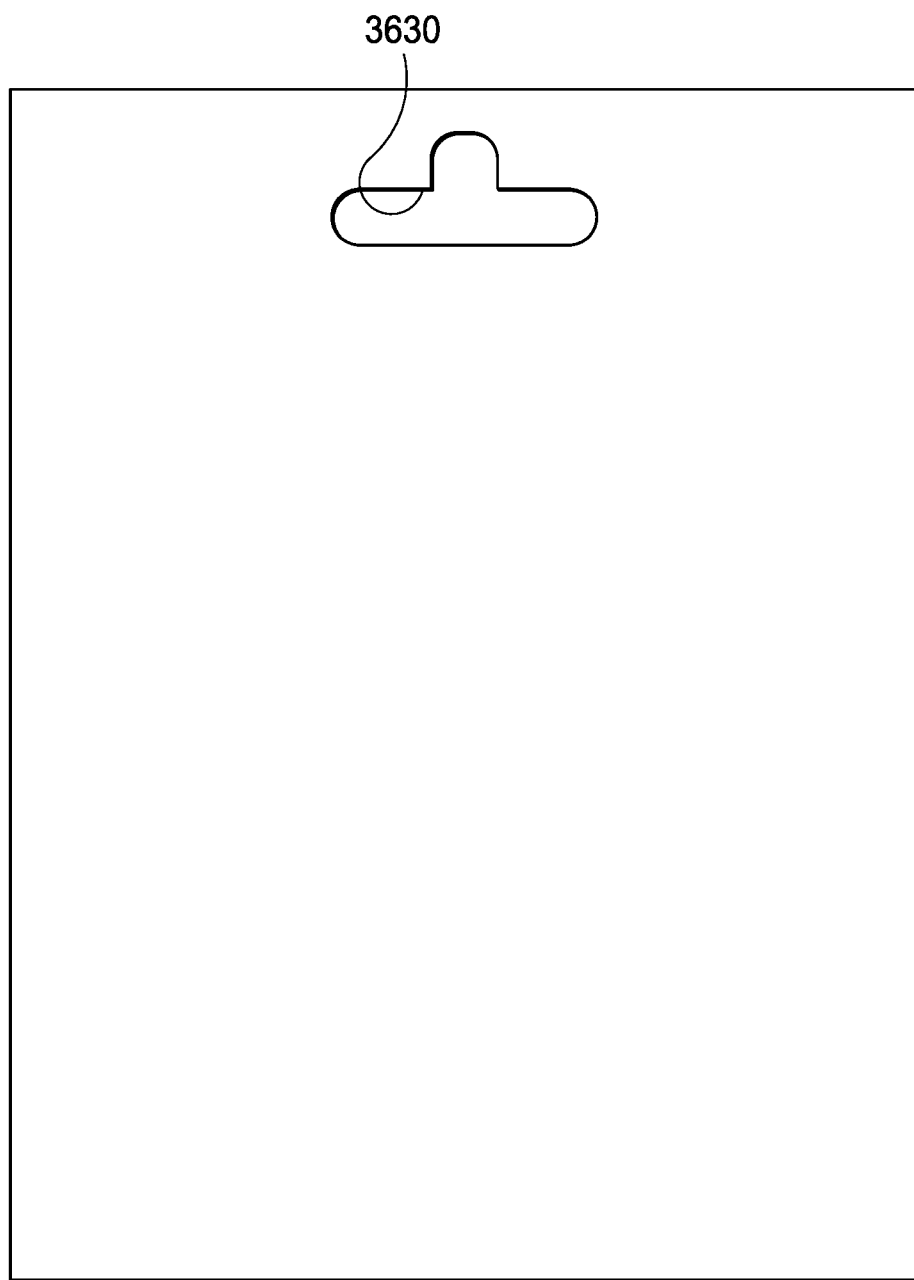
FIG. 36 is a back view of a lottery card, in accordance with some embodiments.
Figures 37, 38, 39, 40:
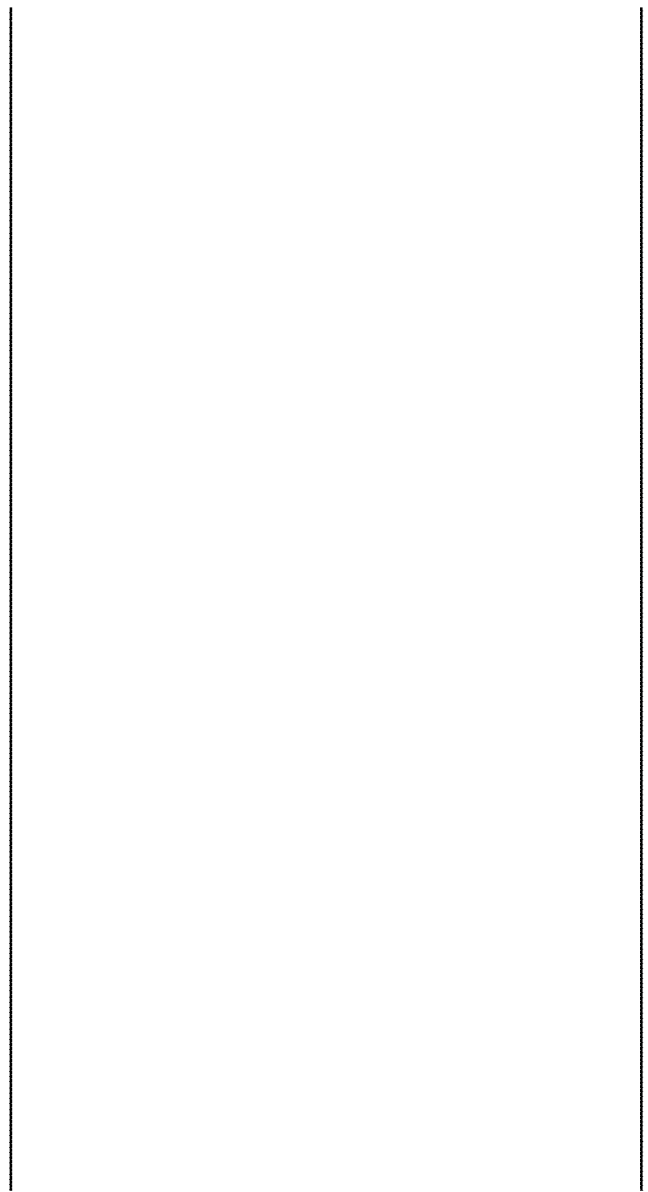
FIG. 37 is a side view (e.g., right side view) of a lottery card, in accordance with some embodiments.
FIG. 38 is another side view (e.g., left side view) of a lottery card, in accordance with some embodiments.
FIG. 39 is a top view of a lottery card, in accordance with some embodiments.
FIG. 40 is a bottom view of a lottery card, in accordance with some embodiments.

FIG. 35 is a front view of a lottery card, in accordance with some embodiments. FIG. 36 is a back view of a lottery card, in accordance with some embodiments. FIG. 37 is a side view (e.g., right side view) of a lottery card, in accordance with some embodiments. FIG. 38 is another side view (e.g., left side view) of a lottery card, in accordance with some embodiments. FIG. 39 is a top view of a lottery card, in accordance with some embodiments. FIG. 40 is a bottom view of a lottery card, in accordance with some embodiments. In any future design application, the dashed lines may form no part of the claimed design. However, the dashed lines may be converted to solid lines to form part of the claimed design. Additional features for the lottery card may be incorporated from FIGS. 30-32 or as described in this disclosure. In some embodiments, the lottery card may also be referred to as a gaming card.

In some embodiments, a game may comprise at least one of sports betting, sports wagering, sports gambling, moneyline bets, spread bets, total bets, over bets, under bets, proposition bets, parlays, teasers, if bets, run line bets, puck line bets, goal line bets, future wagers, head-to-head bets, totalizators, flexible-rate bets, half bets, in-play betting, bookmaking, arbitrage betting, parimutuel betting, and/or mutual betting, etc.

In some embodiments, sports betting may be based on at least one of handicaps, spreads, thresholds, time limits, time periods, underdogs, favorites, fractional points, decimal points, point differences, odds, fractional odds, decimal odds, moneyline odds, probabilities, crowd predictions, predictions, ticket sales, event attendance, social media data (and/or sentiment analysis thereof), media content "likes," social media followers, historical outcomes, event locations, betting pools, and/or overtime, etc.

In some embodiments, sports may comprise at least one of human and/or non-human (e.g. animal, robot, artificial intelligence) participants. In some embodiments, sports may include e-sports, including sports associated with video games, etc.

In some embodiments, sports may comprise non-athletic events such as at least one of reality shows, talent contests, elections, stock-picking, price trends, simulated sports, video games, racing (e.g. with vehicles or drones), popularity contests, creativity contests, scavenger hunts, card games, board games, etc.

Some embodiments may comprise and/or use at least one of a blockchain, list of linked blocks, and/or public ledger network, etc. A blockchain may comprise cryptographic blocks comprising at least one of a hash, timestamp, and/or transaction data, and other game information, etc. A ledger of a blockchain may be at least one of distributed, decentralized, un-editable, and/or publicly viewable. In some embodiments, a ledger may be centralized. In some embodiments, a blockchain may be peer-to-peer.

A blockchain may or be used to at least one of record events, transactions, in-game currencies, real-world currencies, bets, prices, odds, voting, game information, game data, user information, participant identities, historical information, other game information, and/or any other information described herein, etc. Recorded information may be stored in blocks, metadata, and/or ledger data.

Blocks may comprise batches, and/or batches may comprise blocks. Blocks may be hashed and/or encoded in a hash tree (e.g. Merkle tree). Hashes may be cryptographic. A blockchain may allow for at least one of a single chain, multiple chains, temporary forks, and/or permanent forks, etc.

Individuals and/or machines may be compensated in at least one of virtual currency, in-game currency, and/or real-world currency for performing computation (e.g. in serial and/or in parallel) on cryptographic hashes, etc.

In some embodiments, a game may comprise solving a cryptographic hash. In some embodiments, block time may be configurable. In some embodiments, block time may depend on the game related to the blockchain. Some embodiments may involve hard forks. Blockchains may or may not require permissions. Blockchain operation may be geo-fenced and/or limited geographically.

In some embodiments, at least one of a block, blockchain, and/or blockchain network may initiate at least one of a game, create a game session, interact with a game, respond to a game, record a game action, serve as a "bookie", serve as a middleman, serve as an escrow, record a game-related transaction, perform any other game-related operation or transaction described herein, and/or perform any other operation or transaction using any type of information described herein (i.e., in this disclosure), etc.

In some embodiments, a method and apparatus are provided for determining if game play is allowed in a certain jurisdiction. For example, a user initiates a connection from his or her user device to a gaming system to determine if a particular game is allowable for play in the jurisdiction where the user device (and/or gaming system) is located, or to determine allowable games to play in the same jurisdiction. A gaming system may refer to any remote or local game-playing apparatus or server (i.e., local or remote with respect to the user device) as described in this disclosure. In response to initiating a connection, the gaming system transmits an instruction to the user device requesting location information (e.g., geolocation information, identification information (e.g., user device identification information, entity identification information, etc.)). Subsequently, the location information is transmitted from the user device to the gaming system. In some embodiments, the user device's location information may be obtainable from the user device or another location-capturing sever without sending a direct or indirect (i.e., via one or more other systems or devices) instruction to the user device.

In response to receiving the location information, the location information is transmitted from the gaming system to a fraud detection or prevention system (or verification system). In some embodiments, the fraud detection or prevention system may be part of any of the systems described herein, including at least one of the user device, the gaming system, another local or remote system (e.g., local or remote with respect to the user device, the gaming system, etc.), etc. The fraud detection or prevention system performs several functions. For example, the system rejects or excludes a game play request (e.g., associated with a particular game, web application, in-game option, etc.) from a user device IP address (or other device identifying information) that has previously been used for fraudulent activity (e.g., used as a virtual private network (VPN) concentrator, used a proxy or used as a proxy, etc.). As a further example, the fraud detection or prevention system rejects or excludes a game play request initiated or received from a user device located outside an allowed or approved gaming zone, jurisdiction, location, etc., associated with a particular game, in-game option, etc.

As a further example, the system rejects or excludes a game play request initiated or received from a user device located in an exclusion zone, jurisdiction, location, etc. As a further example, the fraud detection or prevention system rejects or excludes a game play request initiated or received from a user device that does not meet certain standards for game play (e.g., device security feature, operating system feature, web application feature (e.g., version), etc.) associated with a game, in-game option, etc. As a further example, the system rejects or excludes a game play request associated with location information that has not been gathered or verified from multiple (e.g., at least two, at least three, etc.) location information sources. For example, if the location information obtained for a user device comprises only Wi-Fi information and does not comprise GPS coordinates or cellular triangulation information, the fraud detection or prevention system rejects the game play request. In some embodiments, location information needs to be obtained from multiple sources (e.g., GPS and cellular information) and/or needs to be of multiple types (e.g., geolocation information, IP address information, etc.) for approving a game play request. In some embodiments, the system rejects a game play request associated with location information comprising GPS coordinates because the GPS coordinates comprise static values (e.g., over a period of time).

In some embodiments, upon completing the processes associated with analyzing the location information, the fraud detection or prevention system transmits a success or failure indication or result (e.g., associated with the user device's game play request) to the user device. The user device subsequently forwards or otherwise transmits the success or failure result to the gaming system. In some embodiments, the fraud detection or prevention system may directly forward the success or failure result to the gaming system (and not via the user device). In some embodiments, the success or failure result (and supporting information such as location information of the user device, reason for rejecting/accepting the user device's game play request, etc.) transmitted from the gaming system to the user device may be encrypted and/or otherwise be part of an encrypted payload, which is decryptable by the gaming system to which the result (and supporting information such as location information of the user device, reason for rejecting/accepting the user device's game play request, etc.) is forwarded from the user device.

In some embodiments, the encrypted result and/or encrypted payload may not be decryptable by the user device, and may be decrypted only by the gaming system. In some embodiments, the gaming system and the fraud detection or prevention system may have exchanged keys (e.g., prior to or during or after the gaming system receives the success or failure result and supporting information, if any), wherein the keys enable the gaming system to decrypt information (e.g., the success or failure result and/or other supporting information) transmitted from the fraud detection or prevention system to the user device and then forwarded to the gaming system by the user device (or transmitted directly from the fraud detection or prevention system to the gaming system). The keys are used to protect and/or authenticate the location information (e.g., associated with the user device at the time of requesting game play, at the time of game play, etc.) transmitted, received, or exchanged among at least one of the user device, the gaming system, and the fraud detection or prevention system.

If the game play request is successful (e.g., as determined by the fraud prevention or detection system), the gaming system (or any of the other systems or devices described herein) analyzes the result, and/or other supporting information, the location information, the game play request information, etc., and transmits information to the user device indicating a list of allowable games that can be played by the user device (e.g., located in a particular location or jurisdiction) or indicating that the user device may proceed to play a game selected by the user prior to at least some of the steps described previously and/or anywhere else in this disclosure. In some embodiments, the user device communicates with the gaming system, wherein at least one of the gaming system or the user device decrypts the result, or other supporting information, the location information, the game play request information, etc., all or some of which may be encrypted using encryption keys as described herein, for enabling the user device to proceed with playing a selected game or selecting a game to play. In some embodiments, the gaming system (or any other system or device described herein) decrypts at least some of the encrypted information or information included in an encrypted payload to determine the jurisdiction, location, zone, etc., associated with the game play request and/or to determine whether game play is allowed in the determined jurisdiction, location, zone, etc. Based on the determination(s), the gaming system then allows the user device to proceed to play the selected game, or initiate presentation, on the user device, of allowable games to play if the jurisdiction, location, zone, etc., associated with the game play request is an allowed or allowable jurisdiction, location, zone, etc. If the jurisdiction, location, zone, etc., associated with the game play request is not an allowed jurisdiction, location, zone, etc., the gaming system rejects the game play request received from the user device and sends an appropriate message to the user device rejecting the selected game or indicating that no games are available for play in the user device's jurisdiction, location, zone, etc.

Any of the systems described herein may be implemented entirely in hardware, entirely in software, or as a combination of hardware and software. In some embodiments, any of the hardware or software described herein may include retail systems, including point-of-sale systems, kiosks, mobile devices, cards that may be swiped at or otherwise interact with a point-of-sale system, etc.

In some embodiments, at least one of an application programming interface (API), software development kit (SDK), and development library is created that enables any of the systems here, either singly or in combination, (e.g., a user device, a gaming system, a fraud detection or prevention system, etc.) to perform one or more functions. These functions include facilitating development of a mobile device application (e.g., a gaming application or any other type of non-gaming application that includes a gaming operation) or other web applications that provide an approved set of ways (e.g., user actions on or with regard to a user device and/or gaming system) to play one or more games on the user device in communication with the gaming system. In some embodiments, the functions include ensuring that any of the steps (e.g., any location determining, location verification, user verification, etc.) described herein are followed and are not circumventable by the user device and/or gaming system and/or any other system described herein. In some embodiments, the functions include enabling vetting or checking of the API, SDK, and/or library by an entity (e.g., a jurisdiction) such that functions or operations based on the API, SDK, and/or library can be incorporated into applications (e.g., mobile applications or other web applications), associated with a third-party entity application (e.g., an application primarily used for purposes other than gaming), that include gaming features or operations. In some embodiments, the functions may include any functions described in this disclosure.

In some embodiments, the SDK and/or library are based on the API, wherein the API (and/or the SDK and/or the library) implements location determining capabilities (e.g., determining the location of the user device), as well as game selection and game play capabilities for the user device. In some embodiments, at least one of the SDK, the library, and the API may implement any method and/or system described herein. The SDK, the library, and the API are accessible to or implemented in any device or system described herein, including devices on which a game is accessed, initiated, or played, or any external (local or remote) devices or systems separate from that on which the game is accessed, initiated, or played.

In some embodiments, the API comprises a communication interface, e.g., a network communication interface, that enables the SDK and/or library to function or be accessible to or used by any user device, gaming system, etc. For example, the API (e.g., additionally or alternatively, in association with the SDK and/or the library) enables implementation of determining allowable games for a user device to play in a certain jurisdiction, location, zone, etc. As a further example, the API (e.g., additionally or alternatively, in association with the SDK and/or the library) enables implementation of enabling a user device or a user to enter into or play a game allowed in a certain jurisdiction, location, zone, etc. As a further example, the API (e.g., additionally or alternatively, in association with the SDK and/or the library) provides or enables receipt or collection of information about a user associated with a user device, and further enables placing restrictions on play limits (e.g., type of games, number of plays in a certain time frame, spend limit associated with one or more games, etc.) or other user-level restrictions (e.g., age, skill level, etc.). In some embodiment, the API (e.g., additionally or alternatively, in association with the SDK and/or the library) enables encryption of communications transmitted to or received from the user device, gaming system, etc. In some embodiments, the API (e.g., in association with the SDK and/or the library) provides access (e.g., restricted access via credentials) of a user's account (e.g., to the user or an authorized third-party wherein authorization was provided by the user) comprising information about the user, his/her game play history, skill level as determined by an application or as submitted by the user, etc.

Figure 41:
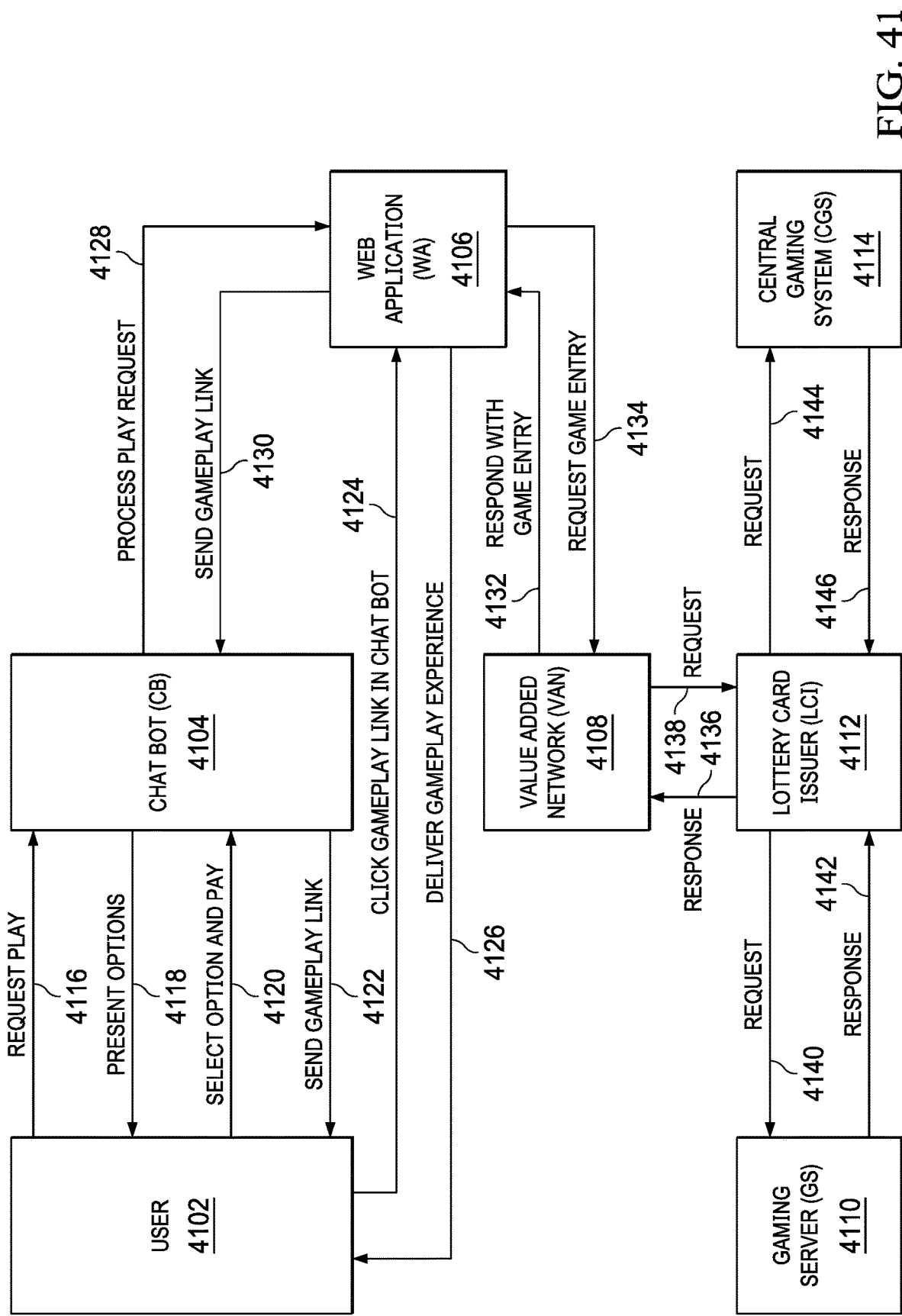
FIG. 41 shows chat bot operation, in accordance with some embodiments.

Referring now to FIG. 41, a method associated with a chat bot is provided, in accordance with some embodiments. At step 4116, a user 4102 on a user device logs into a social network, a gaming network, etc., and initiates a request to play a game by sending a message to a chat bot 4104 or selecting a chat bot and typing a message in an input box associated with the chat bot. The request may be associated with a particular game (or game option such as an in-game option) or the request may be associated with a particular jurisdiction such that the user is seeking to play one or more games that are available in the jurisdiction in which the user device is located. The chat bot may be implemented in software (e.g., in a gaming application on the user device and/or on a social network/gaming network and/or on a remote or local server, etc.) and/or hardware. The chat bot may determine whether a specifically requested game is available in the jurisdiction in which the user device is located, or determine available games associated with a jurisdiction in which the user device is located.

At step 4118, the chat bot transmits to the user device a game specifically requested by a user or a list of allowable games associated with the jurisdiction in which the user device is located. At step 4120, the user selects, on the user device, the game received from or presented by the chat bot. At step 4120, the user may also select, on the user device, options associated with the game received from or presented by the chat bot. Optionally, at step 4118, the chat bot may prompt, on the user device, a user to pay, via the user device, for the game or for one or more of the game options. Optionally, at step 4120, the user may transmit payment information to the chat bot. If payment information is received, the chat bot initiates processing of the payment information by communicating with one or more payment processing systems either directly or via any of the other systems described herein.

The chat bot requests a VAN 4108 (value-added network) to record the purchase. The VAN may represent any system or network, either local or remote, described herein. In some embodiments, the VAN is responsible for providing requests, responses, and/or services, including geolocation determination for any user device and/or gaming system described herein, verifying that a user's game plays are registered for a current or future draw, etc. The VAN records the purchase of the game and user information associated with the user of the user device requesting game play. The VAN sends, to an issuer 4112 (e.g., a card issuer such as gaming (e.g., lottery card) card issuer), a request 4138 to create an account (or a record) for the user, if one does not exist. The request may include user information such as name, contact information, known game playing history, game skill level, etc. In response to receiving the request, the issuer creates an account for the user, and sends an appropriate response 4136 to the VAN indicating the creation of the account. Alternatively, if an account already exists, the issuer accesses the account of the user. A user may load the account with funds for game play by either directly interacting with the issuer or by interacting with the issuer through one or more software and/or hardware systems or networks described herein. Any communication among software and/or hardware constructs, modules, or systems described herein may be implemented via any wired or wireless communication described herein.

In some embodiments, the chat bot requests 4128 a game from a web application 4106 such as a social networking application or other gaming or non-gaming application, any of which may be a mobile application specifically configured to be executed on mobile devices, on behalf of a user interacting with the chat bot. For example, the chat bot may request $10 of game play associated with a particular lottery game. The web application validates the user's account balance by communicating, via the VAN, with the issuer. Upon validation by the issuer, which validation is communicated to the web application (e.g., directly or through the VAN), the web application sends 4130, to the chat bot, a link to initiate game play. The chat bot forwards 4122 the link to the user. The user selects 4124, on the user device, the link, and that selection triggers the web application (e.g., a web browser, a mobile application, etc.) to display 4126 a page, which is part of a game play experience, on the user device. The page may welcome the user to the game play requested by the user and provide other information regarding the game associated with the game play request.

The web application subsequently performs on-boarding of the user who submitted the game play request from the user device. The on-boarding process may involve verifying user information associated with the user (e.g., age, game skill level, etc.) and location information (i.e., is the user in a location approved for the game, e.g., at the time of request and/or at the time of play). The verifying of the user information and/or location information may be performed by the web application and/or by any of the other software and/or hardware constructs, modules, or systems described herein.

Upon verifying the user, the web application presents the game requested by the user and relevant game play options (e.g., game play options requested by the user, game play options available in the user's location or jurisdiction, etc.) on the user device. For example, the relevant options include a lottery game type, a lottery draw date, lottery game play numbers, number of lottery tickets, etc. The user selects the desired game play options and submits those options to the web application. The web application processes the selected game play options and determines or maps the user to a specific location and/or jurisdiction (e.g. state, city, county, etc.). In some embodiments, prior to determining the jurisdiction, the web application may determine whether location determination or mapping of the user is allowed by the jurisdiction, by the user, by the game to be played on the user device, etc. The web application sends (e.g., with information associated with the game and/or game options selected by the user) a request 4134, via the VAN, to the issuer for game entry.

The issuer subsequently routes or sends 4140 the request to a gaming server 4110. The gaming server may represent any system or device described herein. In the case of a lottery game, the request may include a request for numbers (e.g., user's preferred or stored numbers, user's selected numbers at or around the time of requesting game play, random numbers, etc.). The game server returns 4142, to the issuer, the request formatted or configured for submission to a central gaming system (CGS) 4114. The CGS may represent any system or device described herein. The issuer receives the formatted or configured request, and forwards 4144 the request to the CGS.

The CGS processes the request. The CGS sends confirmation 4146 of game entry to the issuer, and provides the issuer with relevant details associated with the game entry (e.g., the game options such as in-game options, etc.). The issuer 4132 sends, via 4136 the VAN, the confirmation of game entry and the other relevant details to the web application. The web application processes the game entry and presents, on the user device, the confirmation of the game entry and the other relevant details to the user. In some embodiments, the web application may, additionally or alternatively, send the same information to the chat bot for display and/or for updating the user's account or record. At the conclusion of the game, the CGS notifies the issuer of the game result. The issuer then sends, via the VAN, notification of the game result to the web application. The web application sends the game result notification to the chat bot, and the chat bot, in turn, sends the game result notification to the user with a link to the game result (e.g., the winning numbers, an indication of whether the user is a winner, second chance games available to the user if the user did not win, etc.). The user may select the link to view the game result and any additional information associated with the game, the user's game result and reward, if any, the user's game playing history, etc. In some embodiments, any of the systems, devices, steps in FIG. 41 or any of the figures herein may be combined together.

In some embodiments, the chat bot may represent any virtual assistant that is installed on a mobile computing device (e.g., a mobile phone, a speaker, etc.) or non-mobile computing device. In some embodiments, a skill engine application may be embedded into at least one of the chat bot, the web application, or the VAN. The skill engine may perform any of the location verification (e.g., at the time of game play request, at the time of game play, etc.) or user eligibility verification (e.g., equal to or greater than minimum age for game play, sufficient minimum funds for game play, sufficient minimum skill level for game play, etc.) operations described herein.

In some embodiments, a user may crowdsource, on a social network, number selection for a game. In such embodiments, a user may indicate to his or her social network connections that he or she is playing game (e.g., a lottery game), and the user's social network connections may then provide numbers for the user's game entry. The user may select a duration for the crowdsourcing operation. Upon completion of the duration, the game-playing application associated with the social network may present the user with results associated with the crowdsourcing operation and/or may select the numbers for the user based on the frequency of numbers selected by the user's connections. For example, the top 5 most frequently selected numbers by the user's social network connections may be used as the user's game entry. The user may or may not have an opportunity to edit the numbers comprised in the user's game entry prior to submission of the numbers (i.e., the game entry) to a gaming system and/or any other system that sends confirmation of the game entry back to the user. In some embodiments, a history associated with each number (e.g., selected by the user or selected by the user's social network connections) may be presented to the user prior to submission of the game entry. The history may indicate how frequently each number has appeared in a game winning set of numbers, in a game losing set of numbers, etc., and may motivate a user to change his or her numbers comprised in the game entry.

In some embodiments, various embodiments described herein provide specific improvements. For example, various embodiments of the disclosure enable determination of location information for individually isolated game-playing transactions (e.g., each spin of a slot machine). As a further example, some embodiments provide an ability to audit or verify a previously executed game-playing transaction, wherein the game-playing transaction is executed on a first interface, and data associated with the game-playing transaction is transmitted on a second interface (e.g., an audit or verification communication interface) or on the first interface. Additionally or alternatively, some embodiments provide an ability to improve adherence to technical standards (e.g., location specificity, user device hardware and/or software requirements, including location-determining software requirements or standards, security modules/software requirements, etc.) associated with jurisdictions in which the user device operates (i.e., requests game play, plays a game, etc.).

Any of the systems described herein may be referred to as or may include functionality associated with the user device, the gaming system, the game-playing apparatus, the gaming facilitator, and/or any other software and/or hardware system, including servers such as the communication exchange server, etc. described herein. Any section of this disclosure may be combined with any other section of this disclosure to implement systems, execute methods, etc.

In some embodiments, a method is provided for processing information associated with game-playing transactions. The method comprises: receiving, using one or more computing device processors, from a mobile device, information associated with a game-playing transaction, wherein the game-playing transaction is associated with a game-play request for a game, wherein the game is associated with or comprises game information; transmitting, using one or more computing device processors, to the mobile device, a request for location information associated with the mobile device; receiving, using the one or more computing device processors, from the mobile device, the location information associated with the mobile device; transmitting, using the one or more computing device processors, to a verification system, the location information associated with the mobile device, wherein the verification system determines the mobile device is located in an approved location associated with the game based on determining the location information is at least partially consistent with or mappable to second information or identification information, and transmits, to the mobile device, verification information associated with the determination that the mobile device is located in the approved location; receiving, using the one or more computing device processors, from the mobile device and not directly from the verification system, verification information associated with the determination that the mobile device is located in the approved location associated with the game; processing, using the one or more computing device processors, the verification information associated with the determination that the mobile device is located in the approved location associated with the game; and enabling, using the one or more computing device processors, the mobile device to play the game associated with the game-play request (e.g., receive and transmit a game entry to a gaming system, etc.), wherein the game-playing transaction is conducted on a first communication interface, and wherein the information associated with the game-playing transaction is received on the first communication interface or a second communication interface.

In some embodiments, the verification information associated with the determination that the mobile device is located in the approved location associated with the game is encrypted, and the processing, using the one or more computing device processors, the verification information associated with the determination that the mobile device is located in the approved location associated with the game comprises decrypting, using the one or more computing device processors, the verification information.

In some embodiments, the method further comprises receiving, using the one or more computing device processors, from the verification system, a key associated with decrypting the verification information. In some embodiments, the verification information associated with the determination that the mobile device is located in the approved location associated with the game is encrypted, and the processing, using the one or more computing device processors, the verification information associated with the determination that the mobile device is located in the approved location associated with the game comprises decrypting, using the one or more computing device processors, based on the key, the verification information.

In some embodiments, the verification information is not decryptable by the mobile device. In some embodiments, the verification system comprises or is comprised in a fraud detection system. In some embodiments, the method further comprises determining, using the one or more computing device processors, second identification information associated with the mobile device, and determining, using the one or more computing device processors, the second identification information is not mappable to exclusionary identification (e.g., device identification) information associated with the game.

In some embodiments, the method further comprises determining, using the one or more computing device processors, the location information associated with the mobile device is not mappable to exclusionary location information associated with the game.

In some embodiments, the method further comprises determining, using the one or more computing device processors, security information associated with the mobile device, and determining, using the one or more computing device processors, the security identification information is not mappable to exclusionary security information associated with the game.

In some embodiments, the method further comprises the location information comprises first location information from a first location information source or associated with a first location type and second location information from a second location information source or associated with a second location type. In some embodiments, the game-playing transaction comprises, is, or is comprised in at least one of a gaming transaction, a wagering transaction, a game initiation transaction, a game completing transaction, a lottery transaction, a pre-game transaction, a post-game transaction, a slot game transaction, an in-game transaction, a game-related transaction, a card-based transaction, a betting transaction, a casino game transaction, a location determining transaction, an identification transaction, a predictive transaction, an information processing transaction, a sports betting transaction, a user identification transaction, a mobile device identifying transaction, a mobile device identifying transaction, a game-playing apparatus-related transaction, or a game-playing apparatus identifying transaction. In some embodiments, the one or more computing device processors are comprised in at least one of the mobile device, the verification system, or one or more local or remote computing servers in communication with the mobile device.

In some embodiments, an apparatus is provided for processing information associated with game-playing transaction. The apparatus is configured to: receive, from a mobile device, information associated with a game-playing transaction, wherein the game-playing transaction is associated with a game-play request for a game, wherein the game is associated with or comprises game information; transmit, to the mobile device, a request for location information associated with the mobile device; receive, from the mobile device, the location information associated with the mobile device; transmit, to a verification system, the location information associated with the mobile device, wherein the verification system determines the mobile device is located in an approved location associated with the game based on determining the location information is at least partially consistent with or mappable to second information or identification information, and transmits, to the mobile device, verification information associated with the determination that the mobile device is located in the approved location associated with the game; receive, from the mobile device, verification information associated with the determination that the mobile device is located in the approved location associated with the game; process the verification information associated with the determination that the mobile device is located in the approved location associated with the game; and enable the mobile device to play the game associated with the game-play request, wherein the game-playing transaction is conducted on a first communication interface, and wherein the information associated with the game-playing transaction is received on the first communication interface or a second communication interface. In some embodiments, the apparatus or the verification system is further configured to verify user information associated with a user of the mobile device.

In some embodiments, any feature described in any part of this disclosure may be used in combination with any other feature described in any other part of this disclosure. A feature may refer to a system, a method, an element, an object, etc. In some embodiments, any feature described herein may be incorporated into a ride-sharing mobile application such that a passenger or computing device in the motor vehicle or the user's mobile phone may execute or initiate any operations described herein before, after, or during a ride associated with the ride-sharing mobile application.

In some embodiments, a method is provided for processing information associated with, or enabling initiation or conduction of, game-playing transactions, the method comprising: receiving, from a user device, or sending, to the user device, information associated with a game-playing transaction between a mobile device and one or more game-playing apparatuses configured for operations associated with game-playing transaction, wherein the game-playing transaction is associated with a game, wherein the game is associated with or comprises game information; determining, using one or more computing device processors, identification information or location information associated with the user device or the one or more game-playing apparatuses; determining, using the one or more computing device processors, the user device is an approved user device or the one or more game-playing apparatuses are approved one or more game-playing apparatuses, respectively, the user device or the one or more game-playing apparatuses being located in an approved location associated with the game; processing the information, or enabling initiation or conduction of the game-playing transaction, based on at least one of: determining, using the one or more computing device processors, the user device or the one or more game-playing apparatuses is the approved user device or the approved one or more game-playing apparatuses, respectively, based on cross-referencing second information or second identification information, and determining, using the one or more computing device processors, the identification information or the location information is at least partially consistent with or mappable to the second information or the second identification information, or determining, using the one or more computing device processors, a period of validity associated with the game-playing transaction or the game information has not expired, wherein the information associated with the game-playing transaction is received or sent on a first communication interface, and wherein the game-playing transaction is conducted or will be conducted on a second communication interface.

In some embodiments, the user device or the one or more game-playing apparatuses comprises or is associated with, integrated with, or comprised in at least one of a pump, an ATM, a servicing station, a retail apparatus, an entity, a local computing apparatus, or a remote computing apparatus.

In some embodiments, the user device comprises a retail apparatus configured for processing the information associated with the game-playing transaction.

In some embodiments, the one or more game-playing apparatuses comprises a remote server configured for the operations associated with the game-playing transaction.

In some embodiments, the mobile device comprises a mobile phone configured for second operations associated with the game-playing transaction.

In some embodiments, the user device comprises one or more local or remote game-playing apparatuses configured for second operations associated with the game-playing transaction.

In some embodiments, the user device comprises a point-of-sale terminal configured for enabling initiation or conduction of the game-playing transactions.

In some embodiments, the one or more game-playing apparatuses comprises one or more local or remote game-playing apparatuses.

In some embodiments, determining, using the one or more computing device processors, the user device or the one or more game-playing apparatuses is the approved user device or the approved one or more game-playing apparatuses, respectively, may be based on cross-referencing the second information or the second identification information, and determining, using the one or more computing device processors, the identification information is at least partially consistent with or mappable to the second information or the second identification information, or determining, using the one or more computing device processors, the period of validity associated with the game-playing transaction has not expired, comprises: determining, using the one or more computing device processors, the user device or the one or more game-playing apparatuses is the approved user device or the approved one or more game-playing apparatuses, respectively, based on cross-referencing the second information or the second identification information, and determining, using the one or more computing device processors, the identification information is at least partially consistent with or mappable to the second information or the second identification information.

In some embodiments, determining, using the one or more computing device processors, the user device or the one or more game-playing apparatuses is the approved user device or the approved one or more game-playing apparatuses, respectively, based on cross-referencing the second information or the second identification information, and determining, using the one or more computing device processors, the identification information is at least partially consistent with or mappable to the second information or the second identification information, or determining, using the one or more computing device processors, the period of validity associated with the game-playing transaction has not expired, comprises: determining, using the one or more computing device processors, the period of validity associated with conducting the game-playing transaction has not expired.

In some embodiments, the game-playing transaction comprises at least one of a gaming transaction, a game initiation transaction, a game completing transaction, a pre-game transaction, a post-game transaction, an in-game transaction, a game-related transaction, a location determining transaction, an identification transaction, an information processing transaction, a user identification transaction, a user device identifying transaction, a mobile device identifying transaction, a game-playing apparatus-related transaction, or a game-playing apparatus identifying transaction.

In some embodiments, the receiving or sending the information is executed before the game-playing transaction.

In some embodiments, the receiving or sending the information is executed after the game-playing transaction.

In some embodiments, the receiving or sending the information is executed as a part of the game-playing transaction.

In some embodiments, the one or more computing device processors are comprised in at least one of the user device, the one or more game-playing apparatuses, the mobile device, one or more local computing apparatuses, or one or more remote computing apparatuses.

In some embodiments, the one or more computing device processors are comprised in the one or more game-playing apparatuses.

In some embodiments, the first communication interface is located between the user device and the one or more game-playing apparatuses, and the second communication interface is located between the mobile device and the one or more game-playing apparatuses.

In some embodiments, the information comprises the identification information.

In some embodiments, the identification information associated with the user device or the one or more game-playing apparatuses comprises or is associated with or comprised in at least one of user device identification information, game-playing apparatus identification information, merchant information, merchant store information, or second location information.

In some embodiments, the game-playing transaction comprises sending third information from the mobile device to the one or more game-playing apparatuses.

In some embodiments, the first communication interface or the second communication interface comprises at least one of a Bluetooth-based interface, a near-field communication (NFC) interface, a code-based interface, a Wi-Fi interface, a cellular interface, or a wired interface.

In some embodiments, the one or more game-playing apparatuses comprise a gaming facilitator, wherein the gaming facilitator comprises a firewall, logging security, core logic, and transaction logic.

In some embodiments, the one or more game-playing apparatuses comprise a communications exchange server.

In some embodiments, determining, using the one or more computing device processors, the location is at least partially consistent with or mappable to the second information or the identification information comprises determining, using the one or more computing device processors, the location matches the second information or the identification information.

Some embodiments further comprise modifying the mobile device, the user device, or the one or more game-playing apparatuses based on determining the user device is the approved user device or the one or more game-playing apparatuses are the approved one or more game-playing apparatuses, respectively.

In some embodiments, processing the game-playing transaction, or enabling initiation or conduction of the game-playing transaction, is based on validating, using the one or more computing device processors, an age of a user associated with the user device, the one or more game-playing apparatuses, or the mobile device.

In some embodiments, the game information is comprised in the information.

In some embodiments, the information is comprised in the game information.

In some embodiments, the game-playing transaction comprises a gaming operation.

In some embodiments, the game-playing transaction comprises a game-related operation.

In some embodiments, the user device comprises a local computing apparatus and a remote computing apparatus.

In some embodiments, the one or more game-playing apparatuses comprises a local computing apparatus and a remote computing apparatus.

In some embodiments, the game comprises a lottery game.

In some embodiments, the game comprises a non-lottery game.

In some embodiments, the one or more computing device processor comprises one or more software-customized processors configured for the operations associated with the game-playing transaction.

Some embodiments may provide a network system comprising one or more game-playing apparatuses for processing, or enabling initiation or conduction of, game-playing transactions, the one or more game-playing apparatuses comprising one or more software-customized processors configured for: receiving, from a user device, or sending, to the user device, information associated with a game-playing transaction between a mobile device and the one or more game-playing apparatuses, wherein the game-playing transaction is associated with a game, wherein the game is associated with or comprises game information; determining identification information or location information associated with the user device or the one or more game-playing apparatuses; determining the user device is an approved user device or the one or more game-playing apparatuses are approved one or more game-playing apparatuses, respectively, the user device or the one or more game-playing apparatuses being located in an approved location associated with the game; processing the information, or enabling initiation or conduction of the game-playing transaction, based on at least one of: determining the user device or the one or more game-playing apparatuses is the approved user device or the approved one or more game-playing apparatuses, respectively, based on cross-referencing second information or second identification information, and determining, using the one or more computing device processors, the identification information or the location information is at least partially consistent with or mappable to the second information or the second identification information, wherein the information associated with the game-playing transaction is received or sent on a first communication interface, and wherein the game-playing transaction is conducted or will be conducted on a second communication interface.

In some embodiments involving the network system, the user device or the one or more game-playing apparatuses comprises or is associated with, integrated with, or comprised in at least one of a pump, an ATM, a servicing station, a retail apparatus, an entity, a local computing apparatus, or a remote computing apparatus.

In some embodiments involving the network system, the user device comprises a retail apparatus configured for processing the information associated with the game-playing transaction.

In some embodiments involving the network system, the user device comprises a retail terminal configured for enabling initiation or conduction of the game-playing transaction.

In some embodiments involving the network system, the one or more game-playing apparatuses comprises one or more remote servers configured for operations associated with the game-playing transaction.

In some embodiments involving the network system, the mobile device comprises a mobile phone configured for operations associated with the game-playing transaction.

In some embodiments involving the network system, the game comprises a lottery game.

In some embodiments involving the network system, the game comprises a non-lottery game.

In some embodiments involving the network system, the one or more software-customized processors are specifically configured for processing, or enabling initiation or conduction of, the game-playing transaction.

In some embodiments involving the network system, the game-playing transaction comprises at least one of a gaming transaction, a game initiation transaction, a game completing transaction, a pre-game transaction, a post-game transaction, an in-game transaction, a game-related transaction, a location determining transaction, an identification transaction, an information processing transaction, a user identification transaction, a user device identifying transaction, a mobile device identifying transaction, a game-playing apparatus-related transaction, a game-playing apparatus identifying transaction, a casino gaming transaction, a slot gaming transaction, a predictive transaction, a digital sweepstakes transaction, a Bingo transaction, and a poker transaction.

In some embodiments involving the network system, the first communication interface is located between the user device and the one or more game-playing apparatuses, and the second communication interface is located between the mobile device and the one or more game-playing apparatuses.

In some embodiments involving the network system, the identification information associated with the user device or the one or more game-playing apparatuses comprises or is associated with or comprised in at least one of user device identification information, game-playing apparatus identification information, merchant information, merchant store information, or second location information.

In some embodiments involving the network system, the first communication interface or the second communication interface comprises at least one of a Bluetooth-based interface, a near-field communication (NFC) interface, a code-based interface, a Wi-Fi interface, a cellular interface, or a wired interface.

In some embodiments involving the network system, the receiving or sending the information is executed before the game-playing transaction.

In some embodiments involving the network system, the receiving or sending the information is executed after the game-playing transaction.

In some embodiments involving the network system, the receiving or sending the information is executed as a part of the game-playing transaction.

Some embodiments may provide a method for processing information associated with, or enabling initiation or conduction of, game-playing transactions, the method comprising: receiving, from a user device and at one or more game-playing apparatuses configured for operations associated with game-playing transactions, information associated with a game-playing transaction, wherein the game-playing transaction is associated with a game, wherein the game is associated with or comprises game information, wherein the user device communicates with the one or more game-playing apparatuses; determining, using the one or more computing device processors, the information is at least partially consistent with or mappable to second information, the second information being received or accessed from a second user device different from the user device, the second user device being located in an approved location associated with the game, the second user device being associated with approved identification information or approved location information; processing the information, or enabling initiation or conduction of the game-playing transaction, based on at least one of: receiving or accessing, using the one or more computing device processors, the second information and determining, using the one or more computing device processors, the information is at least partially consistent with or mappable to the second information, the second information being received or accessed from the second user device located in the approved location associated with the game, or determining, using the one or more computing device processors, a period of validity associated with the game-playing transaction or the game information has not expired, wherein the information associated with the game-playing transaction is received on a first communication interface, and wherein the second information is received or accessed on a second communication interface.

In some embodiments involving the aforementioned method, the second user device or the one or more game-playing apparatuses comprises or is associated with, integrated with, or comprised in at least one of a pump, an ATM, a servicing station, a retail apparatus, an entity, a local computing apparatus, or a remote computing apparatus.

In some embodiments involving the aforementioned method, the second user device comprises a retail apparatus configured for at least one of receiving, processing, or transmitting the second information.

In some embodiments involving the aforementioned method, the one or more game-playing apparatuses comprises a remote server configured for the operations associated with the game-playing transaction.

In some embodiments involving the aforementioned method, the user device comprises a mobile telecommunication device configured for second operations associated with the game-playing transactions.

In some embodiments involving the aforementioned method, the second user device comprises one or more local or remote game-playing apparatuses configured for second operations associated with the game-playing transactions.

In some embodiments involving the aforementioned method, the second user device comprises a retail terminal configured for enabling initiation or conduction of the game-playing transaction.

In some embodiments involving the aforementioned method, the second user device comprises a local computing terminal configured for enabling initiation or conduction of the game-playing transaction.

In some embodiments involving the aforementioned method, the one or more game-playing apparatuses comprises one or more local or remote game-playing apparatuses.

In some embodiments involving the aforementioned method, receiving or accessing, using the one or more computing device processors, the second information and determining, using the one or more computing device processors, the information is at least partially consistent with or mappable to the second information, the second information being received or accessed from the second user device located in the approved location associated with the game, or determining, using the one or more computing device processors, a period of validity associated with the game-playing transaction or the game information has not expired, comprises: receiving or accessing, using the one or more computing device processors, the second information and determining, using the one or more computing device processors, the information is at least partially consistent with or mappable to the second information, the second information being received or accessed from the second user device located in the approved location associated with the game.

In some embodiments involving the aforementioned method, receiving or accessing, using the one or more computing device processors, the second information and determining, using the one or more computing device processors, the information is at least partially consistent with or mappable to the second information, the second information being received or accessed from the second user device located in the approved location associated with the game, or determining, using the one or more computing device processors, a period of validity associated with the game-playing transaction or the game information has not expired, comprises: determining, using the one or more computing device processors, a period of validity associated with the game-playing transaction or the game information has not expired.

In some embodiments involving the aforementioned method, the game-playing transaction comprises receiving, from the user device and at the one or more game-playing apparatuses configured for the operations associated with the game-playing transactions, the information associated with the game-playing transaction.

In some embodiments involving the aforementioned method, the game-playing transaction comprises at least one of a gaming transaction, a game initiation transaction, a game completing transaction, a pre-game transaction, a post-game transaction, an in-game transaction, a game-related transaction, a location determining transaction, an identification transaction, an information processing transaction, a user identification transaction, a user device identifying transaction, a game-playing apparatus-related transaction, or a game-playing apparatus identifying transaction.

In some embodiments involving the aforementioned method, the receiving the information is executed before the game-playing transaction.

In some embodiments involving the aforementioned method, the receiving the information is executed after the game-playing transaction.

In some embodiments involving the aforementioned method, the receiving the information is executed as a part of the game-playing transaction.

In some embodiments involving the aforementioned method, the one or more computing device processors are comprised in at least one of the user device, the one or more game-playing apparatuses, the second user device, one or more local computing apparatuses, or one or more remote computing apparatuses.

In some embodiments involving the aforementioned method, the one or more computing device processors are customized for performing specific operations associated with the game-playing transactions.

In some embodiments involving the aforementioned method, the one or more computing device processors are comprised in the one or more game-playing apparatuses.

In some embodiments involving the aforementioned method, the first communication interface is located between the user device and the one or more game-playing apparatuses, and the second communication interface is located between the second user device and the one or more game-playing apparatuses.

In some embodiments involving the aforementioned method, the information or the second information comprises identification information.

In some embodiments involving the aforementioned method, the second user device is determined to be in the approved location based on at least one of user device identification information, game-playing apparatus identification information, merchant information, merchant store information, or second location information.

In some embodiments involving the aforementioned method, the game-playing transaction comprises sending third information from the user device to the one or more game-playing apparatuses.

In some embodiments involving the aforementioned method, the first communication interface or the second communication interface comprises at least one of a Bluetooth-based interface, a near-field communication (NFC) interface, a code-based interface, a Wi-Fi interface, a cellular interface, a wireless interface, or a wired interface.

Some embodiments involving the aforementioned method further comprise modifying the second user device based on determining the second user device is the approved user device.

In some embodiments involving the aforementioned method, processing the game-playing transaction, or enabling initiation or conduction of the game-playing transaction, is based on validating, using the one or more computing device processors, an age of a user associated with the user device, the one or more game-playing apparatuses, or the second user device.

In some embodiments involving the aforementioned method, the game information is comprised in at least one of the information or the second information.

In some embodiments involving the aforementioned method, at least one of the information or the second information is comprised in the game information.

In some embodiments involving the aforementioned method, the game-playing transaction comprises a gaming operation.

In some embodiments involving the aforementioned method, the game-playing transaction comprises a game-related operation.

In some embodiments involving the aforementioned method, the second user device comprises a local computing apparatus and a remote computing apparatus.

In some embodiments involving the aforementioned method, the one or more game-playing apparatuses comprises a local computing apparatus and a remote computing apparatus.

In some embodiments involving the aforementioned method, the game comprises a lottery game.

In some embodiments involving the aforementioned method, the game comprises a non-lottery game.

Some embodiments may comprise an apparatus for processing information associated with, or enabling initiation or conduction of, game-playing transactions, the apparatus comprising one or more software-customized processors configured for: receiving, from a user device and at one or more game-playing apparatuses configured for operations associated with game-playing transactions, information associated with a game-playing transaction, wherein the game-playing transaction is associated with a game, wherein the game is associated with or comprises game information, wherein the user device communicates with the one or more game-playing apparatuses; determining the information is at least partially consistent with or mappable to second information, the second information being received or accessed from a second user device different from the user device, the second user device being located in an approved location associated with the game; processing the information, or enabling initiation or conduction of the game-playing transaction, based on at least one of: receiving or accessing the second information and determining the information is at least partially consistent with or mappable to the second information, the second information being received or accessed from the second user device located in the approved location associated with the game, or determining a period of validity associated with the game-playing transaction or the game information has not expired, wherein the information associated with the game-playing transaction is received on a first communication interface, and wherein the second information is received or accessed on a second communication interface.

In some embodiments involving the apparatus, the second user device comprises a retail apparatus configured for at least one of receiving, processing, or transmitting the second information.

In some embodiments involving the apparatus, the one or more game-playing apparatuses comprises a remote server configured for the operations associated with the game-playing transaction.

In some embodiments involving the apparatus, the user device comprises a mobile telecommunication device configured for second operations associated with the game-playing transactions.

In some embodiments involving the apparatus, the one or more software-customized processors are specifically configured for processing, or enabling initiation or conduction of, the game-playing transaction.

In some embodiments involving the apparatus, the game comprises a lottery game.

In some embodiments involving the apparatus, the game comprises a non-lottery game.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for processing information associated with game-playing transactions, the method comprising:
   receiving from a mobile device, information associated with a game-playing transaction, the game-playing transaction associated with a game-play request for a game, the game associated with or comprising game information;
   transmitting to the mobile device a request for location information associated with the mobile device;
   receiving from the mobile device the location information;
   transmitting to a verification system the location information associated with the mobile device, the verification system determining the mobile device is located in an approved location associated with the game based at least in part on determining the location information is at least partially consistent with or mappable to second information or identification information, and transmitting, to the mobile device, verification information, encrypted and not decryptable by the mobile device, associated with the determination that the mobile device is located in the approved location;
   receiving from the mobile device the verification information;
   processing the verification information; and
   enabling the mobile device to play the game associated with the game-play request.

2. The method of claim 1, further comprising:
   receiving from the verification system, a key associated with decrypting the verification information.

3. The method of claim 1, further comprising:
   determining second identification information associated with the mobile device; and
   determining that the second identification information is not mappable to exclusionary device identification information associated with the game.

4. The method of claim 1, further comprising:
   determining that the location information associated with the mobile device is not mappable to exclusionary location information associated with the game.

5. The method of claim 1, further comprising:
   determining security information associated with the mobile device; and
   determining the security identification information is not mappable to exclusionary security information associated with the game.

6. The method of claim 1, wherein the game-playing transaction comprises, is, or is comprised in at least one of a gaming transaction, a wagering transaction, a game initiation transaction, a game completing transaction, a lottery transaction, a pre-game transaction, a post-game transaction, a slot game transaction, an in-game transaction, a game-related transaction, a card-based transaction, a betting transaction, a casino game transaction, a location determining transaction, an identification transaction, a predictive transaction, an information processing transaction, a sports betting transaction, a user identification transaction, a mobile device identifying transaction, a mobile device identifying transaction, a game-playing apparatus-related transaction, or a game-playing apparatus identifying transaction.

* * * * *